US012634710B2

(12) United States Patent
Qiao et al.

(10) Patent No.: US 12,634,710 B2
(45) Date of Patent: May 19, 2026

(54) COMMUNICATION METHOD AND APPARATUS

(71) Applicant: HUAWEI TECHNOLOGIES CO., LTD., Shenzhen (CN)

(72) Inventors: Liang Qiao, Shenzhen (CN); Keyvan Zarifi, Ottawa (CA); Jiayin Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 18/477,056

(22) Filed: Sep. 28, 2023

(65) Prior Publication Data

US 2024/0040392 A1    Feb. 1, 2024

Related U.S. Application Data

(63) Continuation of application No. PCT/CN2022/084965, filed on Apr. 2, 2022.

(30) Foreign Application Priority Data

| Apr. 2, 2021 | (CN) | ......................... | 202110363804.8 |
| Apr. 7, 2021 | (CN) | ......................... | 202110373178.0 |
| Aug. 6, 2021 | (CN) | ......................... | 202110902625.7 |

(51) Int. Cl.
| *H04W 4/00* | (2018.01) |
| *H04W 16/14* | (2009.01) |
| *H04W 48/10* | (2009.01) |
| *H04W 48/16* | (2009.01) |

(52) U.S. Cl.
CPC .......... *H04W 16/14* (2013.01); *H04W 48/10* (2013.01); *H04W 48/16* (2013.01)

(58) Field of Classification Search
CPC ...... H04W 16/14; H04W 48/10; H04W 48/16
USPC ......................................................... 370/329
See application file for complete search history.

(56) References Cited

U.S. PATENT DOCUMENTS

| 2019/0132170 A1 | 5/2019 | Si et al. | |
| 2021/0067298 A1 | 3/2021 | Si et al. | |
| 2021/0235419 A1* | 7/2021 | Si .......................... | H04W 16/14 |

OTHER PUBLICATIONS

Extended European Search Report issued in corresponding European Application No. 22779164.7, dated Jul. 30, 2024, pp. 1-10.
3rd Generation Partnership Project;Technical Specification Group Radio Access Network;NR;Physical layer procedures for control(Release 15) 3GPP TS 38.213 V15.13.0 (Mar. 2021) total 111 pages.

* cited by examiner

*Primary Examiner* — Temica M Beamer
(74) *Attorney, Agent, or Firm* — HAUPTMAN HAM, LLP

(57) ABSTRACT

This application provides a communication method and apparatus. The method is applied to an unlicensed band, and includes: receiving first information sent by a network device, where the first information includes a Q value or a first parameter, and the first parameter indicates a status of a discovery burst transmission window DBTW; and determining the status of the DBTW based on the Q value or the first parameter. According to the solution provided in this application, a terminal device can determine the status of the DBTW, to quickly implement timing synchronization with the network device.

16 Claims, 13 Drawing Sheets

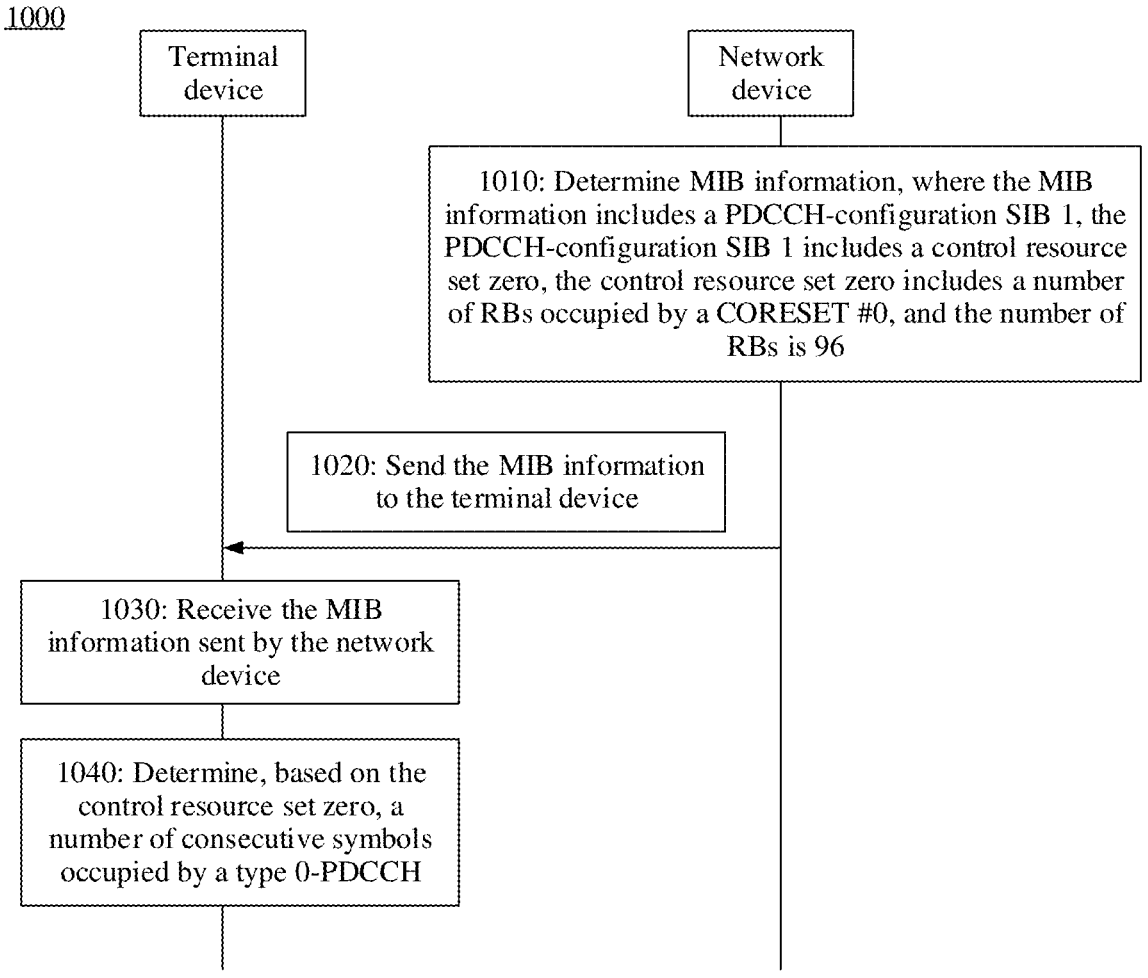

1000

Terminal device

Network device

1010: Determine MIB information, where the MIB information includes a PDCCH-configuration SIB 1, the PDCCH-configuration SIB 1 includes a control resource set zero, the control resource set zero includes a number of RBs occupied by a CORESET #0, and the number of RBs is 96

1020: Send the MIB information to the terminal device

1030: Receive the MIB information sent by the network device

1040: Determine, based on the control resource set zero, a number of consecutive symbols occupied by a type 0-PDCCH

COMMUNICATION METHOD AND APPARATUS

CROSS-REFERENCE TO RELATED APPLICATIONS

This application is a continuation of International Application No. PCT/CN2022/084965, filed on Apr. 2, 2022, which claims priority to Chinese Patent Application No. 202110902625.7, filed on Aug. 6, 2021 and Chinese Patent Application No. 202110373178.0, filed on Apr. 7, 2021 and Chinese Patent Application No. 202110363804.8, filed on Apr. 2, 2021. All of the aforementioned patent applications are hereby incorporated by reference in their entireties.

TECHNICAL FIELD

This application relates to the communication field, and in particular, to a communication method and apparatus.

BACKGROUND

A receiving device (for example, user equipment (user equipment, UE)) that accesses different types of bands first detects a synchronization signal block pattern (synchronization signal block pattern, SS/PBCH Block/SSB) sent by a base station. The SSB includes a physical broadcast channel (physical broadcast channel, PBCH) carrying master information block (master information block, MIB) information. A same parameter in the MIB information represents different content on a licensed band and a shared band. For a system operating on the shared band, the base station cannot send a specified SSB at a specified position due to existence of a listen before talk (listen before talk, LBT) mechanism. Therefore, a Q value (namely, $$N_{SSB}^{QCL})$$

is defined. The UE may calculate, by demodulating the Q value and based on a demodulation reference signal (demodulation reference signal, DMRS) sequence, a plurality of candidate positions for sending a same SSB index.

Due to the existence of the LBT mechanism on the shared band, when the base station does not need to perform LBT before sending a discovery burst (discovery burst, DB), it may be considered that a discovery burst transmission window (discovery burst transmission window, DBTW) is disabled; otherwise, it is considered that the DBTW is in an enabled state. However, the UE does not know a status of the DBTW, and therefore cannot quickly implement timing synchronization with a network device.

SUMMARY

This application provides a communication method and apparatus, so that a terminal device can determine a status of a DBTW, to quickly implement timing synchronization with a network device.

According to a first aspect, a communication method is provided. The method is applied to an unlicensed band. An execution body of the method may be a terminal device, or may be a chip used in a terminal device. The following provides descriptions by using an example in which the execution body is the terminal device.

The terminal device receives first information sent by a network device, where the first information includes a Q value or a first parameter, and the first parameter indicates a status of a discovery burst transmission window DBTW; and determines the status of the DBTW based on the Q value or the first parameter.

According to the solution provided in this embodiment of this application, the terminal device can determine the status of the DBTW based on the first information sent by the network device, therefore can determine whether the network device sends, within the DBTW, an SSB that cannot be sent due to an LBT failure, and further, can quickly implement timing synchronization with the network device.

With reference to the first aspect, in some possible implementations, the determining the status of the DBTW based on the Q value includes:

if the Q value is greater than or equal to a first threshold, determining that the DBTW is in a disabled state; or if the Q value is less than a first threshold, determining the status of the DBTW based on a DBTW value.

With reference to the first aspect, in some possible implementations, the determining the status of the DBTW based on a DBTW value includes:

if the DBTW value is less than or equal to a second threshold, determining that the DBTW is in the disabled state; or if the DBTW value is greater than a second threshold, determining that the DBTW is in an enabled state.

According to the solution provided in this application, the terminal device determines the status of the DBTW based on a value relationship between the Q value and the first threshold. If the status of the DBTW cannot be determined, the terminal device can further determine the status of the DBTW based on the DBTW value. In this way, it can be determined whether the network device sends, within the DBTW, the SSB that cannot be sent due to the LBT failure, to quickly implement timing synchronization with the network device.

With reference to the first aspect, in some possible implementations, the second threshold is time duration from a $1^{st}$ symbol in a slot in which a first synchronization signal block SSB is located to a last symbol in a slot in which a second SSB is located. An index of the first SSB is 0, and an index of the second SSB is (Q−1).

Alternatively, the second threshold is time duration from a $1^{st}$ symbol in a slot in which a third SSB is located to a last symbol in a slot in which a fourth SSB is located. The third SSB is located in a first SSB group, and the fourth SSB is located in a second SSB group. The first SSB group is a $1^{st}$ group whose bit is configured as "1" from the left in a second parameter. The second SSB group is a $1^{st}$ group whose bit is configured as "1" from the right in the second parameter.

Alternatively, the second threshold is time duration from a $1^{st}$ symbol in a slot in which a fifth SSB is located to a last symbol in a slot in which a sixth SSB is located. The fifth SSB is an SSB with a smallest index in successfully sent SSBs, and the sixth SSB is an SSB with a largest index in the successfully sent SSBs.

With reference to the first aspect, in some possible implementations, the second threshold is time duration from a slot in which a first SSB is located to a slot in which a second SSB is located. An index of the first SSB is 0, and an index of the second SSB is (Q−1).

Alternatively, the second threshold is time duration from a slot in which a third SSB is located to a slot in which a fourth SSB is located. The third SSB is located in a first SSB group, and the fourth SSB is located in a second SSB group.

The first SSB group is a $1^{st}$ group whose bit is configured as "1" from the left in a second parameter. The second SSB group is a $1^{st}$ group whose bit is configured as "1" from the right in the second parameter.

Alternatively, the second threshold is time duration from a slot in which a fifth SSB is located to a slot in which a sixth SSB is located. The fifth SSB is an SSB with a smallest index in successfully sent SSBs, and the sixth SSB is an SSB with a largest index in the successfully sent SSBs.

With reference to the first aspect, in some possible implementations, the second threshold is time duration from a $1^{st}$ symbol index of a first SSB to a last symbol index of a second SSB. An index of the first SSB is 0, and an index of the second SSB is (Q−1).

Alternatively, the second threshold is time duration from a $1^{st}$ symbol index of a third SSB to a last symbol index of a fourth SSB. The third SSB is located in a first SSB group, and the fourth SSB is located in a second SSB group. The first SSB group is a $1^{st}$ group whose bit is configured as "1" from the left in a second parameter. The second SSB group is a $1^{st}$ group whose bit is configured as "1" from the right in the second parameter.

Alternatively, the second threshold is time duration from a $1^{st}$ symbol index of a fifth SSB to a last symbol index of a sixth SSB. The fifth SSB is an SSB with a smallest index in successfully sent SSBs, and the sixth SSB is an SSB with a largest index in the successfully sent SSBs.

With reference to the first aspect, in some possible implementations, the Q value is indicated by using n bits, and n is a positive integer greater than 2. The n bits include at least one bit indicating a third parameter. The third parameter includes at least one of the following parameters:

subcarrier spacing common in master information block MIB information, an SSB-subcarrier offset in the MIB information, and a physical downlink control channel-configuration system information block 1 PDCCH-configuration SIB 1 in the MIB information.

According to the solution provided in this application, for a system operating on a shared band, the Q value can be indicated by using the n bits, and the n bits include the at least one bit indicating the third parameter. In other words, when a MIB payload capacity is not expanded, the bits indicating the Q value can be a corresponding bit of another parameter in the MIB. This can improve system performance.

With reference to the first aspect, in some possible implementations, the PDCCH-configuration SIB 1 includes search space zero and a control resource set zero.

With reference to the first aspect, in some possible implementations, the n bits include n1 bits indicating a fourth parameter and (n−n1) bits indicating a fifth parameter. The fourth parameter is any parameter in the third parameter, and the fifth parameter is a parameter in the third parameter other than the fourth parameter. The fifth parameter is indicated by using m−(n−n1) bits, and m is an initial number indicating the fifth parameter.

According to the solution provided in this application, the Q value used to determine the status of the DBTW can be indicated by using the n bits. The n bits include the n1 bits indicating the fourth parameter and the (n−n1) bits indicating the fifth parameter. The fifth parameter is indicated by using the m−(n−n1) bits, and m is the initial number indicating the fifth parameter. In this implementation, the Q value can be indicated by using the corresponding bit of the another parameter in the MIB. This can avoid indicating the Q value by expanding the MIB payload capacity, thereby improving system performance.

With reference to the first aspect, in some possible implementations, the n bits include n1 bits indicating a fourth parameter and (n−n1) bits indicating a fifth parameter. The fourth parameter is any parameter in the third parameter, and the fifth parameter is a parameter in the third parameter other than the fourth parameter. The fifth parameter is indicated by using m bits, m is an initial number indicating the fifth parameter, and (n−n1)<m.

According to the solution provided in this application, the Q value used to determine the status of the DBTW can be indicated by using the n bits. The n bits include the n1 bits indicating the fourth parameter and the (n−n1) bits indicating the fifth parameter. The fifth parameter is indicated by using the m bits. In this implementation, the Q value can be indicated by using the corresponding bit of the another parameter in the MIB. This can avoid indicating the Q value by expanding the MIB payload capacity, and does not affect bit indication of the fifth parameter, thereby improving system performance.

With reference to the first aspect, in some possible implementations, the fifth parameter is the SSB-subcarrier offset in the MIB information. An offset value of the SSB-subcarrier offset is determined based on a combination of a subcarrier spacing SCS of the SSB and an SCS of a common resource block CRB.

With reference to the first aspect, in some possible implementations, if the SCS of the SSB and the SCS of the CRB each are a first frequency, the offset value of the SSB-subcarrier offset is determined based on a preset threshold.

Alternatively, if the SCS of the SSB is a second frequency, and the SCS of the CRB is a first frequency, the offset value of the SSB-subcarrier offset is a value indicated by the (n−n1) bits indicating the fifth parameter.

Alternatively, if the SCS of the SSB is a third frequency, and the SCS of the CRB is a first frequency, the offset value of the SSB-subcarrier offset is less than or equal to a value indicated by the (n−n1) bits of the fifth parameter.

With reference to the first aspect, in some possible implementations, the (n−n1) bits are (n−n1) most significant bits in the fifth parameter.

Alternatively, the (n−n1) bits are (n−n1) least significant bits in the fifth parameter.

Alternatively, the (n−n1) bits are any (n−n1) bits in the fifth parameter.

With reference to the first aspect, in some possible implementations, the determining the status of the DBTW based on the first parameter includes:

if the first parameter includes a parameter indicating that the DBTW is enabled, determining that the DBTW is in an enabled state; or if the first parameter includes a parameter indicating that the DBTW is disabled, determining that the DBTW is in a disabled state.

According to the solution provided in this application, the terminal device can determine the status of the DBTW based on the first parameter sent by the network device, therefore can determine whether the network device sends, within the DBTW, an SSB that cannot be sent due to an LBT failure, and further, can quickly implement timing synchronization with the network device.

With reference to the first aspect, in some possible implementations, the first parameter is carried in serving cell configuration common in radio resource control RRC signaling or a serving cell configuration common SIB in SIB 1 information.

Alternatively, the Q value or the DBTW value is carried in serving cell configuration common or a serving cell configuration common SIB.

With reference to the first aspect, in some possible implementations, the PDCCH-configuration SIB 1 includes the search space zero and the control resource set zero. The control resource set zero includes a number of resource blocks RBs occupied by the control resource set CORESET #0, and the number of RBs is 96.

With reference to the first aspect, in some possible implementations, if a pattern of multiplexing the SSB and the CORESET #0 is 1, and a number of RBs occupied by the SSB is k, a first spacing included in the control resource set zero is any value of 0 to (96-k). The first spacing indicates a spacing between an RB with a smallest index in the SSB and an RB with a smallest index in the CORESET #0.

Alternatively, if a pattern of multiplexing the SSB and the CORESET #0 is 2 or 3, a first spacing is determined based on a value of an offset between the SSB and a subcarrier in the CRB.

With reference to the first aspect, in some possible implementations, if the pattern of multiplexing the SSB and the CORESET #0 is 2 or 3, if the value of the offset between the SSB and the subcarrier in the CRB is equal to 0, the first spacing is k or −k; or if the value of the offset between the SSB and the subcarrier in the CRB is greater than 0, the first spacing is (k+1) or −(k+1).

With reference to the first aspect, in some possible implementations, if the pattern of multiplexing the SSB and the CORESET #0 is 1, a number of symbols occupied by the CORESET #0 is any value of 1 to 4.

With reference to the first aspect, in some possible implementations, if the pattern of multiplexing the SSB and the CORESET #0 is 3, a number of symbols occupied by the CORESET #0 is 1 or 2.

If the pattern of multiplexing the SSB and the CORESET #0 is 2, a number of symbols occupied by the CORESET #0 is 1 or 2.

According to a second aspect, a communication method is provided. The method is applied to an unlicensed band. An execution body of the method may be a network device, or may be a chip used in a network device. The following provides descriptions by using an example in which the execution body is the network device.

The network device determines first information. The first information includes a Q value or a first parameter. The first parameter indicates a status of a discovery burst transmission window DBTW.

The network device sends the first information to a terminal device.

According to the solution provided in this embodiment of this application, the network device can send the first information to the terminal device, so that the terminal device determines the status of the DBTW, and the terminal device determines whether the network device sends, within the DBTW, an SSB that cannot be sent due to an LBT failure. Further, the terminal device can quickly implement timing synchronization with the network device.

With reference to the second aspect, in some possible implementations, the Q value is indicated by using n bits, and n is a positive integer greater than 2. The n bits include at least one bit indicating a third parameter. The third parameter includes at least one of the following parameters:

subcarrier spacing common in master information block MIB information, a synchronization signal block SSB-subcarrier offset in the MIB information, and a physical downlink control channel-configuration system information block 1 PDCCH-configuration SIB 1 in the MIB information.

According to the solution provided in this application, for a system operating on a shared band, the Q value can be indicated by using the n bits, and the n bits include the at least one bit indicating the third parameter. In other words, when a MIB payload capacity is not expanded, the bits indicating the Q value can be a corresponding bit of another parameter in the MIB. This can improve system performance.

With reference to the second aspect, in some possible implementations, the PDCCH-configuration SIB 1 includes search space zero and a control resource set zero.

With reference to the second aspect, in some possible implementations, the n bits include n1 bits indicating a fourth parameter and (n−n1) bits indicating a fifth parameter. The fourth parameter is any parameter in the third parameter, and the fifth parameter is a parameter in the third parameter other than the fourth parameter. The fifth parameter is indicated by using m−(n−n1) bits, and m is an initial number indicating the fifth parameter.

According to the solution provided in this application, the Q value used to determine the status of the DBTW can be indicated by using the n bits. The n bits include the n1 bits indicating the fourth parameter and the (n−n1) bits indicating the fifth parameter. The fifth parameter is indicated by using the m−(n−n1) bits, and m is the initial number indicating the fifth parameter. In this implementation, the Q value can be indicated by using the corresponding bit of the another parameter in the MIB. This can avoid indicating the Q value by expanding the MIB payload capacity, thereby improving system performance.

With reference to the second aspect, in some possible implementations, the n bits include n1 bits indicating a fourth parameter and (n−n1) bits indicating a fifth parameter. The fourth parameter is any parameter in the third parameter, and the fifth parameter is a parameter in the third parameter other than the fourth parameter. The fifth parameter is indicated by using m bits, m is an initial number indicating the fifth parameter, and (n−n1)<m.

According to the solution provided in this application, the Q value used to determine the status of the DBTW can be indicated by using the n bits. The n bits include the n1 bits indicating the fourth parameter and the (n−n1) bits indicating the fifth parameter. The fifth parameter is indicated by using the m bits. In this implementation, the Q value can be indicated by using the corresponding bit of the another parameter in the MIB. This can avoid indicating the Q value by expanding the MIB payload capacity, and does not affect bit indication of the fifth parameter, thereby improving system performance.

With reference to the second aspect, in some possible implementations, the fifth parameter is the SSB-subcarrier offset in the MIB information. An offset value of the SSB-subcarrier offset is determined based on a combination of a subcarrier spacing SCS of the SSB and an SCS of a common resource block CRB.

With reference to the second aspect, in some possible implementations, if the SCS of the SSB and the SCS of the CRB each are a first frequency, the offset value of the SSB-subcarrier offset is determined based on a preset threshold.

Alternatively, if the SCS of the SSB is a second frequency, and the SCS of the CRB is a first frequency, the offset value of the SSB-subcarrier offset is a value indicated by the (n−n1) bits of the fifth parameter.

Alternatively, if the SCS of the SSB is a third frequency, and the SCS of the CRB is a first frequency, the offset value of the SSB-subcarrier offset is less than or equal to a value indicated by the (n−n1) bits of the fifth parameter.

With reference to the second aspect, in some possible implementations, the (n−n1) bits are (n−n1) most significant bits in the fifth parameter.

Alternatively, the (n−n1) bits are (n−n1) least significant bits in the fifth parameter.

Alternatively, the (n−n1) bits are any (n−n1) bits in the fifth parameter.

With reference to the second aspect, in some possible implementations, the first parameter is carried in serving cell configuration common in radio resource control RRC signaling or a serving cell configuration common SIB in SIB 1 information.

Alternatively, the Q value or a DBTW value is carried in serving cell configuration common or a serving cell configuration common SIB.

With reference to the second aspect, in some possible implementations, the PDCCH-configuration SIB 1 includes the search space zero and the control resource set zero. The control resource set zero includes a number of resource blocks RBs occupied by the control resource set CORESET #0, and the number of RBs is 96.

With reference to the second aspect, in some possible implementations, if a pattern of multiplexing the SSB and the CORESET #0 is 1, and a number of RBs occupied by the SSB is k, a first spacing included in the control resource set zero is any value of 0 to (96-k). The first spacing indicates a spacing between an RB with a smallest index in the SSB and an RB with a smallest index in the CORESET #0.

Alternatively, if a pattern of multiplexing the SSB and the CORESET #0 is 2 or 3, a first spacing is determined based on a value of an offset between the SSB and a subcarrier in the CRB.

With reference to the second aspect, in some possible implementations, if the pattern of multiplexing the SSB and the CORESET #0 is 2 or 3, if the value of the offset between the SSB and the subcarrier in the CRB is equal to 0, the first spacing is k or −k; or if the value of the offset between the SSB and the subcarrier in the CRB is greater than 0, the first spacing is (k+1) or −(k+1).

With reference to the second aspect, in some possible implementations, if the pattern of multiplexing the SSB and the CORESET #0 is 1, a number of symbols occupied by the CORESET #0 is any value of 1 to 4.

With reference to the second aspect, in some possible implementations, if the pattern of multiplexing the SSB and the CORESET #0 is 3, a number of symbols occupied by the CORESET #0 is 2.

If the pattern of multiplexing the SSB and the CORESET #0 is 2, a number of symbols occupied by the CORESET #0 is 1 or 2.

According to a third aspect, a communication method is provided. An execution body of the method may be a terminal device, or may be a chip used in a terminal device. The following provides descriptions by using an example in which the execution body is the terminal device.

The terminal device receives master information block MIB information sent by a network device. The MIB information includes a physical downlink control channel-configuration system information block 1 PDCCH-configuration SIB 1. The PDCCH-configuration SIB 1 includes a control resource set zero. The control resource set zero includes a number of resource blocks RBs occupied by the control resource set CORESET #0, and the number of RBs is 96.

The terminal device determines, based on the control resource set zero, a number of consecutive symbols occupied by a type 0-physical downlink control channel type 0-PDCCH.

According to the solution provided in this application, the network device sends the MIB information to the terminal device. The MIB includes the parameter control resource set zero. The number, that is included in the control resource set zero, of RBs occupied by the CORESET #0 is 96. After receiving the MIB information, the terminal device can determine, based on the received control resource set zero, the number of consecutive symbols occupied by the type 0-PDCCH.

With reference to the third aspect, in some possible implementations, if a pattern of multiplexing a synchronization signal block SSB and the CORESET #0 is 1, and a number of RBs occupied by the SSB is k, a first spacing included in the control resource set zero is any value of 0 to (96−k). The first spacing indicates a spacing between an RB with a smallest index in the SSB and an RB with a smallest index in the CORESET #0.

Alternatively, if a pattern of multiplexing an SSB and the CORESET #0 is 2 or 3, a first spacing is determined based on a value of an offset between the SSB and a subcarrier in a CRB.

With reference to the third aspect, in some possible implementations, if the pattern of multiplexing the SSB and the CORESET #0 is 2 or 3, if the value of the offset between the SSB and the subcarrier in the CRB is equal to 0, the first spacing is k or −k; or if the value of the offset between the SSB and the subcarrier in the CRB is greater than 0, the first spacing is (k+1) or −(k+1).

With reference to the third aspect, in some possible implementations, if the pattern of multiplexing the SSB and the CORESET #0 is 1, a number of symbols occupied by the CORESET #0 is any value of 1 to 4.

With reference to the third aspect, in some possible implementations, if the pattern of multiplexing the SSB and the CORESET #0 is 3, a number of symbols occupied by the CORESET #0 is 2.

If the pattern of multiplexing the SSB and the CORESET #0 is 2, a number of symbols occupied by the CORESET #0 is 1 or 2.

According to a fourth aspect, a communication method is provided. An execution body of the method may be a network device, or may be a chip used in a network device. The following provides descriptions by using an example in which the execution body is the network device.

The network device determines master information block MIB information. The MIB information includes a physical downlink control channel-configuration system information block 1 PDCCH-configuration SIB 1. The PDCCH-configuration SIB 1 includes a control resource set zero. The control resource set zero includes a number of resource blocks RBs occupied by the control resource set CORESET #0, and the number of RBs is 96.

The network device sends the MIB information to a terminal device.

According to the solution provided in this application, the network device sends the MIB information to the terminal device. The MIB includes the parameter control resource set zero. The number, that is included in the control resource set zero, of RBs occupied by the CORESET #0 is 96. The terminal device can determine, based on the received control resource set zero, a number of consecutive symbols occupied by a type 0-PDCCH.

With reference to the fourth aspect, in some possible implementations, if a pattern of multiplexing a synchronization signal block SSB and the CORESET #0 is 1, and a number of RBs occupied by the SSB is k, a first spacing included in the control resource set zero is any value of 0 to (96–k). The first spacing indicates a spacing between an RB with a smallest index in the SSB and an RB with a smallest index in the CORESET #0.

Alternatively, if a pattern of multiplexing an SSB and the CORESET #0 is 2 or 3, a first spacing is determined based on a value of an offset between the SSB and a subcarrier in a CRB.

With reference to the fourth aspect, in some possible implementations, if the pattern of multiplexing the SSB and the CORESET #0 is 2 or 3, if the value of the offset between the SSB and the subcarrier in the CRB is equal to 0, the first spacing is k or –k; or if the value of the offset between the SSB and the subcarrier in the CRB is greater than 0, the first spacing is (k+1) or –(k+1).

With reference to the fourth aspect, in some possible implementations, if the pattern of multiplexing the SSB and the CORESET #0 is 1, a number of symbols occupied by the CORESET #0 is any value of 1 to 4.

With reference to the fourth aspect, in some possible implementations, if the pattern of multiplexing the SSB and the CORESET #0 is 3, a number of symbols occupied by the CORESET #0 is 2.

If the pattern of multiplexing the SSB and the CORESET #0 is 2, a number of symbols occupied by the CORESET #0 is 1 or 2.

According to a fifth aspect, a communication method is provided. The method is applied to a licensed band. An execution body of the method may be a terminal device, or may be a chip used in a terminal device. The following provides descriptions by using an example in which the execution body is the terminal device.

The terminal device receives MIB information sent by a network device. The MIB information includes subcarrier spacing common. The subcarrier spacing common is indicated by using r bits, and r is a positive integer greater than or equal to 2.

The terminal device performs timing synchronization based on the MIB information.

According to the solution provided in this application, the network device sends the MIB information to the terminal device. The MIB includes the subcarrier spacing common, and the subcarrier spacing common is indicated by using at least two bits. After receiving the MIB information, the terminal device can perform timing synchronization based on the received MIB information.

With reference to the fifth aspect, in some possible implementations, the r bits include one initial bit indicating the subcarrier spacing common and (r–1) bits indicating a sixth parameter. The sixth parameter includes at least one of the following parameters:

an SSB-subcarrier offset in the MIB information and a PDCCH-configuration SIB 1 in the MIB information.

With reference to the fifth aspect, in some possible implementations, the PDCCH-configuration SIB 1 includes search space zero and a control resource set zero.

With reference to the fifth aspect, in some possible implementations, the r bits include the initial bit indicating the subcarrier spacing common and the (r–1) bits indicating a seventh parameter. The seventh parameter is any parameter in the sixth parameter, the seventh parameter is indicated by using (s–(r–1)) bits, and s is an initial number indicating the seventh parameter.

According to the solution provided in this application, the subcarrier spacing common in the MIB information can be indicated by using the r bits. The r bits include the initial bit indicating the subcarrier spacing common and the (r–1) bits indicating the seventh parameter. The seventh parameter is indicated by using the (s–(r–1)) bits, and s is the initial number indicating the seventh parameter. In this implementation, the subcarrier spacing common can be indicated by using a corresponding bit of another parameter in the MIB. This can avoid indicating the subcarrier spacing common by expanding a MIB load capacity, thereby improving system performance.

With reference to the fifth aspect, in some possible implementations, the r bits include the initial bit indicating the subcarrier spacing common and the (r–1) bits indicating a seventh parameter. The seventh parameter is any parameter in the sixth parameter, the seventh parameter is indicated by using s bits, and s is an initial number indicating the seventh parameter.

According to the solution provided in this application, the subcarrier spacing common in the MIB information can be indicated by using the r bits. The r bits include the initial bit indicating the subcarrier spacing common and the (r–1) bits indicating the seventh parameter. The seventh parameter is indicated by using the s bits. In this implementation, the subcarrier spacing common can be indicated by using a corresponding bit of another parameter in the MIB. This can avoid indicating the subcarrier spacing common by expanding a MIB load capacity, and does not affect bit indication of the seventh parameter, thereby improving system performance.

With reference to the fifth aspect, in some possible implementations, the seventh parameter is the SSB-subcarrier offset in the MIB information. A value of the SSB-subcarrier offset is determined based on a combination of an SCS of an SSB and an SCS of a CRB.

With reference to the fifth aspect, in some possible implementations, if the SCS of the SSB and the SCS of the CRB each are a first frequency, the value of the SSB-subcarrier offset is determined based on a preset threshold.

Alternatively, if the SCS of the SSB is a second frequency, and the SCS of the CRB is a first frequency, the value of the SSB-subcarrier offset is a value indicated by the (r–1) bits of the seventh parameter.

Alternatively, if the SCS of the SSB is a third frequency, and the SCS of the CRB is a first frequency, the value of the SSB-subcarrier offset is less than or equal to a value indicated by the (r–1) bits of the seventh parameter.

According to a sixth aspect, a communication method is provided. The method is applied to a licensed band. An execution body of the method may be a network device, or may be a chip used in a network device. The following provides descriptions by using an example in which the execution body is the network device.

The network device determines MIB information. The MIB information includes first subcarrier spacing common.

The first subcarrier spacing common is indicated by using r bits, and r is a positive integer greater than or equal to 2.

The network device sends the MIB information to a terminal device.

According to the solution provided in this application, the network device sends the MIB information to the terminal device. The MIB includes the subcarrier spacing common, and the subcarrier spacing common is indicated by using at least two bits. The terminal device can perform timing synchronization based on the received MIB information.

With reference to the sixth aspect, in some possible implementations, the r bits include one initial bit indicating the subcarrier spacing common and (r−1) bits indicating a sixth parameter. The sixth parameter includes at least one of the following parameters:

an SSB-subcarrier offset in the MIB information and a PDCCH-configuration SIB 1 in the MIB information.

With reference to the sixth aspect, in some possible implementations, the PDCCH-configuration SIB 1 includes search space zero and a control resource set zero.

With reference to the sixth aspect, in some possible implementations, the r bits include the initial bit indicating the subcarrier spacing common and the (r−1) bits indicating a seventh parameter. The seventh parameter is any parameter in the sixth parameter, the seventh parameter is indicated by using (s−(r−1)) bits, and s is an initial number indicating the seventh parameter.

According to the solution provided in this application, the subcarrier spacing common in the MIB information can be indicated by using the r bits. The r bits include the initial bit indicating the subcarrier spacing common and the (r−1) bits indicating the seventh parameter. The seventh parameter is indicated by using the (s−(r−1)) bits, and s is the initial number indicating the seventh parameter. In this implementation, the subcarrier spacing common can be indicated by using a corresponding bit of another parameter in the MIB. This can avoid indicating the subcarrier spacing common by expanding a MIB load capacity, thereby improving system performance.

With reference to the sixth aspect, in some possible implementations, the r bits include the initial bit indicating the subcarrier spacing common and the (r−1) bits indicating a seventh parameter. The seventh parameter is any parameter in the sixth parameter, the seventh parameter is indicated by using s bits, and s is an initial number indicating the seventh parameter.

According to the solution provided in this application, the subcarrier spacing common in the MIB information can be indicated by using the r bits. The r bits include the initial bit indicating the subcarrier spacing common and the (r−1) bits indicating the seventh parameter. The seventh parameter is indicated by using the s bits. In this implementation, the subcarrier spacing common can be indicated by using a corresponding bit of another parameter in the MIB. This can avoid indicating the subcarrier spacing common by expanding a MIB load capacity, and does not affect bit indication of the seventh parameter, thereby improving system performance.

With reference to the sixth aspect, in some possible implementations, the seventh parameter is the SSB-subcarrier offset in the MIB information. A value of the SSB-subcarrier offset is determined based on a combination of an SCS of an SSB and an SCS of a CRB.

With reference to the sixth aspect, in some possible implementations, if the SCS of the SSB and the SCS of the CRB each are a first frequency, the value of the SSB-subcarrier offset is determined based on a preset threshold.

Alternatively, if the SCS of the SSB is a second frequency, and the SCS of the CRB is a first frequency, the value of the SSB-subcarrier offset is a value indicated by the (r−1) bits of the seventh parameter.

Alternatively, if the SCS of the SSB is a third frequency, and the SCS of the CRB is a first frequency, the value of the SSB-subcarrier offset is less than or equal to a value indicated by the (r−1) bits of the seventh parameter.

According to a seventh aspect, a communication apparatus is provided. For advantageous effects, refer to the descriptions in the first aspect. Details are not described herein again. The communication apparatus has functions of implementing behavior in the method embodiment in the first aspect. The function may be implemented by hardware, or may be implemented by hardware executing corresponding software. The hardware includes one or more modules corresponding to the foregoing functions. In a possible design, the communication apparatus includes: a transceiver module, configured to receive first information sent by a network device, where the first information includes a Q value or a first parameter, and the first parameter indicates a status of a discovery burst transmission window DBTW; and a processing module, configured to determine the status of the DBTW based on the Q value or the first parameter. These modules may perform corresponding functions in the method example in the first aspect. For details, refer to the detailed descriptions in the method example. Details are not described herein again.

According to an eighth aspect, a communication apparatus is provided. For advantageous effects, refer to the descriptions in the second aspect. Details are not described herein again. The communication apparatus has functions of implementing behavior in the method example in the second aspect. The function may be implemented by hardware, or may be implemented by hardware executing corresponding software. The hardware or the software includes one or more modules corresponding to the foregoing functions. In a possible design, the communication apparatus includes: a processing module, configured to determine first information, where the first information includes a Q value or a first parameter, and the first parameter indicates a status of a discovery burst transmission window DBTW; and a transceiver module, configured to send the first information to a terminal device. These modules may perform corresponding functions in the method example in the second aspect. For details, refer to the detailed descriptions in the method example. Details are not described herein again.

According to a ninth aspect, a communication apparatus is provided. For advantageous effects, refer to the descriptions in the third aspect. Details are not described herein again. The communication apparatus has functions of implementing behavior in the method example in the third aspect. The function may be implemented by hardware, or may be implemented by hardware executing corresponding software. The hardware or the software includes one or more modules corresponding to the foregoing functions. In a possible design, the communication apparatus includes: a transceiver module, configured to receive master information block MIB information sent by a network device, where the MIB information includes a physical downlink control channel-configuration system information block 1 PDCCH-configuration SIB 1, the PDCCH-configuration SIB 1 includes a control resource set zero, the control resource set zero includes a number of resource blocks RBs occupied by the control resource set CORESET #0, and the number of RBs is 96; and a processing module, configured to determine, based on the control resource set zero, a number of consecutive symbols occupied by a type 0-physical down-link control channel type 0-PDCCH. These modules may perform corresponding functions in the method example in the third aspect. For details, refer to the detailed descriptions in the method example. Details are not described herein again.

According to a tenth aspect, a communication apparatus is provided. For advantageous effects, refer to the descriptions in the fourth aspect. Details are not described herein again. The communication apparatus has functions of implementing behavior in the method example in the fourth aspect. The function may be implemented by hardware, or may be implemented by hardware executing corresponding software. The hardware or the software includes one or more modules corresponding to the foregoing functions. In a possible design, the communication apparatus includes: a processing module, configured to determine master information block MIB information, where the MIB information includes a physical downlink control channel-configuration system information block 1 PDCCH-configuration SIB 1, the PDCCH-configuration SIB 1 includes a control resource set zero, the control resource set zero includes a number of resource blocks RBs occupied by the control resource set CORESET #0, and the number of RBs is 96; and a transceiver module, configured to send the MIB information to a terminal device. These modules may perform corresponding functions in the method example in the fourth aspect. For details, refer to the detailed descriptions in the method example. Details are not described herein again.

According to an eleventh aspect, a communication apparatus is provided. For advantageous effects, refer to the description in the fifth aspect. Details are not described herein again. The communication apparatus has functions of implementing behavior in the method example in the fifth aspect. The function may be implemented by hardware, or may be implemented by hardware executing corresponding software. The hardware or the software includes one or more modules corresponding to the foregoing functions. In a possible design, the communication apparatus includes: a transceiver module, configured to receive MIB information sent by a network device, where the MIB information includes subcarrier spacing common, the subcarrier spacing common is indicated by using r bits, and r is a positive integer greater than or equal to 2; and a processing module, configured to perform timing synchronization based on the MIB information. These modules may perform corresponding functions in the method example in the fifth aspect. For details, refer to the detailed descriptions in the method example. Details are not described herein again.

According to a twelfth aspect, a communication apparatus is provided. For advantageous effects, refer to the descriptions in the sixth aspect. Details are not described herein again. The communication apparatus has functions of implementing behavior in the method example in the sixth aspect. The function may be implemented by hardware, or may be implemented by hardware executing corresponding software. The hardware or the software includes one or more modules corresponding to the foregoing functions. In a possible design, the communication apparatus includes: a processing module, configured to determine MIB information, where the MIB information includes first subcarrier spacing common, the first subcarrier spacing common is indicated by using r bits, and r is a positive integer greater than or equal to 2; and a transceiver module, configured to send the MIB information to a terminal device. These modules may perform corresponding functions in the method example in the sixth aspect. For details, refer to the detailed descriptions in the method example. Details are not described herein again.

According to a thirteenth aspect, a communication apparatus is provided. The communication apparatus may be the terminal device in the foregoing method embodiments, or may be a chip disposed in the terminal device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the terminal device in the foregoing method embodiment.

According to a fourteenth aspect, a communication apparatus is provided. The communication apparatus may be the network device in the foregoing method embodiments, or may be a chip disposed in the network device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by the network device in the foregoing method embodiment.

According to a fifteenth aspect, a computer program product is provided. The computer program product includes computer program code. When the computer program code is run, the methods performed by the terminal device in the foregoing aspects are performed.

According to a sixteenth aspect, a computer program product is provided. The computer program product includes computer program code. When the computer program code is run, the methods performed by the network device in the foregoing aspects are performed.

According to a seventeenth aspect, this application provides a chip system. The chip system includes a processor, configured to implement functions of the terminal device in the methods in the foregoing aspects. In a possible design, the chip system further includes a memory, configured to store program instructions and/or data. The chip system may include a chip, or may include a chip and another discrete component.

According to an eighteenth aspect, this application provides a chip system. The chip system includes a processor, configured to implement functions of the network device in the methods in the foregoing aspects. In a possible design, the chip system further includes a memory, configured to store program instructions and/or data. The chip system may include a chip, or may include a chip and another discrete component.

According to a nineteenth aspect, this application provides a computer-readable storage medium. The computer-readable storage medium stores a computer program. When the computer program is run, the methods performed by the terminal device in the foregoing aspects are implemented.

According to a twentieth aspect, this application provides a computer-readable storage medium. The computer-readable storage medium stores a computer program. When the computer program is run, the methods performed by the network device in the foregoing aspects are implemented.

BRIEF DESCRIPTION OF DRAWINGS

FIG. 10 is a schematic flowchart of another communication method according to an embodiment of this application;

DESCRIPTION OF EMBODIMENTS

The following describes technical solutions of this application with reference to accompanying drawings.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a 5th generation (5th generation, 5G) mobile communication system or a new radio (new radio, NR) communication system, and a future mobile communication system.

Figures 1, 2:
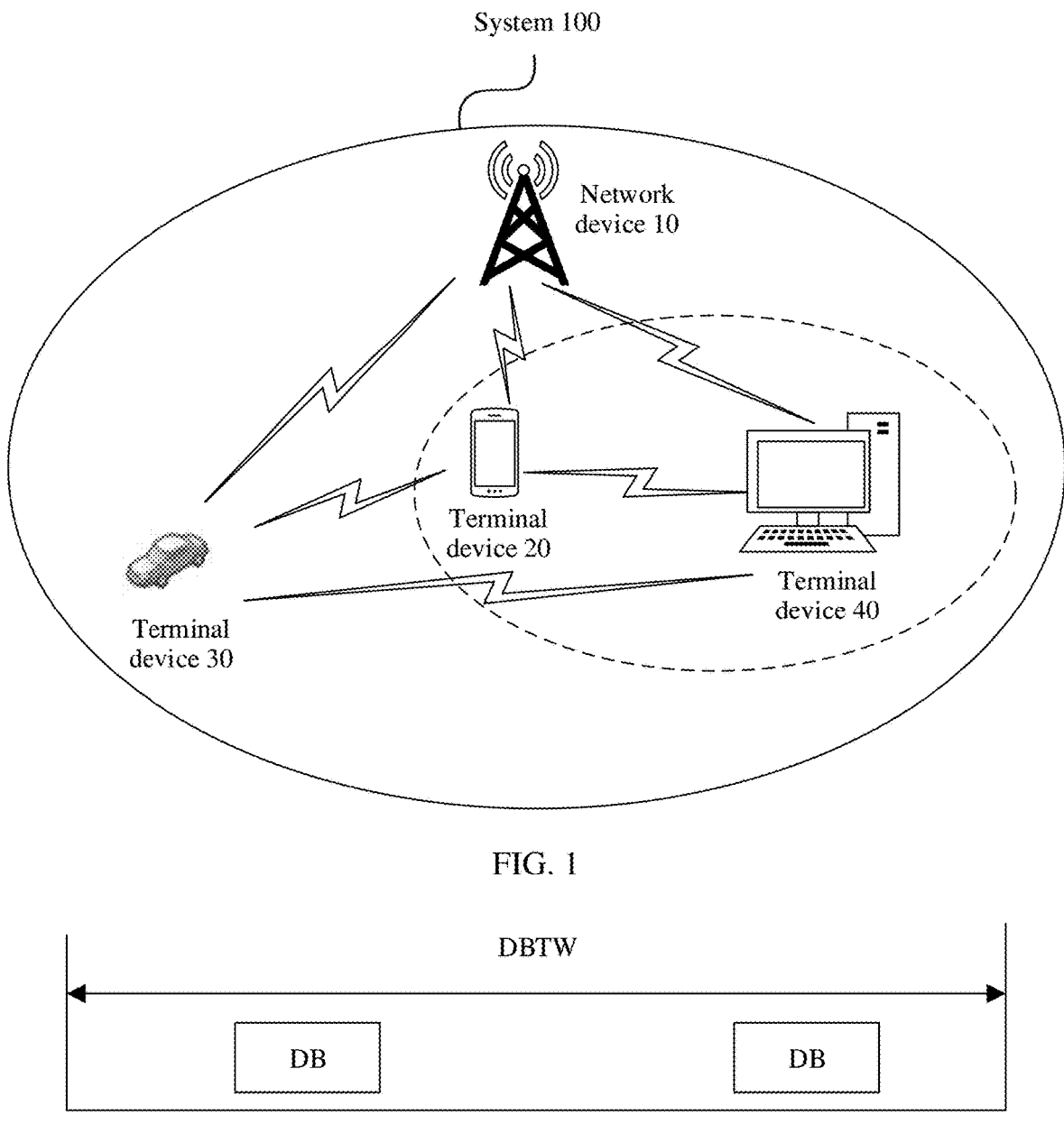
FIG. 1 is a schematic diagram based on a communication system according to an embodiment of this application.
FIG. 2 is a schematic diagram of a relationship between a DBTW and a DB in time domain according to an embodiment of this application.

FIG. 1 is a schematic diagram of a wireless communication system 100 applicable to an embodiment of this application. As shown in FIG. 1, the wireless communication system 100 may include one or more network devices, for example, a network device 10 shown in FIG. 1. The wireless communication system 100 may further include one or more terminal devices, for example, a terminal device 20, a terminal device 30, and a terminal device 40 shown in FIG. 1.

It should be understood that FIG. 1 is merely a schematic diagram. The communication system may further include another network device, for example, may further include a core network device, a wireless relay device, and a wireless backhaul device, which are not shown in FIG. 1. Numbers of network devices and terminal devices included in the mobile communication system are not limited in embodiments of this application.

In the mobile communication system 100, the terminal device 20, the terminal device 30, and the terminal device 40 in this embodiment of this application each may also be referred to as a terminal, a terminal device, a mobile station (mobile station, MS), a mobile terminal (mobile terminal, MT), or the like. The terminal device in embodiments of this application may be a mobile phone (mobile phone), a tablet computer (Pad), or a computer with a wireless transceiver function, or may be a wireless terminal applied to a scenario, for example, virtual reality (virtual reality, VR), augmented reality (augmented reality, AR), industrial control (industrial control), self driving (self driving), remote medical (remote medical), a smart grid (smart grid), transportation safety (transportation safety), a smart city (smart city), or a smart home (smart home). In this application, the terminal device and a chip that can be applied to the terminal device are collectively referred to as a terminal device. It should be understood that a specific technology used by and a specific device form of the terminal device are not limited in embodiments of this application.

The network device 10 in embodiments of this application may be a device configured to communicate with the terminal device. The network device may be a base station, an evolved NodeB (evolved Node B, eNB), a home base station, an access point (access point, AP) in a wireless fidelity (wireless fidelity, Wi-Fi) system, a wireless relay node, a wireless backhaul node, a transmission point (transmission point, TP), a transmission and reception point (transmission and reception point, TRP), or the like, or may be a gNB in an NR system, or may be a component or a part of a device that constitutes a base station, for example, a central unit (central unit, CU), a distributed unit (distributed unit, DU), or a baseband unit (baseband unit, BBU). It should be understood that a specific technology used by and a specific device form of the network device are not limited in embodiments of this application. In this application, the network device may be a network device, or may be a chip used in the network device to complete a wireless communication processing function.

It should be understood that, in embodiments of this application, the terminal device or the network device includes a hardware layer, an operating system layer running at the hardware layer, and an application layer running at the operating system layer. The hardware layer includes hardware such as a central processing unit (central processing unit, CPU), a memory management unit (memory management unit, MMU), and a memory (which may also be referred to as a main memory). An operating system may be any one or more types of computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be the terminal device or the network device, or a functional module that can invoke and execute the program in the terminal device or the network device.

It should be further understood that the terminal device 20 to the terminal device 40 each may communicate with the network device 10. Link environments of the terminal device 20 to the terminal device 40 each include uplink transmission, downlink transmission, and side-link (side-link) transmission. Information transmitted in link transmission may include actually transmitted data information and control information that indicates or is used to schedule actual data. In addition, for example, the terminal device 20 and the terminal device 40 may also constitute a communication system. A link transmission environment of the communication system is consistent with the foregoing descriptions, and specific information may be exchanged based on a network configuration manner.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable storage medium may include but is not limited to a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive).

In addition, various storage media described in this specification may represent one or more devices and/or other machine-readable storage media that are configured to store information. The term "machine-readable storage media" may include but is not limited to a radio channel, and various other media that can store, include, and/or carry instructions and/or data.

It should be understood that division of manners, cases, types, and embodiments in embodiments of this application are merely for ease of description, but should not constitute any limitation, and features in various manners, types, cases, and embodiments may be combined when there is no contradiction.

It should be further understood that the terms "first", "second", and "third" in embodiments of this application are merely used for distinguishing, and should not be construed as any limitation on this application. For example, "first information" and "second information" in embodiments of this application indicate information transmitted between the network device and the terminal device.

It should be further understood that sequence numbers of the processes do not mean execution sequences in various embodiments of this application. The execution sequences of the processes should be determined based on functions and internal logic of the processes, and should not be construed as any limitation on the implementation processes of embodiments of this application.

It should be further noted that, in embodiments of this application, "presetting", "predefining", or the like may be implemented by pre-storing corresponding code or a table in a device (for example, including the terminal device and the network device), or in another manner that may indicate related information. A specific implementation of "presetting", "predefining", or the like is not limited in this application, for example, a preset rule or a preset constant in embodiments of this application.

It should be further noted that the term "and/or" describes an association relationship between associated objects and represents that three relationships may exist. For example, A and/or B may represent the following three cases: Only A and/or B may represent the following three cases: Only A exists, both A and B exist, and only B exists. The character "/" generally indicates an "or" relationship between associated objects.

As described above, the technical solutions of this application may be applied to the NR communication system. With technology evolution, available bands continuously increase. In NR, a band is mainly divided into two parts: a frequency range 1 (frequency range 1, FR 1) and an FR 2. The FR 1 is mainly a bandwidth of 450 MHz to 6 GHz, and the FR 2 is mainly a bandwidth of 24.25 GHz to 52.6 GHz.

In addition, a band of 52.6 GHz to 71 GHz (above 52.6 GHz for short) is also included in a use range of a post fifth generation mobile communication system (a beyond 5.5G system). This band includes a licensed band and an unlicensed band (the unlicensed band may also be referred to as a shared band).

In China, a band ranging from 59 GHz to 64 GHz is the unlicensed band, and the remaining is the licensed band. In the United States of America, a band ranging from 57 GHz to 71 GHz is the unlicensed band.

Under a background framework of a fifth generation mobile communication technology, technologies deployed on the shared band are collectively referred to as a radio unlicensed (new radio unlicensed, NRU) band technology. In addition to the NR system, other systems such as radio detection and ranging (radio detection and ranging, radar), wireless fidelity (wireless fidelity, Wi-Fi), and Bluetooth, and another inter-operator access system may be further included on the shared band. Therefore, a system operating on the shared band needs to support all or some of the following key technologies: LBT, transmit power control (transmit power control, TPC), and dynamic frequency selection (dynamic frequency selection, DFS).

An LBT mechanism means that, before using a channel, various access devices need to first obtain an interference status of a band on which a target channel is located, and the channel can be used only when an interference level of the channel on the target band is less than or equal to a preset threshold.

A TPC mechanism means that, to avoid affecting a normal communication state of another access device, a sending device operating on the shared band cannot increase transmit power of the sending device without limitation.

A DFS mechanism means that a system operating on the shared band needs to avoid, in a timely manner, a band on which a high-priority system is located, and dynamically switch to a band with lower interference to work.

A receiving device (for example, ULE) that accesses different types of bands first detects an SSB sent by a base station. The SSB mainly includes a primary synchronization signal (primary synchronization signal, PSS), a secondary synchronization signal (secondary synchronization signal, SSS), and a PBCH, and includes four orthogonal frequency division multiplexing (orthogonal frequency division multiplexing, OFDM) symbols in time domain and a two-dimensional area of 20 resource blocks (resource blocks, RBs) in frequency domain. The UE may complete cell synchronization and rough symbol-level timing synchronization by demodulating the PSS and the SSS, and can complete timing synchronization at a system frame level by demodulating master information block (master information block, MIB) information carried in the PBCH, and obtain related configuration information of a system information block 1/remaining minimum system information (system information block/remaining minimum system information, SIB 1/RMSI), that is, demodulate a type 0-physical downlink control channel (type 0-physical downlink control channel, type 0-PDCCH) and a physical downlink shared channel (physical downlink shared channel, PDSCH) of the SIB 1/RMSI by using a parameter (pdcch-ConfigSIB1). A control resource set (control resource set, CORESET) #0 is located on the type 0-PDCCH.

The MIB information carried in the PBCH includes the following parameters:

```
MIB ::=                          SEQUENCE{
    systemFrameNumber                BIT STRING {SIZE (6)},
    subCarrierSpacingCommon          ENUMERATED {SCS15or60,
SCS30or120},
    ssb-SubcarrierOffset             INTEGER (0...15),
    dmrs-TypeA-Position              ENUMERATED {pos2, pos3},
    pdcch-ConfigSIB1                 PDCCH-ConfigSIB1,
    cellBarred                       ENUMERATED {barred, notBarred},
    intraFreqReselection             ENUMERATED {allowed, notAllowed},
    spare                            BIT STTRING (SIZE (1))
}
```

A system frame number ("systemFrameNumber") indicates six least significant bits of a system frame. Subcarrier spacing common ("subCarrierSpacingCommon") indicates subcarriers of the SIB 1, a message 2/4 (Msg.2/4), and on-demand information (on-demand information, OSI). An SSB-subcarrier offset (ssb-SubcarrierOffset") indicates an offset between the SSB and a subcarrier #0 in a common resource block (common resource block, CRB). A demodulation reference signal-type A-position ("dmrs-TypeA-Position") indicates a position of a $1^{st}$ DMRS. A PDCCH-configuration SIB 1 ("pdcch-ConfigSIB1") indicates parameter configurations of a CORESET, search space, and a related PDCCH. Cell barring ("cellBarred") indicates whether the terminal device is allowed to access a cell. Intra-frequency reselection ("intraFreqReselection") indicates cell selection or reselection of the terminal device on a band. Spare ("spare") is a remaining bit that is temporarily not used.

A same parameter in the MIB information represents different content on the licensed band and the shared band. For the system operating on the shared band, in consideration of existence of the LBT mechanism, the base station cannot send a specified SSB at a specified position. Therefore, a new Q value (namely, $$N_{SSB}^{QCL})$$

is defined, may be represented by using two bits, and may have a value being {1, 2, 4, 8}. The UE may calculate, by demodulating the Q value and based on a DMRS sequence, a plurality of candidate positions for sending a same SSB index. These candidate positions are understood as having a same quasi co-location (quasi co-location, QCL) relationship for the UE, for example, corresponding to a same downlink beam direction.

For the LBT mechanism in the system on the shared band, an R16 NRU system newly defines a DBTW and a DB. The DB includes a group of downlink (down link, DL) transmission signals, for example, an SS/PBCH block and the RMSI information. In this design, the base station can pack the SS/PBCH block and the RMSI in a DB manner by using a single LBT mechanism and send the packed SS/PBCH block and RMSI at the same time.

A relationship between the DBTW and the DB in time domain is shown in FIG. 2. Refer to FIG. 2. It can be learned that the DB sent by the base station may appear at different positions within the DBTW.

For discussions about the DB and the DBTW, the discussion results of the RAN1 104e meeting are as follows:

For an unlicensed band that requires LBT, further study whether/how to support discovery burst (DB) and discovery burst transmission window (DBTW) at least for 120 kHz SSB SCS If DB supported FFS: What signals/channels are included in DB other than SS/PBCH block If DBTW is supported Support mechanism to indicate or inform that DBTW is enabled/disabled for both IDLE and CONNECTED mode UEs FFS: how to support UEs performing initial access that do not have any prior information on DBTW.

PBCH payload size is not greater than that for FR 2

The following points are additionally FFS:

How to indicate candidate SSB indices and QCL relation without exceeding limit on PBCH payload size Details of the mechanism for enabling/disabling DBTW considering LBT exempt operation and overlapping licensed/unlicensed bands For an unlicensed band that requires LBT, further study whether/how to support the DB and the DBTW at least for a 120 kHz SSB SCS.

If the DB is supported

FFS: What signals/channels are included in the DB other than the SS/PBCH block

If the DBTW is supported

A support mechanism to indicate or inform that the DBTW is enabled/disabled for UEs in IDLE and connected modes FFS: how to support the UEs, that do not have any prior information on the DBTW, in performing initial access A PBCH payload size is not greater than that for the FR 2.

The following points are additionally FFS:

How to indicate a candidate SSB index and the QCL relationship without exceeding a limit on the PBCH payload size Details of a mechanism for enabling/disabling the DBTW considering an LBT exempt operation and overlapping licensed/unlicensed bands Due to the LBT mechanism on the shared band, when the network device does not need to perform LBT before sending the DB, it may be considered that the DBTW is disabled; otherwise, it is considered that the DBTW is in an enabled state. However, the terminal device does not know a status of the DBTW, and therefore cannot implement fast timing synchronization with the network device.

Therefore, this application provides a communication method, so that a terminal device can determine a status of a DBTW, to quickly implement timing synchronization with a network device.

Figure 3:
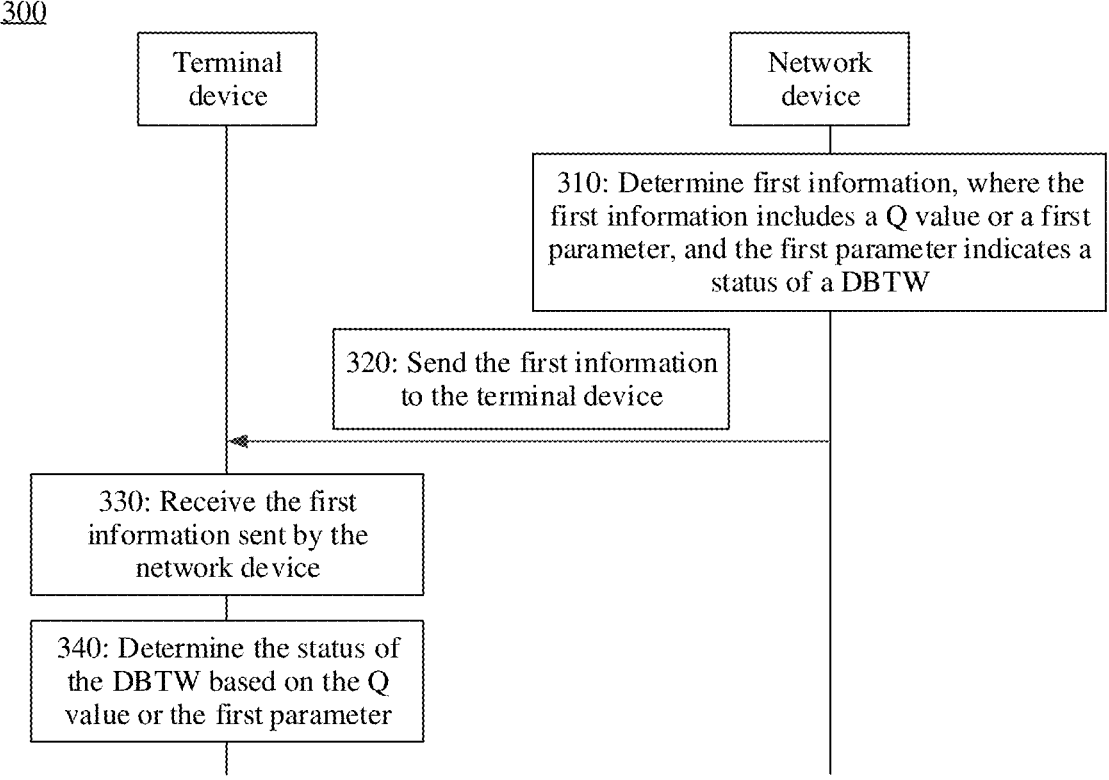
FIG. 3 is a schematic flowchart of a communication method according to an embodiment of this application.

FIG. 3 is a schematic flowchart of a communication method according to an embodiment of this application. The method may be performed by a terminal device and a network device, or may be performed by a chip in a terminal device and a chip in a network device. The communication method 300 may be applied to an unlicensed band. The communication method 300 may include the following steps.

310: The network device determines first information, where the first information includes a Q value or a first parameter, and the first parameter indicates a status of a DBTW.

320: The network device sends the first information to the terminal device.

The steps 310 and 320 may be performed by the network device 10 in FIG. 1.

330: The terminal device receives the first information sent by the network device.

340: The terminal device determines the status of the DBTW based on the Q value or the first parameter.

The steps 330 and 340 may be performed by any one or more of the terminal device 20 to the terminal device 40 in FIG. 1.

Optionally, in some embodiments, the first information in this application may be the foregoing SSB. The SSB includes a PBCH, and the PBCH carries MIB information including the Q value.

As described above, a terminal device that accesses different types of bands may detect the SSB sent by the network device. The SSB includes the PBCH. The terminal device may complete timing synchronization by demodulating the MIB information carried in the PBCH. In this embodiment of this application, the terminal device can determine the status of the DBTW based on the Q value in the MIB information, to quickly implement timing synchronization with the network device.

According to the solution provided in this embodiment of this application, the terminal device can determine the status of the DBTW based on the first information sent by the network device, therefore can determine whether the network device sends, within the DBTW, an SSB that cannot be sent due to an LBT failure, and further, can quickly implement timing synchronization with the network device.

It is mentioned above that the terminal device can determine the status of the DBTW based on the Q value or the first parameter. The following first describes a case in which the terminal device determines the status of the DBTW based on the Q value.

Optionally, in some embodiments, the determining the status of the DBTW based on the Q value includes:

if the Q value is greater than or equal to a first threshold, determining that the DBTW is in a disabled state; or if the Q value is less than a first threshold, determining the status of the DBTW based on a DBTW value.

In this embodiment of this application, the terminal device may determine the status of the DBTW based on a value relationship between the Q value and the first threshold. For details, refer to Case 1 and Case 2 in the following.

Case 1: Q is greater than or equal to the first threshold, and the terminal device determines that the DBTW is in the disabled state.

For example, it is assumed that the first threshold is 64, and if Q sent by the network device to the terminal device is 128, that is, the value is greater than the first threshold, the terminal device may consider that the DBTW is in the disabled state.

It should be noted that, in Case 1, regardless of a frequency (for example, 120 kHz, 480 kHz, or 960 kHz) at which an SCS of the SSB is, provided that Q is greater than or equal to the first threshold, the terminal device can consider that the DBTW is in the disabled state, that is, the network device does not send, within the DBTW, the SSB that is actually not sent due to the LBT failure.

Case 2: Q is less than 64, and the terminal device determines to determine the status of the DBTW based on the DBTW value.

(1) If the DBTW value is less than or equal to a second threshold, the terminal device determines that the DBTW is in the disabled state.

(2) If the DBTW value is greater than a second threshold, the terminal device determines that the DBTW is in an enabled state.

For example, if Q sent by the network device to the terminal device is 32, that is, Q sent by the network device to the terminal device is less than the first threshold, the terminal device may further determine the status of the DBTW based on the DBTW value.

①If an SCS of the SSB is 120 kHz, and the DBTW value configured by the network device for the terminal device is less than or equal to 2.5 ms or 2.25 ms (for example, the DBTW value configured by the network device is 2.0 ms), the terminal device may consider that the DBTW is in the disabled state. If the DBTW value configured by the network device for the terminal device is greater than 2.5 ms or 2.25 ms (for example, the DBTW value configured by the network device is 3.0 ms), the terminal device may consider that the DBTW is in the enabled state.

②If an SCS of the SSB is 480 kHz or 960 kHz, and the DBTW value configured by the network device for the terminal device is less than or equal to 0.5 ms or 0.25 ms (for example, the DBTW value configured by the network device is 0.2 ms), the terminal device may consider that the DBTW is in the disabled state. If the DBTW value configured by the network device for the terminal device is greater than 0.5 ms or 0.25 ms (for example, the DBTW value configured by the network device is 1.0 ms), the terminal device may consider that the DBTW is in the enabled state.

It should be noted that the first threshold and/or the second threshold in this embodiment of this application may be specified in a protocol, or may be configured by the network device. This is not limited. It should be understood that the first threshold may be a number of candidate SSBs within the DBTW.

In other words, if Q is greater than or equal to the number of candidate SSBs within the DBTW, UE considers that the DBTW is disabled. If Q is less than the number of candidate SSBs within the DBTW, UE may consider that the DBTW is enabled. A related expression in English may be as follows.

If Q is larger than or equals to the number of candidate SSBs within a DBTW, UE assumes that DBTW is disabled.

If Q is smaller than the number of candidate SSBs within a DBTW, UE assumes that DBTW is enabled.

If the second threshold is configured by the network device, the network device may define the second threshold by using a parameter "discovery burst window length"

(discoveryburst-windowlength) or a parameter "discovery burst window length-r17" (discoveryburst-windowlength-r17) in RRC signaling.

The following Table 1 through Table 4 show several possible manners of representing the Q value and a corresponding DBTW provided in this embodiment of this application.

TABLE 1

| Bit/index | Q value | DBTW value (ms) at 120 kHz/480 kHz/960 kHz | Note |
|---|---|---|---|
| 000/0 | 8 | 0.5/0.125/0.075 | When a DBTW configured by |
| 001/1 | 16 | 1/0.25/0.125 | a base station is not greater |
| 010/2 | 32 | 2.5 or 2.25/0.5/0.25 | than a value listed in the table, |
| 011/3 | 64 | 5/1/0.5 | the UE considers by default |
| 100/4 | >64 (for example, 128 or 256) | Not greater than 5/1/0.5 | that the DBTW is disabled. Otherwise, the UE considers by default that the DBTW |
| 101/5 | Reserved (reserved) | Reserved (reserved) | is enabled. |
| 110/6 | Reserved (reserved) | Reserved (reserved) | |
| 111/7 | Reserved (reserved) | Reserved (reserved) | |

TABLE 2

| Bit/index | Q value | DBTW value (ms) at 120 kHz/480 kHz/960 kHz | Note |
|---|---|---|---|
| 000/0 | 1 | 0.075/0.01875/0.009375 | When a DBTW configured |
| 001/1 | 2 | 0.125/0.0375/0.01875 | by a base station is not |
| 010/2 | 4 | 0.25/0.075/0.0375 | greater than a value listed |
| 011/3 | 8 | 0.5/0.125/0.075 | in the table, the UE |
| 100/4 | 16 | 1/0.25/0.125 | considers by default that |
| 101/5 | 32 | 2.5 or 2.25/0.5/0.25 | the DBTW is disabled. |
| 110/6 | 64 | 5/1/0.5 | Otherwise, the UE |
| 111/7 | >64 (for example, 128 or 256) | Not greater than 5/1/0.5 | considers by default that the DBTW is enabled. |

TABLE 3

| Bit/index | DBTW value (ms) | SCS (kHz) | DBTW length (slots) | Q |
|---|---|---|---|---|
| 000/0 | 0.5 | 120 | 4 | 8 |
| | | 480 | 16 | 32 |
| | | 960 | 32 | 64 |
| 001/1 | 1 | 120 | 8 | 16 |
| | | 480 | 32 | 64 |
| | | 960 | 64 | 128 |
| 010/2 | 2 | 120 | 16 | 28 |
| | | 480 | 64 | 112 |
| | | 960 | 128 | 224 |
| 011/3 | 2.25/2.5 | 120 | 18/20 | 32 |
| | | 480 | 72/80 | 128 |
| | | 960 | 144/160 | 256 |
| 100/4 | 3 | 120 | 24 | 40 |
| | | 480 | 96 | 320 |
| | | 960 | 192 | 640 |
| 101/5 | 3.5 | 120 | 28 | 48 |
| | | 480 | 112 | 192 |
| | | 960 | 224 | 384 |
| 110/6 | 4 | 120 | 32 | 52 |
| | | 480 | 128 | 208 |
| | | 960 | 256 | 416 |
| 111/7 | 5 | 120 | 40 | 64 |
| | | 480 | 320 | 256 |
| | | 960 | 640 | 512 |

TABLE 4

| Bit/index | DBTW value (ms) | SCS (kHz) | DBTW length (slots) | Q |
|---|---|---|---|---|
| 000/0 | 0.5 | 120 | 4 | 8 |
| | | 480 | 16 | 32 |
| | | 960 | 32 | 64 |
| 001/1 | 1 | 120 | 8 | 16 |
| | | 480 | 32 | 64 |
| | | 960 | 64 | 128 |
| 010/2 | 2 | 120 | 16 | 28 |
| | | 480 | 64 | 112 |
| | | 960 | 128 | 224 |
| 011/3 | 2.25/2.5 | 120 | 18/20 | 32 |
| | | 480 | 72/80 | 128 |
| | | 960 | 144/160 | 256 |
| 100/4 | 3 | 120 | 24 | 40 |
| | | 480 | 96 | 320 |
| | | 960 | 192 | 640 |
| 101/5 | 4 | 120 | 32 | 52 |
| | | 480 | 128 | 208 |
| | | 960 | 256 | 416 |
| 110/6 | 5 | 120 | 40 | 64 |
| | | 480 | 320 | 256 |
| | | 960 | 640 | 512 |
| 111/7 | >5 ms | 120 | >40 | >64 |
| | | 480 | >320 | >256 |
| | | 960 | >640 | >512 |

Optionally, in some embodiments, the Q value and the DBTW value are carried in serving cell configuration common in RRC signaling or a serving cell configuration common SIB in SIB 1 information. In this case, Discovery-BurstWindowLength-r17={ms0dot5, ms1, ms2, ms2dot25, ms2dot5, ms3, ms3dot5, ms4, ms5}.

In Table 1 through Table 4, the Q value may be indicated by using three bits, but a same index may correspond to different Q values, and thresholds of corresponding DBTW values may also be different.

Specifically, in Table 1, a Q value corresponding to an index "0" is 8, and a threshold of a corresponding DBTW value when the SCS of the SSB is 120 kHz, 480 kHz, or 960 kHz is 0.5 ms, 0.125 ms, or 0.075 ms. In other words, if the Q value sent by the network device to the terminal device is 8, in a possible implementation, the terminal device may receive the Q value at a frequency of 120 kHz. If the DBTW value configured by the network device is 0.4 ms, because 0.4 ms is less than the corresponding threshold 0.5 ms at 120 kHz, the terminal device may consider that the DBTW is in the disabled state. If the DBTW value configured by the network device is 0.6 ms, because 0.6 ms is greater than the corresponding threshold 0.5 ms at 120 kHz, the terminal device may consider that the DBTW is in the enabled state.

In another possible implementation, the terminal device may alternatively receive the Q value at a frequency of 480 kHz. If the DBTW value configured by the network device is 0.1 ms, because 0.1 ms is less than the corresponding threshold 0.125 ms at 480 kHz, the terminal device may consider that the DBTW is in the disabled state. If the DBTW value configured by the network device is 0.2 ms, because 0.2 ms is greater than the corresponding threshold 0.125 ms at 480 kHz, the terminal device may consider that the DBTW is in the enabled state.

In another possible implementation, the terminal device may alternatively receive the Q value at a frequency of 960 kHz. If the DBTW value configured by the network device is 0.05 ms, because 0.05 ms is less than the corresponding threshold 0.075 ms at 960 kHz, the terminal device may consider that the DBTW is in the disabled state. If the DBTW value configured by the network device is 0.1 ms, because 0.1 ms is greater than the corresponding threshold 0.075 ms at 960 kHz, the terminal device may consider that the DBTW is in the enabled state.

In Table 2, a Q value corresponding to an index "0" is 1, and a threshold of a corresponding DBTW value when the SCS of the SSB is 120 kHz, 480 kHz, or 960 kHz is 0.075 ms, 0.01875 ms, or 0.09375 ms. In other words, if the Q value sent by the network device to the terminal device is 1, in a possible implementation, the terminal device may receive the Q value at a frequency of 120 kHz. If the DBTW value configured by the network device is 0.05 ms, because 0.05 ms is less than the corresponding threshold 0.075 ms at 120 kHz, the terminal device may consider that the DBTW is in the disabled state. If the DBTW value configured by the network device is 0.1 ms, because 0.1 ms is greater than the corresponding threshold 0.075 ms at 120 kHz, the terminal device may consider that the DBTW is in the enabled state.

In another possible implementation, the terminal device may alternatively receive the Q value at a frequency of 480 kHz. If the DBTW value configured by the network device is 0.01 ms, because 0.01 ms is less than the corresponding threshold 0.01875 ms at 480 kHz, the terminal device may consider that the DBTW is in the disabled state. If the DBTW value configured by the network device is 0.02 ms, because 0.02 ms is greater than the corresponding threshold 0.01875 ms at 480 kHz, the terminal device may consider that the DBTW is in the enabled state.

In another possible implementation, the terminal device may alternatively receive the Q value at a frequency of 960 kHz. If the DBTW value configured by the network device is 0.05 ms, because 0.05 ms is less than the corresponding threshold 0.09375 ms at 960 kHz, the terminal device may consider that the DBTW is in the disabled state. If the DBTW value configured by the network device is 0.1 ms, because 0.1 ms is greater than the corresponding threshold 0.09375 ms at 960 kHz, the terminal device may consider that the DBTW is in the enabled state.

Similarly, content in Table 3 and Table 4 is similar to the foregoing descriptions. For brevity, details are not described again.

It should be noted that the several representation manners shown in Table 1 through Table 4 are merely examples for description, and may be other possible representation manners. This is not limited.

In some embodiments, a slot occupied by the DBTW, the configured Q value, and the DBTW value may alternatively be determined based on a ratio factor. It is assumed that the Q value, a number of slots occupied by the DBTW, a number of symbols occupied by the DBTW, and the DBTW value are respectively A, B, C, and D, and values of A, B, C, and D are based on a first SCS (for example, 120 kHz). For a second SCS, when a ratio between the second SCS and the first SCS is X, a Q value, a number of slots occupied by the DBTW, a number of symbols occupied by the DBTW, and a DBTW value that are at the second SCS are respectively represented as follows: A×X, B×X, C×X×14, and D/X.

For example, when the first SCS is 120 kHz and the second SCS is 480 kHz, the ratio factor X=4. When the first SCS is 120 kHz and the second SCS is 960 kHz, the ratio factor X=8. Alternatively, when the first SCS is 480 kHz and the second SCS is 960 kHz, the ratio factor X=2. When the first SCS is 480 kHz and the second SCS is 120 kHz, the ratio factor X=1/4. When the first SCS is 960 kHz and the second SCS is 120 kHz, the ratio factor X=1/8. When the first SCS is 960 kHz and the second SCS is 480 kHz, the ratio factor X=1/2.

For example, as shown in Table 4, when the first SCS is 120 kHz, the number of slots occupied by the DBTW is 4, the configured Q is 8, the DBTW value is 0.5 ms, and the number of symbols occupied by the DBTW is 0.5×16=8. When the second SCS is 480 kHz, the ratio factor is X=4. When the DBTW value is fixed, the number of slots occupied by the DBTW is 4×4=16, the configured Q value is 8×X=32, and the number of symbols occupied by the DBTW is 8×4×14=448.

In an implementation, the terminal device implicitly obtains the ratio factor based on the second SCS supported in a band range supported by a serving cell that the terminal device accesses, or implicitly obtains, through calculation based on the ratio factor, the Q value, the number of slots occupied by the DBTW, the number of symbols occupied by the DBTW, and the DBTW value that are at the second SCS.

Optionally, in some embodiments, the ratio factor may be defined in the parameter "serving cell configuration common" included in the RRC signaling, or may be carried in the parameter "serving cell configuration common SIB", or may be configured in the MIB. This is not limited.

It should be understood that "greater than or equal to" mentioned above may also be represented by "not less than" or "greater than or equal to", and "less than or equal to" mentioned above may also be represented by "not greater than" or "less than or equal to". This is not limited.

Figure 4:
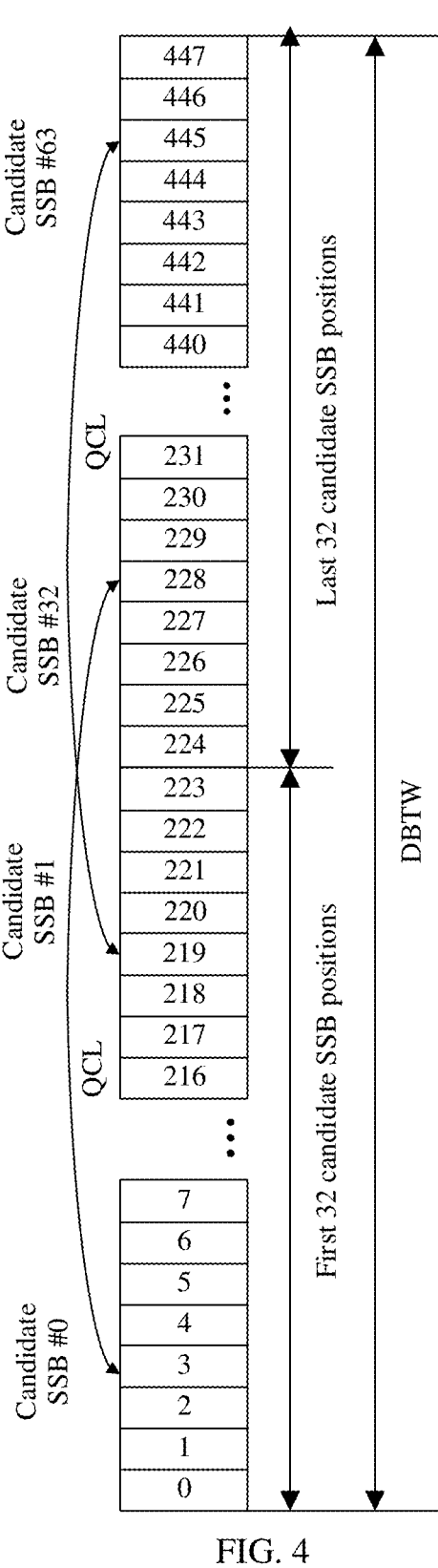
FIG. 4 is a schematic diagram of a manner of sending an SSB according to an embodiment of this application.

FIG. 4 is a schematic diagram of a manner of sending an SSB (when a DBTW is in an enabled state) according to an embodiment of this application. Refer to FIG. 4. It is assumed that Q=32, and the DBTW=5 ms. Therefore, within the DBTW, last 32 candidate SSB positions may be used to send an actual SSB that cannot be sent due to an LBT failure.

SSBs at different candidate SSB positions have a first QCL relationship, and the first QCL relationship may indicate that the SSBs at the different candidate SSB positions have a same index.

Figure 5:
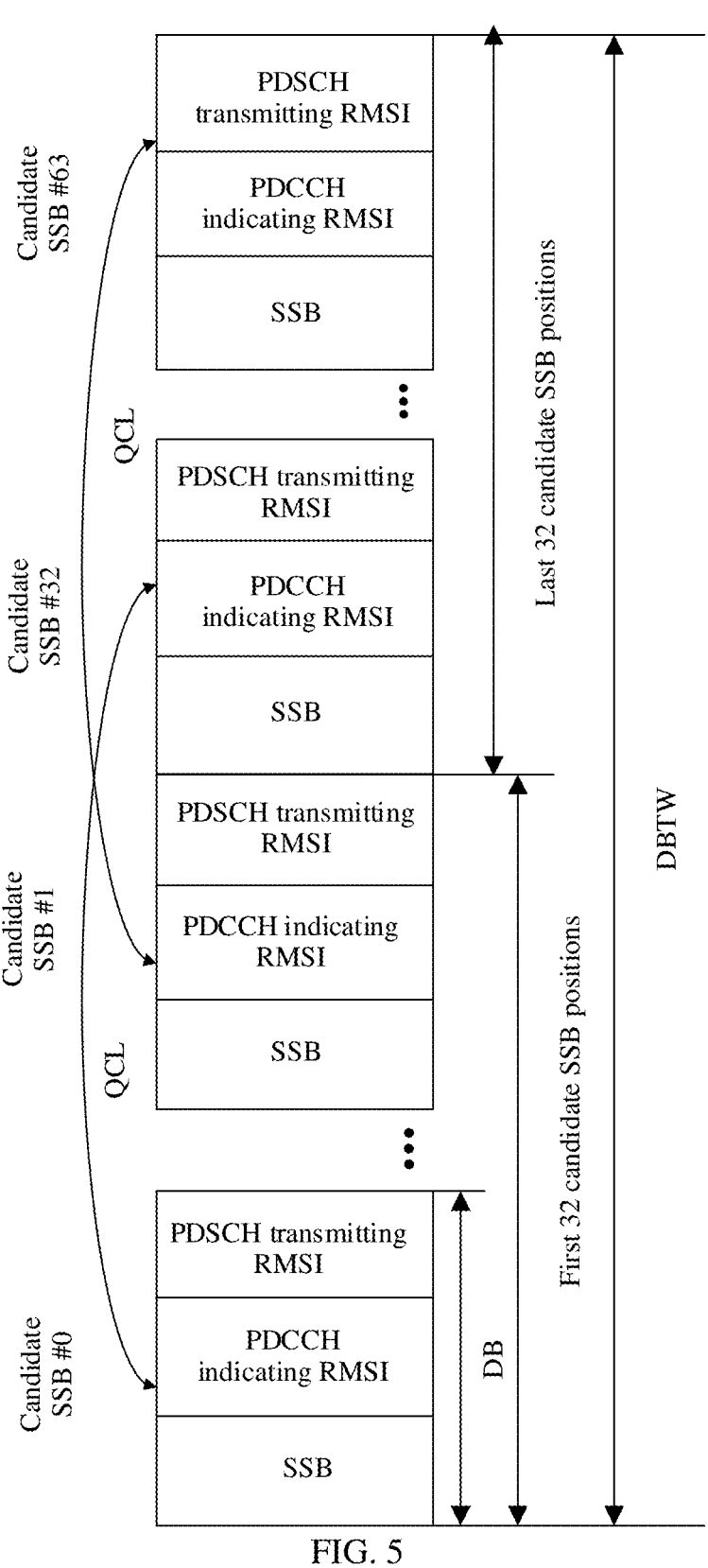
FIG. 5 is a schematic diagram of a manner of sending a DB according to an embodiment of this application.

A manner of cyclically placing the SSB and corresponding RMSI that have a second QCL relationship is shown in FIG. 5.

In FIG. 5, a PDCCH indicating the RMSI ("RMSI for PDCCH") represents a type 0-PDCCH carrying a CORE-SET #0, and includes related configuration information indicating the RMSI (or a SIB 1). A PDSCH channel transmitting the RMSI ("RMSI for PDSCH") represents a PDSCH channel transmitting the RMSI (or the SIB 1). There is the second QCL relationship between the SSB, the type 0-PDCCH, and the RMSI PDSCH. Different from the first QCL relationship, the second QCL relationship is used between the SSB, the type 0-PDCCH, and the RMSI PDSCH. The terminal device receives, by using a same receive beam, the SSB and the type 0-PDCCH and the RMSI PDSCH that meet the second QCL relationship.

FIG. 5 shows only one coexistence manner of the SSB, the type 0-PDCCH, and the RMSI for PDSCH. The type 0-PDCCH, the SSB, and the RMSI for PDSCH may exist in any TDM or FDM manner. A time domain position of the type 0-PDCCH may be before or after the SSB, but is generally located on or in one or more symbols or slots before the RMSI for PDSCH.

According to the solution provided in this application, the terminal device determines the status of the DBTW based on the value relationship between the Q value and the first threshold. If the status of the DBTW cannot be determined, the terminal device can further determine the status of the DBTW based on the DBTW value. In this way, it can be determined whether the network device sends, within the DBTW, the SSB that cannot be sent due to the LBT failure, to quickly implement timing synchronization with the network device.

As described above, if the DBTW value is less than or equal to the second threshold, the terminal device may consider that the DBTW is in the disabled state, or if the DBTW value is greater than the second threshold, the terminal device may consider that the DBTW is in the enabled state. The second threshold may be determined in the following manner.

Manner 1

The second threshold is time duration from a $1^{st}$ symbol in a slot in which a first SSB is located to a last symbol in a slot in which a second SSB is located. An index of the first SSB is 0, and an index of the second SSB is (Q–1).

Alternatively, the second threshold is time duration from a $1^{st}$ symbol in a slot in which a third SSB is located to a last symbol in a slot in which a fourth SSB is located. The third SSB is located in a first SSB group, and the fourth SSB is located in a second SSB group. The first SSB group is a $1^{st}$ group whose bit is configured as "1" from the left in a second parameter. The second SSB group is a $1^{st}$ group whose bit is configured as "1" from the right in the second parameter.

Alternatively, the second threshold is time duration from a $1^{st}$ symbol in a slot in which a fifth SSB is located to a last symbol in a slot in which a sixth SSB is located. The fifth SSB is an SSB with a smallest index in successfully sent SSBs, and the sixth SSB is an SSB with a largest index in the successfully sent SSBs.

①  The second threshold in this embodiment of this application can be the time duration from the $1^{st}$ symbol in the slot in which the first SSB whose index is 0 is located to the last symbol in the slot in which the second SSB whose index is (Q–1) is located. For example, it is assumed that Q=32. In this case, the second threshold is time duration from the $1^{st}$ symbol in the slot in which the first SSB whose index is 0 is located to a last symbol in a slot in which a second SSB whose index is 31 is located.

②  The second threshold in this embodiment of this application may alternatively be the time duration from the $1^{st}$ symbol in the slot in which the third SSB is located to the last symbol in the slot in which the fourth SSB is located. The third SSB is located in the $1^{st}$ first SSB group whose bit is configured as "1" from the left in the second parameter. The fourth SSB is located in the $1^{st}$ second SSB group whose bit is configured as "1" from the right in the second parameter. For example, the second parameter may be a parameter "groupPresence" in the "serving cell configuration common SIB". It is assumed that there are 10 SSB groups. A $1^{st}$ group whose bit is configured as "1" from the left in the parameter "groupPresence" is a $2^{nd}$ SSB group of the 10 SSB groups. In other words, the third SSB is located in the $2^{nd}$ SSB group of the 10 SSB groups. A 1st group whose bit is configured as "1" from the right in the parameter "groupPresence" is a $7^{th}$ SSB group of the 10 SSB groups. In this case, the fourth SSB is located in the $7^{th}$ SSB group of the 10 SSB groups. In this case, the second threshold is the time duration from the $1^{st}$ symbol in the slot in which the third SSB located in the $2^{nd}$ SSB group is located to the last symbol in the slot in which the fourth SSB located in the $7^{th}$ SSB group is located. It should be understood that the first SSB group and the second SSB group may be a same SSB group, or may be different SSB groups.

③  The second threshold in this embodiment of this application may alternatively be the time duration from the $1^{st}$ symbol in the slot in which the fifth SSB with the smallest index in the successfully sent SSBs is located to the last symbol in the slot in which the sixth SSB with the largest index in the successfully sent SSBs is located. For example, it is assumed that there are 64 SSBs, an SSB with a smallest index in successfully sent SSBs is an SSB corresponding to an index "8", and an SSB with a largest index in the successfully sent SSBs is an SSB corresponding to an index "32". In this case, the second threshold is time duration from a $1^{st}$ symbol in a slot in which the SSB with the index "8" is located to a last symbol in a slot in which the SSB with the index "32" is located.

Manner 2

The second threshold is time duration from a slot in which a first SSB is located to a slot in which a second SSB is located. An index of the first SSB is 0, and an index of the second SSB is (Q–1).

Alternatively, the second threshold is time duration from a slot in which a third SSB is located to a slot in which a fourth SSB is located. The third SSB is located in a first SSB group, and the fourth SSB is located in a second SSB group. The first SSB group is a $1^{st}$ group whose bit is configured as "1" from the left in a second parameter. The second SSB group is a $1^{st}$ group whose bit is configured as "1" from the right in the second parameter.

Alternatively, the second threshold is time duration from a slot in which a fifth SSB is located to a slot in which a sixth SSB is located. The fifth SSB is an SSB with a smallest index in successfully sent SSBs, and the sixth SSB is an SSB with a largest index in the successfully sent SSBs.

①  The second threshold in this embodiment of this application can be the time duration from the slot in which the first SSB whose index is 0 is located to a slot in which the second SSB whose index is (Q–1) is located. For example, it is assumed that Q=32. In this case, the second threshold is time duration from the slot in which the first SSB whose index is 0 is located to a slot in which a second SSB whose index is 31 is located.

②  The second threshold in this embodiment of this application may alternatively be the time duration from the slot in which the third SSB is located to the slot in which the fourth SSB is located. The third SSB is located in the st first SSB group whose bit is configured as "1" from the left in the second parameter. The fourth SSB is located in the $1^{st}$ second SSB group whose bit is configured as "1" from the right in the second parameter. For example, the second parameter may be a parameter "groupPresence" in the "serving cell configuration common SIB". It is assumed that there are 10 SSB groups. A $1^{st}$ group whose bit is configured as "1" from the left in the parameter "groupPresence" is a $2^{nd}$ SSB group of the 10 SSB groups. In other words, the third SSB is located in the $2^{nd}$ SSB group of the 10 SSB groups. A $1^{st}$ group whose bit is configured as "1" from the right in the parameter "groupPresence" is a $7^{th}$ SSB group of the 10 SSB groups. In this case, the fourth SSB is located in the $7^{th}$ SSB group of the 10 SSB groups. In this case, the second threshold is the time duration from the slot in which the third SSB located in the $2^{nd}$ SSB group is located to the slot in which the fourth SSB located in the $7^{th}$ SSB group is located. It should be understood that the first SSB group and the second SSB group may be a same SSB group, or may be different SSB groups.

③  The second threshold in this embodiment of this application may alternatively be the time duration from the slot in which the fifth SSB with the smallest index in the successfully sent SSBs is located to the slot in which the sixth SSB with the largest index in the successfully sent SSBs is located. For example, it is assumed that there are 64 SSBs, an SSB with a smallest index in successfully sent SSBs is an SSB corresponding to an index "8", and an SSB with a largest index in the successfully sent SSBs is an SSB corresponding to an index "32". In this case, the second threshold is time duration from a slot in which the SSB with the index "8" is located to a slot in which the SSB with the index "32" is located.

Manner 3

The second threshold is time duration from a $1^{st}$ symbol of a first SSB to a last symbol of a second SSB. An index of the first SSB is 0, and the second SSB is (Q−1).

Alternatively, the second threshold is time duration from a $1^{st}$ symbol of a third SSB to a last symbol of a fourth SSB. The third SSB is located in a first SSB group, and the fourth SSB is located in a second SSB group. The first SSB group is a $1^{st}$ group whose bit is configured as "1" from the left in a second parameter. The second SSB group is a $1^{st}$ group whose bit is configured as "1" from the right in the second parameter.

Alternatively, the second threshold is time duration from a $1^{st}$ symbol of a fifth SSB to a last symbol of a sixth SSB. The fifth SSB is an SSB with a smallest index in successfully sent SSBs, and the sixth SSB is an SSB with a largest index in the successfully sent SSBs.

It should be noted that the fifth SSB and/or the sixth SSB in this embodiment of this application may be jointly indicated by using the parameter "groupPresence" and a parameter "inonegroup" in the serving cell configuration common SIB.

The foregoing three manners may be expressed in English as follows.

(1) If DBTW equals to (or equal to or smaller than, not larger than) the time duration from the beginning of slot containing the candidate SSB index 0 to the end of slot containing the candidate SSB index Q−1, UE assumes that DBTW is disabled.

If DBTW is larger than (or equal to or larger than, or not smaller than) the time duration from the beginning of slot containing the candidate SSB index 0 to the end of slot containing the candidate SSB index Q−1, UE assumes that DBTW is enabled.

That is, if (a length or a value of) the DBTW is equal to, or less than or equal to, or not greater than time duration from a start slot in which a first candidate SSB index 0 included (in a half-frame) is located to a last slot in which a second candidate SSB index Q−1 included (in the half-frame) is located, the UE considers by default that the DBTW is disabled.

If (a length or a value of) the DBTW is greater than, or greater than or equal to, or not less than time duration from a start slot in which a first candidate SSB index 0 included (in a half-frame) is located to a last slot in which a second candidate SSB index Q−1 included (in the half-frame) is located, the UE considers by default that the DBTW is enabled.

(2) If DBTW equals to (or equal to or smaller than, or not larger than) the time duration from the beginning of the half frame that contains the SS/PBCH blocks to the end of the slot that contains the SS/PBCH blocks within the SS/PBCH blocks group corresponding to the last/rightmost bit with value 1 in groupPresence in ServingCellConfigCommonSIB, UE assumes that DBTW is disabled.

If DBTW is larger than (or equal to or larger than, or not smaller than) the time duration from the beginning of the half frame that contains the SS/PBCH blocks to the end of the slot that contains the SS/PBCH blocks within the SS/PBCH blocks group corresponding to the last/rightmost bit with value 1 in groupPresence in ServingCellConfigCommonSIB, UE assumes that DBTW is enabled.

That is, (a length or a value of) the DBTW is equal to, or less than or equal to, or not greater than time duration from a start slot in which first SS/PBCH blocks included (in the half-frame) are located to an end slot in which second SS/PBCH blocks included (in the half-frame) are located. The first SS/PBCH blocks and the second SS/PBCH blocks are located in the SS/PBCH blocks group. The SS/PBCH blocks group is located in a group with a last or rightmost bit indicated as "1" in the parameter "groupPresence" in the parameter "ServingCellConfigCommonSIB". In this case, the UE considers by default that the DBTW is disabled.

(A length or a value of) the DBTW is greater than, or greater than or equal to, or not less than time duration from a start slot in which first SS/PBCH blocks included (in the half-frame) are located to an end slot in which second SS/PBCH blocks included (in the half-frame) are located. The first SS/PBCH blocks and the second SS/PBCH blocks are located in the SS/PBCH blocks group. The SS/PBCH blocks group is located in a group with a last or rightmost bit indicated as "1" in the parameter "groupPresence" in the parameter "ServingCellConfigCommonSIB". In this case, the UE considers by default that the DBTW is enabled.

(3) If DBTW equals to (or equal to or smaller than, or not larger than) the time duration from the beginning of the half frame that contains the SS/PBCH blocks to the end of the slot that contains the last transmitted SS/PBCH block (SS/PBCH block with the largest index) that is indicated jointly by inOneGroup and groupPresence in ServingCellConfigCommonSIB, UE assumes that DBTW is disabled.

If DBTW is larger than (or equal to or larger than, or not smaller than) the time duration from the beginning of the half frame that contains the SS/PBCH blocks to the end of the slot that contains the last transmitted SS/PBCH block (SS/PBCH block with the largest index) that is indicated jointly by inOneGroup and groupPresence in ServingCellConfigCommonSIB, UE assumes that DBTW is enabled.

That is, (a length or a value of) the DBTW is equal to, or less than or equal to, or not greater than time duration from a start slot in which first SS/PBCH blocks included (in the half-frame) are located to a last slot in which second SS/PBCH blocks included (in the half-frame) are located. The second SS/PBCH blocks have a largest index. The first SS/PBCH blocks and the second SS/PBCH blocks are jointly indicated by using the parameter "groupPresence" and the parameter "inOneGroup" in the parameter "ServingCellConfigCommonSIB". In this case, the UE considers by default that the DBTW is disabled.

(A length or a value of) the DBTW is greater than, or greater than or equal to, or not less than time duration from a start slot in which first SS/PBCH blocks included (in the half-frame) are located to a last slot in which second SS/PBCH blocks included (in the half-frame) are located. The second SS/PBCH blocks have a largest index. The first SS/PBCH blocks and the second SS/PBCH blocks are jointly indicated by using the parameter "groupPresence" and the parameter "inOneGroup" in the parameter "ServingCellConfigCommonSIB". In this case, the UE considers by default that the DBTW is enabled.

In addition, in some embodiments, the terminal device may alternatively determine the status of the DBTW in the following manner.

If DBTW equals to (or equal to or smaller than, or not larger than) the time duration from the beginning of the half frame that contains the SS/PBCH blocks to the end of the slot that contains at least the last SS/PBCH blocks within the SS/PBCH blocks group corresponding to the last/rightmost bit with value 1 in groupPresence in ServingCellConfig-CommonSIB, UE assumes that DBTW is disabled.

If DBTW is larger than (or equal to or larger than, or not smaller than) the time duration from the beginning of the half frame that contains the SS/PBCH blocks to the end of the slot that contains at least the last SS/PBCH blocks within the SS/PBCH blocks group corresponding to the last/rightmost bit with value 1 in groupPresence in ServingCellConfigCommonSIB, UE assumes that DBTW is enabled.

That is, (a length or a value of) the DBTW is equal to, or less than or equal to, or not greater than time duration from a start slot in which first SS/PBCH blocks included (in the half-frame) are located to an end slot in which at least second SS/PBCH blocks included (in the half-frame) are located. The first SS/PBCH blocks and the second SS/PBCH blocks are located in the SS/PBCH blocks group. The SS/PBCH blocks group is located in a group with a last or rightmost bit indicated as "1" in the parameter "groupPresence" in the parameter "ServingCellConfigCommonSIB". In this case, the UE considers by default that the DBTW is disabled.

(A length or a value of) the DBTW is greater than, or greater than or equal to, or not less than time duration from a start slot in which first SS/PBCH blocks included (in the half-frame) are located to an end slot in which at least second SS/PBCH blocks included (in the half-frame) are located. The first SS/PBCH blocks and the second SS/PBCH blocks are located in the SS/PBCH blocks group. The SS/PBCH blocks group is located in a group with a last or rightmost bit indicated as "1" in the parameter "groupPresence" in the parameter "ServingCellConfigCommonSIB". In this case, the UE considers by default that the DBTW is enabled.

It is mentioned above that the network device may send the first information to the terminal device, and the first information may include the Q value. For a bit indication manner of the Q value, refer to the following.

The Q value is indicated by using n bits, and n is a positive integer greater than 2. The n bits include at least one bit indicating a third parameter. The third parameter includes at least one of the following parameters:

subcarrier spacing common in the MIB information, an SSB-subcarrier offset in the MIB information, and a PDCCH-configuration SIB 1 in the MIB information.

Optionally, in some embodiments, the PDCCH-configuration SIB 1 includes search space zero and a control resource set zero.

The Q value in this embodiment of this application can be a positive integer greater than 2, and the n bits can be the at least one bit indicating the foregoing parameter. For example, the Q value may be indicated by using three or four bits, and the three bits or the four bits may be the at least one bit in the foregoing parameter.

In this embodiment of this application, the n bits may include n bits indicating the subcarrier spacing common, or may include n bits indicating the subcarrier spacing common and the SSB-subcarrier offset, or may include n bits indicating the carrier spacing common, the SSB-subcarrier offset, and the PDCCH-configuration SIB 1. This is not limited.

Another possible case is similar to the foregoing case. Details are not described herein again.

According to the solution provided in this application, for a system operating on a shared band, the Q value can be indicated by using the n bits, and the n bits include the at least one bit indicating the third parameter. In other words, when a MIB payload capacity is not expanded, the bits indicating the Q value can be a corresponding bit of another parameter in the MIB. This can improve system performance.

The following specifically describes the bit indication manner of the Q value.

Manner 1

The n bits include n1 bits indicating a fourth parameter and (n–n1) bits indicating a fifth parameter. The fourth parameter is any parameter in the third parameter, and the fifth parameter is a parameter in the third parameter other than the fourth parameter. The fifth parameter is indicated by using m–(n–n1) bits, and m is an initial number indicating the fifth parameter.

Manner 2

The n bits include n1 bits indicating a fourth parameter and (n–n1) bits indicating a fifth parameter. The fourth parameter is any parameter in the third parameter, and the fifth parameter is a parameter in the third parameter other than the fourth parameter. The fifth parameter is indicated by using m bits, m is an initial number indicating the fifth parameter, and (n–n1)<m.

In this embodiment of this application, the n bits indicating the Q value include the n1 bits indicating the fourth parameter and the (n–n1) bits indicating the fifth parameter, and the initial number indicating the fifth parameter is m. Therefore, (n–n1)<m.

In this embodiment of this application, the fourth parameter may be the subcarrier spacing common in the MIB information, and the fifth parameter may be the SSB-subcarrier offset in the MIB information and/or the PDCCH-configuration SIB 1 in the MIB information. Alternatively, the fourth parameter may be the SSB-subcarrier offset in the MIB information, and the fifth parameter may be the subcarrier spacing common in the MIB information and/or the PDCCH-configuration SIB 1 in the MIB information. Alternatively, the fourth parameter may be the PDCCH-configuration SIB 1 in the MIB information, and the fifth parameter may be the subcarrier spacing common in the MIB information and/or the SSB-subcarrier offset in the MIB information. This is not limited.

For example, as described above, n may be three or four bits, that is, the Q value may be indicated by using the three or four bits. For a specific indication manner, refer to the following.

Case 1: The Q value is indicated by using three bits (that is, n=3).
   (a) The three bits include two bits indicating the parameter "subcarrier spacing common" and one bit indicating the parameter "SSB-subcarrier offset" (that is, n1=2, and n–n1=1).
   ① In a possible implementation, if m=4, that is, an initial number of bits indicating the parameter "SSB-subcarrier offset" is 4, in this embodiment of this application, one of the four bits indicating the parameter "SSB-subcarrier offset" may be misappropriated to indicate the parameter Q value. Therefore, in this case, there are two or three bits indicating the parameter "SSB-subcarrier offset".
   Specifically, if one of the four bits in the parameter "SSB-subcarrier offset" is misappropriated as one of the two bits indicating the parameter "subcarrier spacing common" in the MIB, there are two bits indicating the parameter "SSB-subcarrier offset". If one of the four bits in the parameter "SSB-subcarrier offset" is not misappropriated as one of the two bits indicating the parameter "subcarrier spacing common" in the MIB, there is three bits indicating the parameter "SSB-subcarrier offset".

② In another possible implementation, if m=4, that is, an initial number of bits indicating the parameter "SSB-subcarrier offset" is 4, in this embodiment of this application, one of the four bits indicating the parameter "SSB-subcarrier offset" may be borrowed to indicate the parameter Q value. Although the bit of the parameter "SSB-subcarrier offset" is borrowed to indicate Q, there may still be four initial bits indicating the parameter "SSB-subcarrier offset", that is, the parameter "SSB-subcarrier offset" may still be indicated by using the initial four bits.

(b) The three bits include two bits indicating the parameter "subcarrier spacing common" and one bit indicating the parameter "PDCCH-configuration SIB 1" (that is, n1=2, and n−n1=1).

The parameter "PDCCH-configuration SIB 1" is indicated by using eight bits. The parameter "PDCCH-configuration SIB 1" includes the parameter "search space zero" ("searchSpaceZero", which occupies four bits) and the parameter "control resource set zero" ("controlResourceSetZero", which occupies four bits). Therefore, the three bits indicating the Q value may include the two bits indicating the parameter "subcarrier spacing common" and one bit indicating the parameter "search space zero", or may include the two bits indicating the parameter "subcarrier spacing common" and one bit indicating the parameter "control resource set zero".

① In a possible implementation, if m=4 (the four bits may be the four bits indicating the parameter "search space zero"), that is, an initial number of bits indicating the parameter "search space zero" is 4, in this embodiment of this application, one of the four bits indicating the parameter "search space zero" may be misappropriated to indicate the parameter Q value. Therefore, in this case, there are three bits indicating the parameter "search space zero". In other words, in this case, the parameter "PDCCH-configuration SIB 1" may be indicated by using seven bits (including the three bits indicating the parameter "search space zero" and the four bits indicating the parameter "control resource set zero").

② In another possible implementation, if m=4 (the four bits may be the four bits indicating the parameter "search space zero"), that is, an initial number of bits indicating the parameter "search space zero" is 4, in this embodiment of this application, one of the four bits indicating the parameter "search space zero" may be borrowed to indicate the parameter Q value. Although the bit of the parameter "search space zero" is borrowed to indicate Q, there may still be four initial bits indicating the parameter "search space zero", that is, the parameter "search space zero" may still be indicated by using the initial four bits. In other words, in this case, the parameter "PDCCH-configuration SIB 1" may still be indicated by using the eight bits (including the four bits indicating the parameter "search space zero" and the four bits indicating the parameter "control resource set zero").

③ In another possible implementation, if m=4 (the four bits may be the four bits indicating the parameter "control resource set zero"), that is, an initial number of bits indicating the parameter "control resource set zero" is 4, in this embodiment of this application, one of the four bits indicating the parameter "control resource set zero" may be misappropriated to indicate the parameter Q value. Therefore, in this case, there are three bits indicating the parameter "control resource set zero". In other words, in this case, the parameter "PDCCH-configuration SIB 1" may still be indicated by using seven bits (including the four bits indicating the parameter "search space zero" and the three bits indicating the parameter "control resource set zero").

④ In another possible implementation, if m=4 (the four bits may be the four bits indicating the parameter "control resource set zero"), that is, an initial number of bits indicating the parameter "control resource set zero" is 4, in this embodiment of this application, one of the four bits indicating the parameter "control resource set zero" may be borrowed to indicate the parameter Q value. Although the bit of the parameter "control resource set zero" is borrowed to indicate Q, there may still be four initial bits indicating the parameter "control resource set zero", that is, the parameter "control resource set zero" may still be indicated by using the initial four bits. In other words, in this case, the parameter "PDCCH-configuration SIB 1" may still be indicated by using the eight bits (including the four bits indicating the parameter "search space zero" and the four bits indicating the parameter "control resource set zero").

(c) The three bits include two bits indicating the parameter "SSB-subcarrier offset" and one bit indicating the parameter "PDCCH-configuration SIB 1" (that is, n1=2, and n−n1=1).

In this embodiment of this application, the parameter "SSB-subcarrier offset" may be initially indicated by using four bits, and the Q value may be indicated by using two of the four bits.

① In a possible implementation, two of the four bits indicating the parameter "SSB-subcarrier offset" may be misappropriated to indicate the parameter Q value. Therefore, in this case, there are two bits indicating the parameter "SSB-subcarrier offset".

② In another possible implementation, two of the four bits indicating the parameter "SSB-subcarrier offset" may be borrowed to indicate the parameter Q value. Although the two bits of the parameter "SSB-subcarrier offset" are borrowed to indicate Q, there may still be four initial bits indicating the parameter "SSB-subcarrier offset", that is, the parameter "SSB-subcarrier offset" may still be indicated by using the initial four bits.

Similarly, the parameter "PDCCH-configuration SIB 1" is indicated by using eight bits. The parameter "PDCCH-configuration SIB 1" includes the parameter "search space zero" (which occupies four bits) and the parameter "control resource set zero" (which occupies four bits). Therefore, the three bits indicating the Q value may include the two bits indicating the parameter "SSB-subcarrier offset" and one bit indicating the parameter "search space zero", or may include the two bits indicating the parameter "SSB-subcarrier offset" and one bit indicating the parameter "control resource set zero".

① In a possible implementation, if m=4 (the four bits may be the four bits indicating the parameter "search space zero"), that is, an initial number of bits indicating the parameter "search space zero" is 4, in this embodiment of this application, one of the four bits indicating the parameter "search space zero" may be misappropriated to indicate the parameter Q value. Therefore, in this case, there are three bits indicating the parameter "search space zero".

② In another possible implementation, if m=4 (the four bits may be the four bits indicating the parameter "search space zero"), that is, an initial number of bits indicating the parameter "search space zero" is 4, in this embodiment of this application, one of the four bits indicating the parameter "search space zero" may be borrowed to indicate the parameter Q value. Although the bit of the parameter "search space zero" is borrowed to indicate Q, there may still be four initial bits indicating the parameter "search space zero", that is, the parameter "search space zero" may still be indicated by using the initial four bits.

③ In another possible implementation, if m=4 (the four bits may be the four bits indicating the parameter "control resource set zero"), that is, an initial number of bits indicating the parameter "control resource set zero" is 4, in this embodiment of this application, one of the four bits indicating the parameter "control resource set zero" may be misappropriated to indicate the parameter Q value. Therefore, in this case, there are three bits indicating the parameter "control resource set zero".

④ In another possible implementation, if m=4 (the four bits may be the four bits indicating the parameter "control resource set zero"), that is, an initial number of bits indicating the parameter "control resource set zero" is 4, in this embodiment of this application, one of the four bits indicating the parameter "control resource set zero" may be borrowed to indicate the parameter Q value. Although the bit of the parameter "control resource set zero" is borrowed to indicate Q, there may still be four initial bits indicating the parameter "control resource set zero", that is, the parameter "control resource set zero" may still be indicated by using the initial four bits.

(d) The three bits include one bit indicating the parameter "SSB-subcarrier offset" and two bits indicating the parameter "PDCCH-configuration SIB 1" (that is, n1=1, and n−n1=2).

In this embodiment of this application, the parameter "SSB-subcarrier offset" may be initially indicated by using four bits, and the Q value may be indicated by using one of the four bits.

① In a possible implementation, one of the four bits indicating the parameter "SSB-subcarrier offset" may be misappropriated to indicate the parameter Q value. Therefore, in this case, there are three bits indicating the parameter "SSB-subcarrier offset".

② In another possible implementation, one of the four bits indicating the parameter "SSB-subcarrier offset" may be borrowed to indicate the parameter Q value. Although the bit of the parameter "SSB-subcarrier offset" is borrowed to indicate Q, there may still be four initial bits indicating the parameter "SSB-subcarrier offset", that is, the parameter "SSB-subcarrier offset" may still be indicated by using the initial four bits.

Similarly, the parameter "PDCCH-configuration SIB 1" is indicated by using eight bits. The parameter "PDCCH-configuration SIB 1" includes the parameter "search space zero" (which occupies four bits) and the parameter "control resource set zero" (which occupies four bits). Therefore, the three bits indicating the Q value may include the bit indicating the parameter "SSB-subcarrier offset" and two bits indicating the parameter "search space zero", or may include the bit indicating the parameter "SSB-subcarrier offset" and two bits indicating the parameter "control resource set zero", or may include the bit indicating the parameter "SSB-subcarrier offset", one bit indicating the parameter "search space zero", and one bit indicating the parameter "control resource set zero". This is not limited.

① In a possible implementation, if m=4 (the four bits may be the four bits indicating the parameter "search space zero"), that is, an initial number of bits indicating the parameter "search space zero" is 4, in this embodiment of this application, two of the four bits indicating the parameter "search space zero" may be misappropriated to indicate the parameter Q value. Therefore, in this case, there are two bits indicating the parameter "search space zero". In other words, in this case, the parameter "PDCCH-configuration SIB 1" may be indicated by using six bits (including the two bits indicating the parameter "search space zero" and the four bits indicating the parameter "control resource set zero").

② In another possible implementation, if m=4 (the four bits may be the four bits indicating the parameter "search space zero"), that is, an initial number of bits indicating the parameter "search space zero" is 4, in this embodiment of this application, two of the four bits indicating the parameter "search space zero" may be borrowed to indicate the parameter Q value. Although the two bits of the parameter "search space zero" are borrowed to indicate Q, there may still be four initial bits indicating the parameter "search space zero", that is, the parameter "search space zero" may still be indicated by using the initial four bits. In other words, in this case, the parameter "PDCCH-configuration SIB 1" may still be indicated by using the eight bits (including the four bits indicating the parameter "search space zero" and the four bits indicating the parameter "control resource set zero").

③ In another possible implementation, if m=4 (the four bits may be the four bits indicating the parameter "control resource set zero"), that is, an initial number of bits indicating the parameter "control resource set zero" is 4, in this embodiment of this application, two of the four bits indicating the parameter "control resource set zero" may be misappropriated to indicate the parameter Q value. Therefore, in this case, there are two bits indicating the parameter "control resource set zero". In other words, in this case, the parameter "PDCCH-configuration SIB 1" may be indicated by using six bits (including the fourth bits indicating the parameter "search space zero" and the two bits indicating the parameter "control resource set zero").

④ In another possible implementation, if m=4 (the four bits may be the four bits indicating the parameter "control resource set zero"), that is, an initial number of bits indicating the parameter "control resource set zero" is 4, in this embodiment of this application, two of the four bits indicating the parameter "control resource set zero" may be borrowed to indicate the parameter Q value. Although the two bits of the parameter "control resource set zero" are borrowed to indicate Q, there may still be four initial bits indicating the parameter "control resource set zero", that is, the parameter "control resource set zero" may still be indicated by using the initial four bits. In other words, in this case, the parameter "PDCCH-configuration SIB 1" may still be indicated by using the eight bits (including the four bits indicating the parameter "search space zero" and the four bits indicating the parameter "control resource set zero").

⑤ In another possible implementation, if m=8 (the eight bits include the four bits indicating the parameter "search space zero" and the four bits indicating the parameter "control resource set zero"), that is, an initial number of bits indicating the parameter "search space zero" is 4 and an initial number of bits indicating the parameter "control resource set zero" is 4, in this embodiment of this application, one of the four bits indicating the parameter "search space zero" and one of the four bits indicating the parameter "control resource set zero" may be misappropriated to indicate the parameter Q value. Therefore, in this case, there are three bits indicating the parameter "search space zero", and there are three bits indicating the parameter "control resource set zero". In other words, in this case, the parameter "PDCCH-configuration SIB 1" may be indicated by using six bits (including the three bits indicating the parameter "search space zero" and the three bits indicating the parameter "control resource set zero").

⑥ In another possible implementation, if m=8 (the eight bits include the four bits indicating the parameter "search space zero" and the four bits indicating the parameter "control resource set zero"), that is, an initial number of bits indicating the parameter "search space zero" is 4 and an initial number of bits indicating the parameter "control resource set zero" is 4, in this embodiment of this application, one of the four bits indicating the parameter "search space zero" and one of the four bits indicating the parameter "control resource set zero" may be borrowed to indicate the parameter Q value. Although the bit indicating the parameter "search space zero" and the bit indicating the parameter "control resource set zero" are borrowed to indicate Q, there may still be separately four initial bits indicating the parameter "search space zero" and the parameter "control resource set zero", that is, the parameter "search space zero" and the parameter "control resource set zero" may still be separately indicated by using the initial four bits. In other words, in this case, the parameter "PDCCH-configuration SIB 1" may still be indicated by using the eight bits (including the four bits indicating the parameter "search space zero" and the four bits indicating the parameter "control resource set zero").

It should be understood that, when the n bits include the two bits indicating the parameter "PDCCH-configuration SIB 1", if the two bits are respectively the bit indicating "search space zero" and the bit indicating the parameter "control resource set zero", both the two bits may be misappropriated to indicate the Q value, or may be borrowed to indicate the Q value. Alternatively, the bit indicating "search space zero" is misappropriated to indicate the Q value, and the bit indicating the parameter "control resource set zero" is borrowed to indicate the Q value. Alternatively, the bit indicating "search space zero" is borrowed to indicate the Q value, and the bit indicating the parameter "control resource set zero" is misappropriated to indicate the Q value. This is not limited.

In conclusion, a manner of indicating Q by using the three bits may be shown in Table 5 through Table 10.

TABLE 5

| Bit/index | Q value |
|---|---|
| 000/0 | 8 |
| 001/1 | 16 |
| 010/2 | 32 |
| 011/3 | 64 |
| 100/4 | >64 (for example, 128 or 256) |
| 101/5 | Reserved (reserved) |
| 110/6 | Reserved (reserved) |
| 111/7 | Reserved (reserved) |

TABLE 6

| Bit/index | Q value |
|---|---|
| 000/0 | 1 |
| 001/1 | 2 |
| 010/2 | 4 |
| 011/3 | 8 |
| 100/4 | 16 |
| 101/5 | 32 |
| 110/6 | 64 |
| 111/7 | >64 (for example, 128 or 256) |

TABLE 7

| Bit/index | Q value |
|---|---|
| 000/0 | 8 |
| 001/1 | 16 |
| 010/2 | 24 |
| 011/3 | 32 |
| 100/4 | 48 |
| 101/5 | 52 |
| 110/6 | 64 |
| 111/7 | Reserved (reserved) |

TABLE 8

| Bit/index | Q value |
|---|---|
| 000/0 | 8 |
| 001/1 | 16 |
| 010/2 | 24 |
| 011/3 | 32 |
| 100/4 | 48 |
| 101/5 | 52 |
| 110/6 | 60 |
| 111/7 | 64 |

TABLE 9

| Bit/index | DBTW value (ms) | DBTW length (slots) | Q |
|---|---|---|---|
| 000/0 | 0.5 | 4 | 8 |
| 001/1 | 1 | 8 | 16 |
| 010/2 | 2 | 16 | 28 |
| 011/3 | 2.25/2.5 | 18/20 | 32 |
| 100/4 | 3 | 24 | 40 |
| 101/5 | 4 | 32 | 52 |
| 110/6 | 5 | 40 | 64 |
| 111/7 | >5 | — | >64 |

TABLE 10

| Bit/index | DBTW value (ms) | DBTW length (slots) | Q |
|---|---|---|---|
| 000/0 | 0.5 | 4 | 8 |
| 001/1 | 1 | 8 | 16 |
| 010/2 | 2 | 16 | 28 |
| 011/3 | 2.25/2.5 | 18/20 | 32 |
| 100/4 | 3 | 24 | 40 |
| 101/5 | 3.5 | 28 | 48 |
| 110/6 | 4 | 32 | 52 |
| 111/7 | 5 | 40 | 64 |

In Table 5 through Table 10, the Q value may be indicated by using three bits, but a same index may correspond to different Q values.

Specifically, in Table 5, a Q value corresponding to an index "0" is 8. In Table 6, a Q value corresponding to the index "0" is 1.

It should be understood that the foregoing four representation manners are merely examples for description, and may be other possible representation manners. This is not limited.

It should be noted that the foregoing Q value may not be limited to a number shown in the table, and the Q value may be extended to any number from 1 to 128. This is not limited.

Case 2: The Q value is indicated by using four bits (that is, n=4).

(a) The four bits include two bits indicating the parameter "subcarrier spacing common" and two bits indicating the parameter "SSB-subcarrier offset".

The two bits that indicate the parameter "SSB-subcarrier offset" and that are included in the four bits may be misappropriated or borrowed. For detailed content, refer to the content in Case 1. Details are not described again.

(b) The four bits include two bits indicating the parameter "subcarrier spacing common" and two bits indicating the parameter "PDCCH-configuration SIB 1".

It may be understood that the two bits that indicate the parameter "PDCCH-configuration SIB 1" and that are included in the four bits may be two bits indicating the parameter "search space zero" included in the parameter "PDCCH-configuration SIB 1", or may be two bits indicating the parameter "control resource set zero" included in the parameter "PDCCH-configuration SIB 1", or may be one bit indicating the parameter "search space zero" and one bit indicating the parameter "control resource set zero". This is not limited.

The two bits that indicate the parameter "search space zero" and that are included in the four bits, or the two bits in the parameter "control resource set zero", or the bit in the parameter "search space zero" and the bit in the parameter "control resource set zero" are both misappropriated or borrowed. For detailed content, refer to the content in Case 1. Details are not described again.

(c) The four bits include two bits indicating the parameter "subcarrier spacing common" one bit indicating the parameter "SSB-subcarrier offset", and one bit indicating the parameter "PDCCH-configuration SIB 1".

The bit that indicates the parameter "SSB-subcarrier offset" and that is included in the four bits or the bit indicating the parameter "PDCCH-configuration SIB 1" may be misappropriated or borrowed. For detailed content, refer to the content in Case 1. Details are not described again.

(d) The four bits include one bit indicating the parameter "subcarrier spacing common", one bit indicating the parameter "SSB-subcarrier offset", and two bits indicating the parameter "PDCCH-configuration SIB 1".

The bit that indicates the parameter "SSB-subcarrier offset" and that is included in the four bits or the two bits indicating the parameter "PDCCH-configuration SIB 1" may be misappropriated or borrowed. For detailed content, refer to the content in Case 1. Details are not described again.

(e) The four bits include one bit indicating the parameter "subcarrier spacing common", two bits indicating the parameter "SSB-subcarrier offset", and one bit indicating the parameter "PDCCH-configuration SIB 1".

The two bits that indicate the parameter "SSB-subcarrier offset" and that are included in the four bits or the bit indicating the parameter "PDCCH-configuration SIB 1" may be misappropriated or borrowed. For detailed content, refer to the content in Case 1. Details are not described again.

(f) The four bits include one bit indicating the parameter "subcarrier spacing common" and three bits indicating the parameter "PDCCH-configuration SIB 1".

The three bits that indicate the parameter "PDCCH-configuration SIB 1" and that are included in the four bits may be misappropriated or borrowed. For detailed content, refer to the content in Case 1. Details are not described again.

(g) The four bits include one bit indicating the parameter "subcarrier spacing common" and three bits indicating the parameter "SSB-subcarrier offset".

The three bits that indicate the parameter "SSB-subcarrier offset" and that are included in the four bits may be misappropriated or borrowed. For detailed content, refer to the content in Case 1. Details are not described again.

(h) The four bits include one bit indicating the parameter "SSB-subcarrier offset" and three bits indicating the parameter "PDCCH-configuration SIB 1".

The bit that indicates the parameter "SSB-subcarrier offset" and that is included in the four bits or the three bits indicating the parameter "PDCCH-configuration SIB 1" may be misappropriated or borrowed. For detailed content, refer to the content in Case 1. Details are not described again.

(i) The fourth bits include two bits indicating the parameter "SSB-subcarrier offset" and two bits indicating the parameter "PDCCH-configuration SIB 1".

The two bits that indicate the parameter "SSB-subcarrier offset" and that are included in the four bits or the two bits indicating the parameter "PDCCH-configuration SIB 1" may be misappropriated or borrowed. For detailed content, refer to the content in Case 1. Details are not described again.

(j) The four bits include three bits indicating the parameter "SSB-subcarrier offset" and one bit indicating the parameter "PDCCH-configuration SIB 1".

The three bits that indicate the parameter "SSB-subcarrier offset" and that are included in the four bits or the bit indicating the parameter "PDCCH-configuration SIB 1" may be misappropriated or borrowed. For detailed content, refer to the content in Case 1. Details are not described again.

In conclusion, a manner of indicating Q by using the four bits may be shown in Table 11 through Table 14.

TABLE 11

| Bit/index | Q value |
| --- | --- |
| 0000/0 | 1 |
| 0001/1 | 2 |
| 0010/2 | 4 |
| 0011/3 | 8 |
| 0100/4 | 12 |
| 0101/5 | 16 |
| 0110/6 | 24 |
| 0111/7 | 32 |
| 1000/8 | 36 |
| 1001/9 | 40 |
| 1010/10 | 44 |
| 1011/11 | 48 |
| 1100/12 | 52 |
| 1101/13 | 56 |
| 1110/14 | 60 |
| 1111/15 | 64 |

TABLE 12

| Bit/index | Q value |
| --- | --- |
| 0000/0 | 2 |
| 0001/1 | 4 |
| 0010/2 | 8 |
| 0011/3 | 12 |
| 0100/4 | 16 |
| 0101/5 | 20 |
| 0110/6 | 24 |
| 0111/7 | 32 |
| 1000/8 | 36 |
| 1001/9 | 40 |
| 1010/10 | 44 |
| 1011/11 | 48 |
| 1100/12 | 52 |
| 1101/13 | 56 |
| 1110/14 | 60 |
| 1111/15 | 64 |

TABLE 13

| Bit/index | Q value |
| --- | --- |
| 0000/0 | 1 |
| 0001/1 | 2 |
| 0010/2 | 4 |
| 0011/3 | 8 |
| 0100/4 | 16 |
| 0101/5 | 24 |
| 0110/6 | 32 |
| 0111/7 | 36 |
| 1000/8 | 48 |
| 1001/9 | 52 |
| 1010/10 | 56 |
| 1011/11 | 64 |
| 1100/12 | >64 |
| 1101/13 | Reserved (reserved) |
| 1110/14 | Reserved (reserved) |
| 1111/15 | Reserved (reserved) |

TABLE 14

| Bit/index | DBTW value (ms) | SCS (kHz) | DBTW length (slots) | Q |
| --- | --- | --- | --- | --- |
| 0000/0 | 0.075 | 120 | 0.5 | 1 |
| | | 480 | 2 | 4 |
| | | 960 | 4 | 8 |
| 0001/1 | 0.125 | 120 | 1 | 2 |
| | | 480 | 4 | 8 |
| | | 960 | 8 | 16 |

TABLE 14-continued

| Bit/index | DBTW value (ms) | SCS (kHz) | DBTW length (slots) | Q |
| --- | --- | --- | --- | --- |
| 0010/2 | 0.25 | 120 | 2 | 4 |
| | | 480 | 8 | 16 |
| | | 960 | 16 | 32 |
| 0011/3 | 0.5 | 120 | 4 | 8 |
| | | 480 | 16 | 32 |
| | | 960 | 32 | 64 |
| 0100/4 | 1 | 120 | 8 | 16 |
| | | 480 | 32 | 64 |
| | | 960 | 64 | 128 |
| 0101/5 | 2 | 120 | 16 | 28 |
| | | 480 | 64 | 112 |
| | | 960 | 128 | 224 |
| 0110/6 | 2.25/2.5 | 120 | 18/20 | 32 |
| | | 480 | 72/80 | 128 |
| | | 960 | 144/160 | 256 |
| 0111/7 | 3 | 120 | 24 | 40 |
| | | 480 | 96 | 320 |
| | | 960 | 192 | 640 |
| 1000/8 | 3.5 | 120 | 28 | 48 |
| | | 480 | 112 | 192 |
| | | 960 | 224 | 384 |
| 1001/9 | 4 | 120 | 32 | 52 |
| | | 480 | 128 | 208 |
| | | 960 | 256 | 416 |
| 1010/10 | 5 | 120 | 40 | 64 |
| | | 480 | 320 | 256 |
| | | 960 | 640 | 512 |
| 1011/11 | — | 120 | >40 | >64 |
| | | 480 | >320 | >256 |
| | | 960 | >640 | >512 |
| 1100/12 | — | 120 | Reserved | Reserved |
| | | 480 | (reserved) | (reserved) |
| | | 960 | | |
| 1101/13 | — | 120 | Reserved | Reserved |
| | | 480 | (reserved) | (reserved) |
| | | 960 | | |
| 1110/14 | — | 120 | Reserved | Reserved |
| | | 480 | (reserved) | (reserved) |
| | | 960 | | |
| 1111/15 | — | 120 | Reserved | Reserved |
| | | 480 | (reserved) | (reserved) |
| | | 960 | | |

In Table 11 through Table 14, the Q value may be indicated by using four bits, but a same index may correspond to different Q values.

Specifically, in Table 11, a Q value corresponding to an index "0" is 1. In Table 12, a Q value corresponding to the index "0" is 2.

It should be understood that the foregoing several representation manners are merely examples for description, and may be other possible representation manners. This is not limited.

It should be noted that the foregoing Q value may not be limited to a number shown in the table, and the Q value may be extended to any number from 1 to 128. This is not limited.

In some embodiments, a slot occupied by the DBTW, the configured Q value, and the DBTW value may alternatively be determined based on a ratio factor. The Q value, a number of slots occupied by the DBTW, a number of symbols occupied by the DBTW, and the DBTW value are respectively A, B, C, and D, and values of A, B, C, and D are based on a first SCS (for example, 120 kHz). For a second SCS, when a ratio between the second SCS and the first SCS is X, a Q value, a number of slots occupied by the DBTW, a number of symbols occupied by the DBTW, and a DBTW value that are at the second SCS are respectively represented as follows: A×X, B×X, C×X×14, and D/X.

For example, when the first SCS is 120 kHz and the second SCS is 480 kHz, the ratio factor X=4. When the first SCS is 120 kHz and the second SCS is 960 kHz, the ratio factor X=8. Alternatively, when the first SCS is 480 kHz and the second SCS is 960 kHz, the ratio factor X=2. When the first SCS is 480 kHz and the second SCS is 120 kHz, the ratio factor X=1/4. When the first SCS is 960 kHz and the second SCS is 120 kHz, the ratio factor X=1/8. When the first SCS is 960 kHz and the second SCS is 480 kHz, the ratio factor X=1/2.

For example, as shown in Table 14, when the first SCS is 120 kHz, the number of slots occupied by the DBTW is 0.5, the configured Q is 1, the DBTW value is 0.075 ms, and the number of symbols occupied by the DBTW is 0.075× 16=1.2. When the second SCS is 480 kHz, the ratio factor is X=4. When the DBTW value is fixed, the number of slots occupied by the DBTW is 0.5×4=2, the configured Q value is 1×4=4, and the number of symbols occupied by the DBTW is 1.2×4×14=67.2.

In an implementation, the terminal device implicitly obtains the ratio factor based on the second SCS supported in a band range supported by a serving cell that the terminal device accesses, or implicitly obtains, through calculation based on the ratio factor, the Q value, the number of slots occupied by the DBTW, the number of symbols occupied by the DBTW, and the DBTW value that are at the second SCS.

Optionally, in some embodiments, the ratio factor may be defined in the parameter "serving cell configuration common" included in the RRC signaling, or may be carried in the parameter "serving cell configuration common SIB", or may be configured in the MIB. This is not limited.

Herein, DiscoveryBurstWindowLength-r17={ms0dot075, ms0dot125, ms0dot25, ms0dot5, ms1, ms2, ms2dot25, ms2dot5, ms3, ms3dot5, ms4, ms4dot5, ms5} at 120 kHz.

According to the solution provided in this application, the Q value used to determine the status of the DBTW can be indicated by using the n bits. The n bits include the n1 bits indicating the fourth parameter and the (n−n1) bits indicating the fifth parameter. The fifth parameter is indicated by using the m−(n−n1) bits, and m is the initial number indicating the fifth parameter. In this implementation, the Q value can be indicated by using the corresponding bit of the another parameter in the MIB. This can avoid indicating the Q value by expanding the MIB payload capacity, thereby improving system performance. In addition, the Q value used to determine the status of the DBTW can be indicated by using the n bits. The n bits include the n1 bits indicating the fourth parameter and the (n−n1) bits indicating the fifth parameter. The fifth parameter is indicated by using the m bits. In this implementation, the Q value can be indicated by using the corresponding bit of the another parameter in the MIB. This can avoid indicating the Q value by expanding the MIB payload capacity, and does not affect bit indication of the fifth parameter, thereby improving system performance.

It is mentioned above that the n bits indicating the Q value may include the n1 bits indicating the fourth parameter and the (n−n1) bits indicating the fifth parameter. In a possible implementation, the fifth parameter may be the SSB-subcarrier offset. In this implementation, an offset value of the SSB-subcarrier offset may be determined in the following manner.

Optionally, in some embodiments, the fifth parameter is the SSB-subcarrier offset in the MIB information. The offset value of the SSB-subcarrier offset is determined based on a combination of an SCS of the SSB and an SCS of a CRB.

Optionally, in some embodiments, if the SCS of the SSB and the SCS of the CRB each are a first frequency, the offset value of the SSB-subcarrier offset is determined based on a preset threshold.

Alternatively, if the SCS of the SSB is a second frequency, and the SCS of the CRB is a first frequency, the offset value of the SSB-subcarrier offset is a value indicated by the (n−n1) bits of the fifth parameter.

Alternatively, if the SCS of the SSB is a third frequency, and the SCS of the CRB is a first frequency, the offset value of the SSB-subcarrier offset is less than or equal to a value indicated by the (n−n1) bits of the fifth parameter.

In this embodiment of this application, the offset value of the SSB-subcarrier offset may be understood as an offset value between the SSB and the CRB at a subcarrier granularity. It is assumed that the offset value between the SSB and the CRB at the subcarrier granularity is $K_{SSB}$. The offset value is related to the four bits indicating the parameter "SSB-subcarrier offset" (that is, indicating a parameter $\overline{k_{ssb\_1}}$).

For example, it is assumed that the first frequency, the second frequency, and the third frequency in this embodiment of this application are respectively 120 kHz, 480 kHz, and 960 kHz.

If the SCS of the SSB and the SCS of the CRB each are the first frequency, that is, the SCS of the SSB and the SCS of the CRB are {120 kHz, 120 kHz}, it is assumed that the preset threshold is 12. If $\overline{k_{ssb\_1}} \geq 12$, $K_{SSB} = \overline{k_{ssb\_1}}$. Otherwise, $K_{SSB} = 2\lfloor \overline{k_{ssb\_1}}/2 \rfloor$. The symbol $\lfloor\ \rfloor$ represents rounding down.

For example, if $\overline{k_{ssb\_1}} = 14$, $K_{SSB} = 14$. If $\overline{k_{ssb\_1}} = 10$, $K_{SSB} =$. If $\overline{k_{ssb\_1}} = 9$ $K_{SSB} = 8$.

If the SCS of the SSB is the second frequency, and the SCS of the CRB is the first frequency, that is, the SCS of the SSB and the SCS of the CRB are {480 kHz, 120 kHz}, $K_{SSB} = \overline{k_{ssb\_1}}$, that is, a value of $K_{SSB}$ is a value indicated by the four bits of the parameter $\overline{k_{ssb\_1}}$.

For example, if $\overline{k_{ssb\_1}} = 14$, $K_{SSB} = 14$.

If the SCS of the SSB is the third frequency, and the SCS of the CRB is the first frequency, that is, the SCS of the SSB and the SCS of the CRB are {960 kHz, 120 kHz}, that is, a value of $K_{SSB}$ is less than or equal to a value indicated by the four bits of the parameter $\overline{k_{ssb\_1}}$.

For example, if $\overline{k_{ssb\_1}} = 14$, $K_{SSB} = 12$ or $K_{SSB} = 10$.

In addition, the n bits indicating the Q value may include the n1 bits indicating the fourth parameter and the (n−n1) bits indicating the fifth parameter. Optionally, in some embodiments, the (n−n1) bits are (n−n1) most significant bits in the fifth parameter.

Alternatively, the (n−n1) bits are (n−n1) least significant bits in the fifth parameter.

Alternatively, the (n−n1) bits are any (n−n1) bits in the fifth parameter.

In this embodiment of this application, it is assumed that the Q value is indicated by using three bits, and the three bits include the two bits indicating the parameter "subcarrier spacing common" and the bit indicating the parameter "SSB-subcarrier offset" (namely, (a) in Case 1). In this case, the bit indicating the parameter "SSB-subcarrier offset" may be one most significant bit in the parameter "SSB-subcarrier offset". Alternatively, the bit indicating the parameter "SSB-subcarrier offset" may be one least significant bit in the parameter "SSB-subcarrier offset". Alternatively, the bit indicating the parameter "SSB-subcarrier offset" may be any one bit in the parameter "SSB-subcarrier offset". This is not limited.

Similarly, another possible implementation in which the Q value is indicated by using three bits is similar to the foregoing manner. Details are not described again.

In this embodiment of this application, it is assumed that the Q value is indicated by using four bits, and the four bits include the two bits indicating the parameter "subcarrier spacing common" and the two bits indicating the parameter "SSB-subcarrier offset" (namely, (a) in Case 2). In this case, the bit indicating the parameter "SSB-subcarrier offset" may be two most significant bits in the parameter "SSB-subcarrier offset". Alternatively, the bit indicating the parameter "SSB-subcarrier offset" may be two least significant bits in the parameter "SSB-subcarrier offset". Alternatively, the bit indicating the parameter "SSB-subcarrier offset" may be any two bits in the parameter "SSB-subcarrier offset". This is not limited.

It should be noted that the two most significant bits in the parameter "SSB-subcarrier offset" in this embodiment of this application may be understood as follows: If it is assumed that the parameter "SSB-subcarrier offset" is initially indicated by using four bits (for example, 1011), the two most significant bits in the parameter "SSB-subcarrier offset" are first two bits from the left, namely, "10".

Similarly, the two least significant bits in the parameter "SSB-subcarrier offset" in this embodiment of this application may be understood as follows: If it is assumed that the parameter "SSB-subcarrier offset" is initially indicated by using four bits (for example, 1011), the two least significant bits in the parameter "SSB-subcarrier offset" are first two bits from the right, namely, "11".

Another possible implementation in which the Q value is indicated by using four bits is similar to the foregoing manner. Details are not described again.

parameter "serving cell configuration common SIB" through demodulation to determine the status of the DBTW.

A possible manner of the first parameter is as follows.

---

Manner 1
enbleDiscoveryBurstWindowLength-r17    ENUMERATED {enabled}
DiscoveryBurstWindowLength-r17           ENUMERATED
{ms0dot009375, ms0dot01875, ms0dot0375, ms0dot075, ms0dot125,
ms0dot25, ms0dot5, ms1, ms2, ms2dot25, ms2dot5, ms3, ms3dot5, ms4,
ms4dot5, ms5}

---

In this embodiment of this application, the network device may send the parameter "enabling a discovery burst window length-r17" to UE. The parameter indicates that the DBTW is in the enabled state. It should be noted that, before obtaining the parameter "enabling a discovery burst window length-r17", the UE may consider by default that the DBTW is in the disabled state.

In addition, the parameter "DiscoveryBurstWindow-Length-r17" may include a plurality of values. A value displayed in bold (for example, a value ms0dot009375, ms0dot01875, ms0dot0375, ms0dot075, ms0dot125, ms0dot25, ms3dot5, or ms4dot5) is a newly added value.

---

Manner 2
enbleDiscoveryBurstWindowLength-r17               ENUMERATED {disabled}
DiscoveryBurstWindowLength-r17                       ENUMERATED {ms0dot009375,
ms0dot01875, ms0dot0375, ms0dot075, ms0dot125, ms0dot25, ms0dot5, ms1, ms2, ms2dot25,
ms2dot5, ms3, ms3dot5, ms4, ms4dot5, ms5}

---

Based on this, the foregoing describes a case in which the terminal device may determine the status of the DBTW based on the Q value, and the following describes a case in which the terminal device determines the status of the DBTW based on the first parameter.

Optionally, in some embodiments, the determining the status of the DBTW based on the first parameter includes:

if the first parameter includes a parameter indicating that the DBTW is enabled, determining that the DBTW is in an enabled state; or if the first parameter includes a parameter indicating that the DBTW is disabled, determining that the DBTW is in a disabled state.

In this embodiment of this application, the network device may send the first parameter to the terminal device, and the first parameter may indicate the status of the DBTW. For example, the first parameter may be "enabling a discovery burst window length-r17 (enbleDiscoveryBurstWindow-Length-r17)", to explicitly indicate the status of the DBTW.

Optionally, in some embodiments, the first parameter is carried in serving cell configuration common in RRC signaling or a serving cell configuration common SIB in MIB information.

In this embodiment of this application, the first parameter can be carried (or configured) in the parameter "serving cell configuration common" included in the RRC signaling, or can be carried in the parameter "serving cell configuration common SIB". The terminal device may determine, after receiving the first parameter, the status of the DBTW based on the first parameter in the parameter "serving cell configuration common", or obtain the first parameter from the In this embodiment of this application, the network device may send the parameter "enabling a discovery burst window length-r17" to UE. The parameter indicates that the DBTW is in the enabled state. It should be noted that, before obtaining the parameter "enabling a discovery burst window length-r17", the UE may consider by default that the DBTW is in the enabled state.

In addition, the parameter "DiscoveryBurstWindow-Length-r17" may include a plurality of values. A value displayed in bold (for example, a value ms0dot009375, ms0dot01875, ms0dot0375, ms0dot075, ms0dot125, ms0dot25, ms3dot5, or ms4dot5) is a newly added value.

---

Manner 3
enbleDiscoveryBurstWindowLength-r17    ENUMERATED {enabled, disabled}
DiscoveryBurstWindowLength-r17           ENUMERATED
{ms0dot009375, ms0dot01875, ms0dot0375, ms0dot075, ms0dot125,
ms0dot25, ms0dot5, ms1, ms2, ms2dot25, ms2dot5, ms3, ms3dot5, ms4,
ms4dot5, ms5}

---

In this embodiment of this application, the network device may send the parameter "enabling a discovery burst window length-r17" to UE. The parameter may indicate that the DBTW is in the enabled state, or the parameter may indicate that the DBTW is in the disabled state.

In addition, the parameter "DiscoveryBurstWindow-Length-r17" may include a plurality of values. A value displayed in bold (for example, a value ms0dot009375, ms0dot01875, ms0dot0375, ms0dot075, ms0dot125, ms0dot25, ms3dot5, or ms4dot5) is a newly added value.

| Manner 4 | |
| --- | --- |
| DiscoveryBurstWindowLength-r17 | CHOICE { |
| enabled | ENUMERATED |
| {ms0dot009375, ms0dot01875, ms0dot0375, ms0dot075, ms0dot125, | |
| ms0dot25, ms0dot5, ms1, ms2, ms2dot25, ms2dot5, ms3, ms3dot5, ms4, | |
| ms4dot5, ms5} | |
| disabled | NULL |

In this embodiment of this application, the network device may send the parameter "enabling a discovery burst window length-r17" to UE. The parameter may indicate that the DBTW is in the enabled state. In this case, the parameter "DiscoveryBurstWindowLength-r17" may include a plurality of values. A value displayed in bold (for example, a value ms0dot009375, ms0dot01875, ms0dot0375, ms0dot075, ms0dot125, ms0dot25, ms3dot5, or ms4dot5) is a newly added value.

In this embodiment of this application, the network device may send the parameter "enabling a discovery burst window length-r17" to UE. The parameter may indicate that the DBTW is in the disabled state. In this case, a value included in the parameter "DiscoveryBurstWindowLength-r17" may be null.

According to the solution provided in this application, the terminal device can determine the status of the DBTW based on the first parameter sent by the network device, therefore can determine whether the network device sends, within the DBTW, the SSB that cannot be sent due to the LBT failure, and further, can quickly implement timing synchronization with the network device.

Optionally, in some embodiments, the first parameter configured in the serving cell configuration common is the same as the first parameter configured in the serving cell configuration common SIB.

In this embodiment of this application, it is assumed that the first parameter is "enabling a discovery burst window length-r17". The parameter "enabling a discovery burst window length-r17" may be configured in the parameter "serving cell configuration common" included in the RRC signaling, or may be configured in the parameter "serving cell configuration common SIB". In the two configuration manners, values configured for the parameter "enabling a discovery burst window length-r17" are the same.

For example, if the parameter "enabling a discovery burst window length-r17" may be configured in the parameter "serving cell configuration common" included in the RRC signaling, and the value included in the parameter "enabling a discovery burst window length-r17" is {ms0dot009375, ms0dot01875, ms0dot0375, ms0dot075, ms0dot125, ms0dot25, ms0dot5, ms1, ms2, ms2dot25, ms2dot5, ms3, ms3dot5, ms4, ms4dot5, ms5}, the value included in the parameter "serving cell configuration common SIB" may also be {ms0dot009375, ms0dot01875, ms0dot0375, ms0dot075, ms0dot125, ms0dot25, ms0dot5, ms1, ms2, ms2dot25, ms2dot5, ms3, ms3dot5, ms4, ms4dot5, ms5}.

In some embodiments, a number of values configured in the parameter "serving cell configuration common SIB" is less than or equal to a number of values configured in the parameter "serving cell configuration common".

For example, if the parameter "enabling a discovery burst window length-r17" may be configured in the parameter "serving cell configuration common" included in the RRC signaling, and the number of values included in the parameter "enabling a discovery burst window length-r17" is 11, for example, the parameter "enabling a discovery burst window length-r17" may include {ms0dot009375, ms0dot01875, ms0dot0375, ms0dot075, ms0dot125, ms0dot25, ms0dot5, ms1, ms2, ms2dot25, ms2dot5}, the number of values included in the parameter "serving cell configuration common SIB" may be less than 11, for example, the parameter "enabling a discovery burst window length-r17" may include 10 values. The 10 values may be values in the 11 values, and the 10 values may be {ms0dot009375, ms0dot01875, ms0dot0375, ms0dot075, ms0dot125, ms0dot25, ms0dot5, ms1, ms2, ms2dot25}.

In some embodiments, a number of values configured in the parameter "serving cell configuration common SIB" may alternatively be greater than a number of values configured in the parameter "serving cell configuration common". This is not limited.

As described above, the parameter "PDCCH-configuration SIB 1" in the MIB information may include the parameter "search space zero" and the parameter "control resource set zero". Content included in the parameter "control resource set zero" is shown in Table 15.

TABLE 15

| Index | Pattern of multiplexing an SSB and a CORESET | $N_{RB}^{CORESET}$ | $N_{symb}^{CORESET}$ | Offset (RBs) |
| --- | --- | --- | --- | --- |
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | −20, if $K_{SSB} = 0$ −21, if $K_{SSB} > 0$ |
| 5 | 3 | 24 | 2 | 24 |
| 6 | 3 | 48 | 2 | −20, if $K_{SSB} = 0$ −21, if $K_{SSB} > 0$ |
| 7 | 3 | 48 | 2 | 48 |
| 8 | Reserved (reserved) | | | |
| 9 | Reserved (reserved) | | | |
| 10 | Reserved (reserved) | | | |
| 11 | Reserved (reserved) | | | |
| 12 | Reserved (reserved) | | | |
| 13 | Reserved (reserved) | | | |
| 14 | Reserved (reserved) | | | |
| 15 | Reserved (reserved) | | | |

In the foregoing table, the four bits indicating the parameter "control resource set zero" sequentially correspond to indexes 0 to 15 in the table. The parameter "pattern of multiplexing an SSB and a CORESET (SS/PBCH block and CORESET multiplexing pattern)" indicates a pattern of multiplexing the SSB and a corresponding CORESET #0 that have a QCL relationship. When the multiplexing pattern is "1", it indicates that the SSB and the corresponding CORESET #0 that have the QCL relationship exist in a TDM manner. When the multiplexing pattern is "3", it indicates that the SSB and the corresponding CORESET #0 that have the QCL relationship exist in an FDM manner.

$$N_{RB}^{CORESET}$$

indicates a number of RBs occupied by the CORESET #0, which may be 24 or 48. The parameter $$N_{symb}^{CORESET}$$

indicates a number of symbols occupied by the CORESET #0, which may be 1 or 2. The parameter "offset (offset)" indicates a spacing between an RB with a smallest index in the SSB and an RB with a smallest index in the CORESET #0, in a unit of an RB, namely, an RB-level offset. The parameter $K_{SSB}$ may be represented by using the parameter "SSB-subcarrier offset" in the MIB.

Optionally, in some embodiments, the PDCCH-configuration SIB 1 includes the search space zero and the control resource set zero. The control resource set zero includes a number of resource blocks RBs occupied by the control resource set CORESET #0, and the number of RBs is 96.

Optionally, in some embodiments, if the pattern of multiplexing the SSB and the CORESET #0 is 1, and a number of RBs occupied by the SSB is k, a first spacing included in the control resource set zero is any value of 0 to (96-k). The first spacing indicates the spacing between the RB with the smallest index in the SSB and the RB with the smallest index in the CORESET #0.

Alternatively, if the pattern of multiplexing the SSB and the CORESET #0 is 2 or 3, a first spacing is determined based on a value of an offset between the SSB and a subcarrier in the CRB.

Optionally, in some embodiments, if the pattern of multiplexing the SSB and the CORESET #0 is 2 or 3, if the value of the offset between the SSB and the subcarrier in the CRB is equal to 0, the first spacing is k or –k; or if the value of the offset between the SSB and the subcarrier in the CRB is greater than 0, the first spacing is (k+1) or –(k+1).

It should be noted that the CORESET #0 in this embodiment of this application is a CORESET of a type 0-PDCCH search space set.

Manner 1: The Pattern of Multiplexing the SSB and the CORESET #0 is 1.

Figure 6:
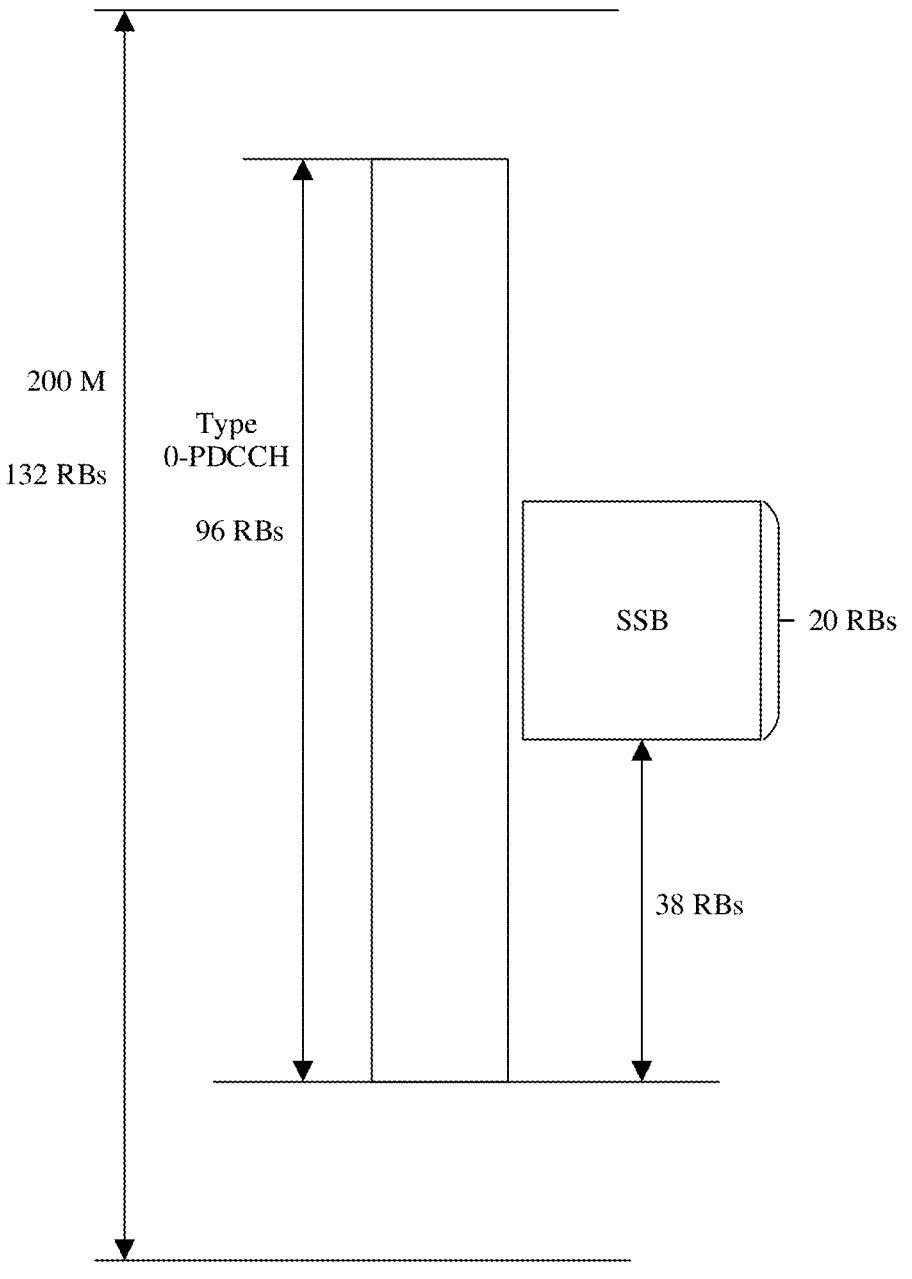
FIG. 6 is a schematic diagram of positions of an SSB and a CORESET #0 according to an embodiment of this application.

In a possible implementation, the SSB is located in the middle of a bandwidth occupied by the CORESET #0. FIG. 6 is a schematic diagram of positions of the SSB and the CORESET #0 according to an embodiment of this application.

Refer to FIG. 6. In the legend, it is assumed that a channel bandwidth is 200 MHz. In this case, a number of available RBs is 132. When a type 0-PDCCH channel including the CORESET #0 occupies 96 RBs, if k is 20, the spacing between the RB with the smallest index in the SSB and the RB with the smallest index in the CORESET #0 is 38 RBs.

Figure 7A:
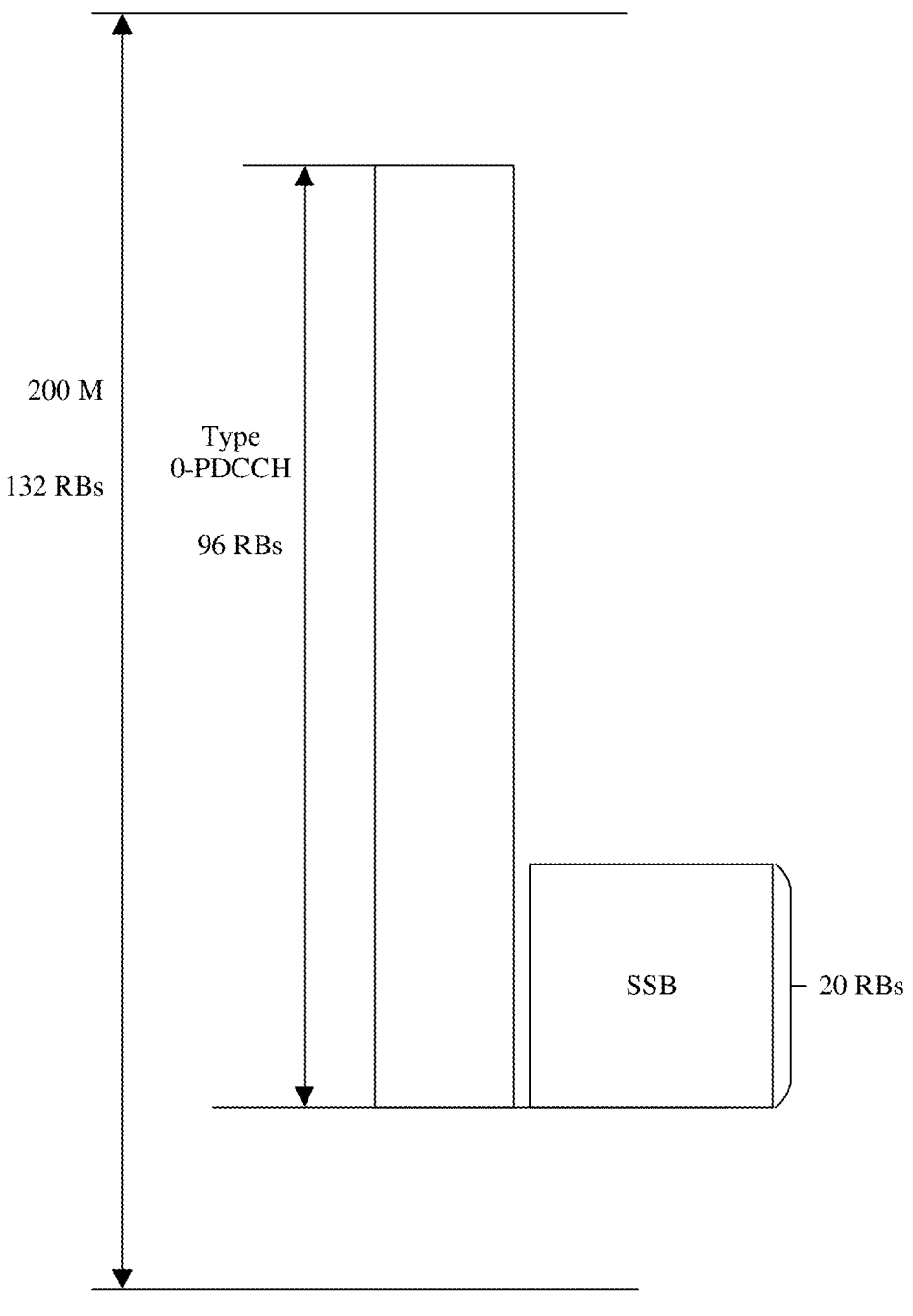
FIG. 7(*a*) and FIG. 7(*b*) are another schematic diagram of positions of an SSB and a CORESET #0 according to an embodiment of this application.
Figure 7B:
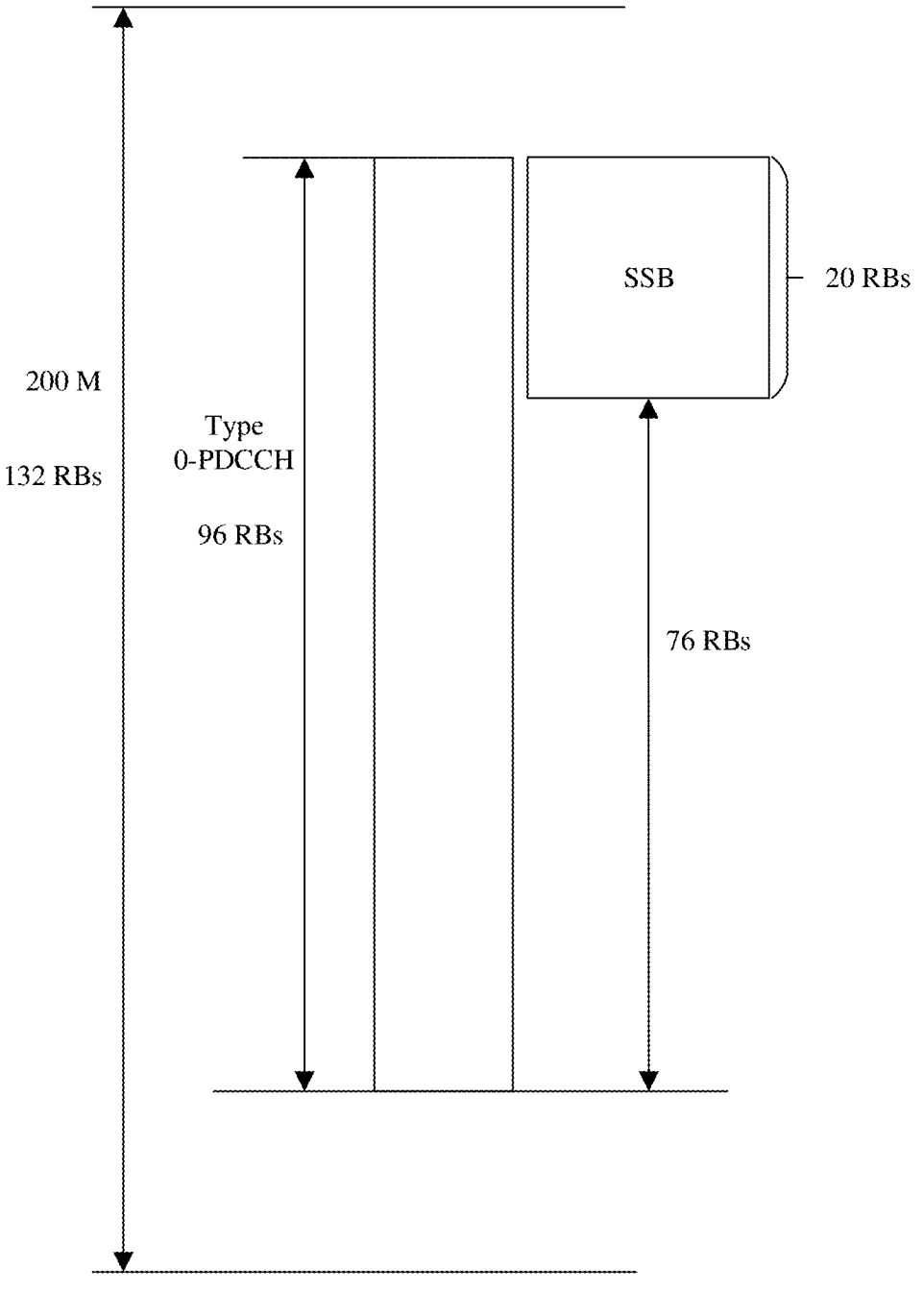

In another possible implementation, the SSB is located on one side of a bandwidth occupied by the CORESET #0. FIG. 7(a) and FIG. 7(b) are another schematic diagram of positions of the SSB and the CORESET #0 according to an embodiment of this application.

Refer to FIG. 7(a). It is assumed that a channel bandwidth is 200 MHz. In this case, a number of available RBs is 132. When a type 0-PDCCH channel including the CORESET #0 occupies 96 RBs, if k is 20, and the SSB is located on a side that has a smallest index and that is of the bandwidth occupied by the CORESET #0, the spacing between the RB with the smallest index in the SSB and the RB with the smallest index in the CORESET #0 is 0 RBs.

Refer to FIG. 7(b). It is assumed that a channel bandwidth is 200 MHz. In this case, a number of available RBs is 132. When a type 0-PDCCH channel including the CORESET #0 occupies 96 RBs, if k is 20, and the SSB is located on a side that has a largest index and that is of the bandwidth occupied by the CORESET #0, the spacing between the RB with the smallest index in the SSB and the RB with the smallest index in the CORESET #0 is 76 RBs.

Manner 2: The Pattern of Multiplexing the SSB and the CORESET #0 is 3.

Figure 8:
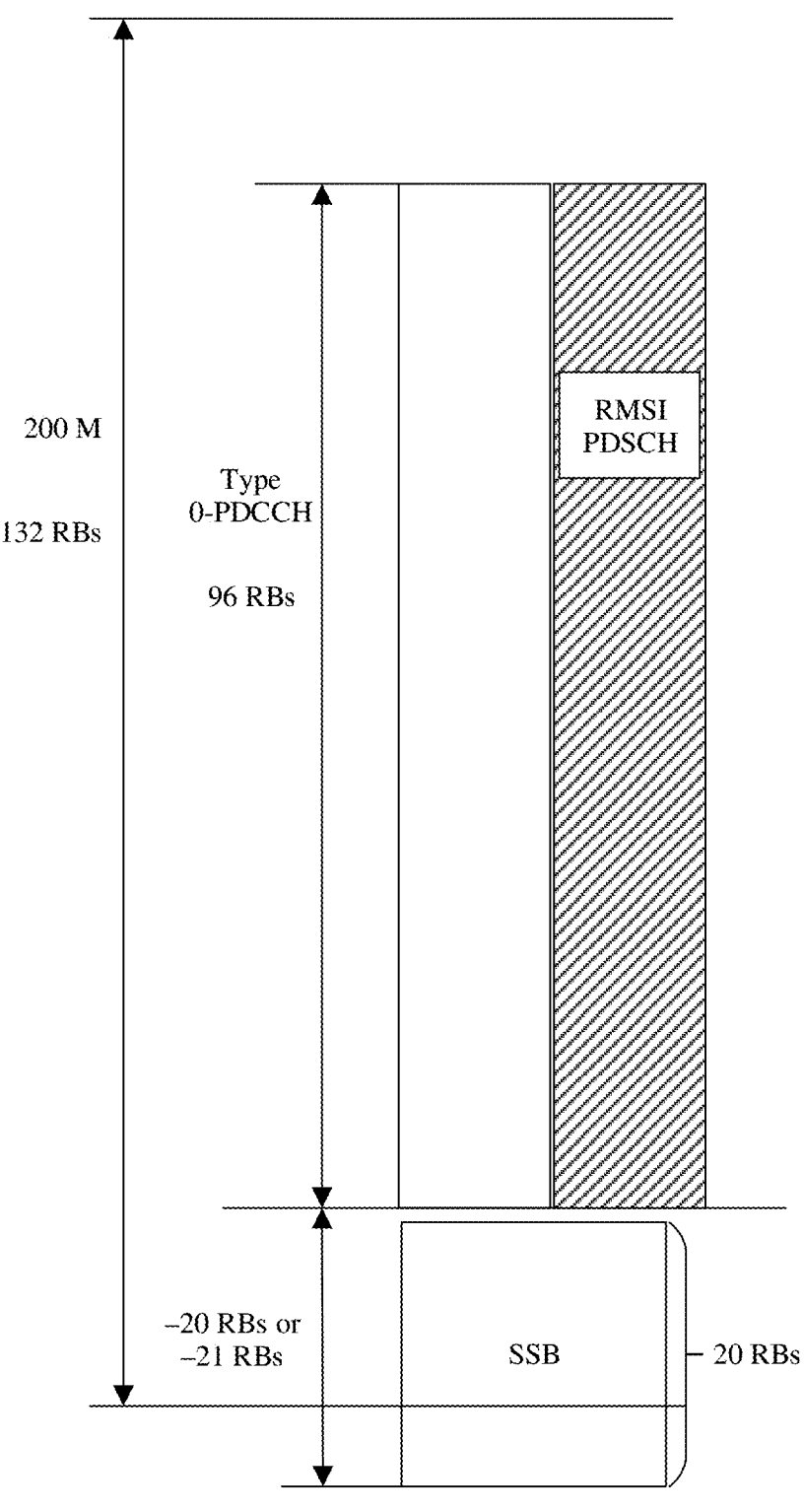
FIG. 8 is still another schematic diagram of positions of an SSB and a CORESET #0 according to an embodiment of this application.

FIG. 8 is still another schematic diagram of positions of the SSB and the CORESET #0 according to an embodiment of this application.

Refer to FIG. 8. In the legend, it is assumed that a channel bandwidth is 200 MHz. In this case, a number of available RBs is 132. When a type 0-PDCCH channel including the CORESET #0 occupies 96 RBs, if k is 20, the spacing between the RB with the smallest index in the SSB and the RB with the smallest index in the CORESET #0 is related to the value of the offset between the SSB and the subcarrier in the CRB.

For example, if the value of the offset between the SSB and the subcarrier in the CRB is equal to 0, the spacing between the RB with the smallest index in the SSB and the RB with the smallest index in the CORESET #0 is –20 RBs. If the value of the offset between the SSB and the subcarrier in the CRB is greater than 0, the spacing between the RB with the smallest index in the SSB and the RB with the smallest index in the CORESET #0 is –21 RBs.

It should be noted that, in some embodiments, if the value of the offset between the SSB and the subcarrier in the CRB is equal to 0, the spacing between the RB with the smallest index in the SSB and the RB with the smallest index in the CORESET #0 is 20 RBs. If the value of the offset between the SSB and the subcarrier in the CRB is greater than 0, the spacing between the RB with the smallest index in the SSB and the RB with the smallest index in the CORESET #0 is 21 RBs.

Manner 3: The Pattern of Multiplexing the SSB and the CORESET #0 is 2.

Figure 9:
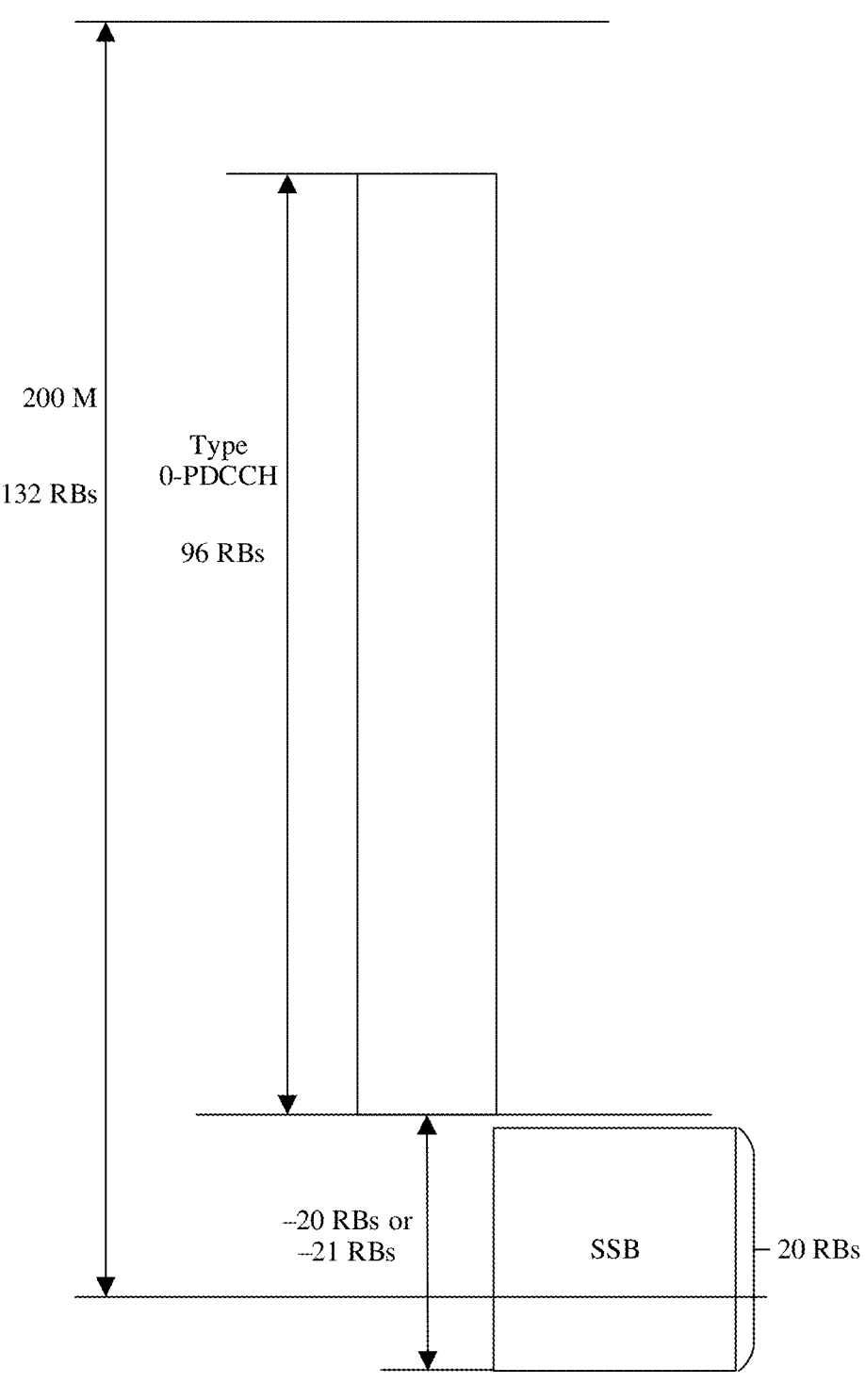
FIG. 9 is yet still another schematic diagram of positions of an SSB and a CORESET #0 according to an embodiment of this application.

FIG. 9 is yet still another schematic diagram of positions of the SSB and the CORESET #0 according to an embodiment of this application.

Refer to FIG. 9. In the legend, it is assumed that a channel bandwidth is 200 MHz. In this case, a number of available RBs is 132. When a type 0-PDCCH channel including the CORESET #0 occupies 96 RBs, if k is 20, the spacing between the RB with the smallest index in the SSB and the RB with the smallest index in the CORESET #0 is related to the value of the offset between the SSB and the subcarrier in the CRB.

For example, if the value of the offset between the SSB and the subcarrier in the CRB is equal to 0, the spacing between the RB with the smallest index in the SSB and the RB with the smallest index in the CORESET #0 is –20 RBs. If the value of the offset between the SSB and the subcarrier in the CRB is greater than 0, the spacing between the RB with the smallest index in the SSB and the RB with the smallest index in the CORESET #0 is –21 RBs.

It should be noted that, in some embodiments, if the value of the offset between the SSB and the subcarrier in the CRB is equal to 0, the spacing between the RB with the smallest index in the SSB and the RB with the smallest index in the CORESET #0 is 20 RBs. If the value of the offset between the SSB and the subcarrier in the CRB is greater than 0, the spacing between the RB with the smallest index in the SSB and the RB with the smallest index in the CORESET #0 is 21 RBs.

Refer to FIG. 8 and FIG. 9. It can be learned that the position of the SSB shown in FIG. 9 is opposite to the position of the SSB shown in FIG. 8, and the SSB is located on a back (right) symbol of the type 0-PDCCH channel corresponding to the CORESET #0. When a subcarrier spacing of the SSB is different from a subcarrier spacing of the CORESET #0, in this design manner, the SSB and the CORESET #0 can be aligned in time domain.

When the number of RBs is 96, the spacing between the RB with the smallest index in the SSB and the RB with the smallest index in the CORESET #0 needs to be redefined based on different patterns of multiplexing the SSB and the CORESET #0. The following describes the number of symbols occupied by the CORESET #0 in the foregoing possible manner. For details, refer to the following.

Optionally, in some embodiments, if the pattern of multiplexing the SSB and the CORESET #0 is 1, the number of symbols occupied by the CORESET #0 is any value of 1 to 4.

Optionally, in some embodiments, if the pattern of multiplexing the SSB and the CORESET #0 is 3, the number of symbols occupied by the CORESET #0 is 2.

If the pattern of multiplexing the SSB and the CORESET #0 is 2, the number of symbols occupied by the CORESET #0 is 1 or 2.

In this embodiment of this application, the number of symbols occupied by the CORESET #0 varies based on the different patterns of multiplexing the SSB and the CORESET #0.

Manner 1: The Pattern of Multiplexing the SSB and the CORESET #0 is 1.

If the pattern of multiplexing the SSB and the CORESET #0 is 1, the number of symbols occupied by the CORESET #0 may be any value of 1 to 4. Refer through Table 16.

TABLE 16

| Pattern of multiplexing the SSB and the CORESET #0 | $N_{RB}^{CORESET}$ | $N_{symb}^{CORESET}$ | Offset (RBs) |
|---|---|---|---|
| 1 | 96 | 1 | 38 |
| 1 | 96 | 2 | 38 |
| 1 | 96 | 3 | 38 |
| 1 | 96 | 4 | 38 |
| 1 | 96 | 1 | 40 |
| 1 | 96 | 2 | 40 |
| 1 | 96 | 3 | 40 |
| 1 | 96 | 4 | 40 |
| 1 | 96 | 1 | 36 |
| 1 | 96 | 2 | 36 |
| 1 | 96 | 1 | 0 |
| 1 | 96 | 2 | 0 |
| 1 | 96 | 3 | 0 |
| 1 | 96 | 4 | 0 |
| 1 | 96 | 1 | 76 |
| 1 | 96 | 2 | 76 |
| 1 | 96 | 3 | 76 |
| 1 | 96 | 4 | 76 |

It should be noted that Table 16 lists only several possible manners. The number of symbols occupied by the CORESET #0 may be the any value of 1 to 4. The offset may be any value of 0 to 76. For brevity, the values are not shown in the table one by one.

Manner 2: The Pattern of Multiplexing the SSB and the CORESET #0 is 3.

If the pattern of multiplexing the SSB and the CORESET #0 is 3, the number of symbols occupied by the CORESET #0 may be 1 or 2. Refer to Table 17.

TABLE 17

| Pattern of multiplexing the SSB and the CORESET #0 | $N_{RB}^{CORESET}$ | $N_{symb}^{CORESET}$ | Offset (RBs) |
|---|---|---|---|
| 3 | 96 | 2 | −20, if $K_{SSB} = 0$ −21, if $K_{SSB} > 0$ |
| 3 | 96 | 2 | 20, if $K_{SSB} = 0$ 21, if $K_{SSB} > 0$ |
| 3 | 96 | 2 | 96 |

Manner 3: The Pattern of Multiplexing the SSB and the CORESET #0 is 2.

If the pattern of multiplexing the SSB and the CORESET #0 is 2, the number of symbols occupied by the CORESET #0 may be 1 or 2. Refer to Table 18.

TABLE 18

| Pattern of multiplexing the SSB and the CORESET #0 | $N_{RB}^{CORESET}$ | $N_{symb}^{CORESET}$ | Offset (RBs) |
|---|---|---|---|
| 2 | 96 | 1 | −20, if $K_{SSB} = 0$ −21, if $K_{SSB} > 0$ |
| 2 | 96 | 1 | 20, if $K_{SSB} = 0$ 21, if $K_{SSB} > 0$ |
| 2 | 96 | 2 | −20, if $K_{SSB} = 0$ −21, if $K_{SSB} > 0$ |
| 2 | 96 | 2 | 20, if $K_{SSB} = 0$ 21, if $K_{SSB} > 0$ |

Optionally, in some embodiments, the PDCCH-configuration SIB 1 includes the search space zero and the control resource set zero. The control resource set zero includes a number of resource blocks RBs occupied by the control resource set CORESET #0. The CORESET #0 in this embodiment of this application is a CORESET of a type 0-PDCCH search space set.

Manner 1: The Pattern of Multiplexing the SSB and the CORESET #0 is 1.

In a possible implementation, the SSB is located in the middle of a bandwidth occupied by the CORESET #0.

A channel bandwidth is 100 MHz. When a subcarrier spacing between the SSB and the control resource set CORESET #0 is 120 kHz, a number of available RBs in the channel bandwidth is 66. When a type 0-PDCCH channel including the CORESET #0 occupies 64 RBs, the spacing between the RB with the smallest index in the SSB and the RB with the smallest index in the CORESET #0 is any one or more of {20, 21, 22, 23, 24} RBs.

A channel bandwidth is 200 MHz. When a subcarrier spacing between the SSB and the control resource set CORESET #0 is 120 kHz, a number of available RBs in the channel bandwidth is 132. When a type 0-PDCCH channel including the CORESET #0 occupies 96 RBs, the spacing between the RB with the smallest index in the SSB and the RB with the smallest index in the CORESET #0 is any one or more of {35, 36, 37, 38, 39, 40, 41, 42} RBs.

A channel bandwidth is 400 MHz. When a subcarrier spacing between the SSB and the control resource set CORESET #0 is 480 kHz, a number of available RBs in the channel bandwidth is 66. When a type 0-PDCCH channel including the CORESET #0 occupies 48 RBs, the spacing between the RB with the smallest index in the SSB and the RB with the smallest index in the CORESET #0 is any one or more of {11, 12, 13, 14, 15, 16} RBs.

A channel bandwidth is 400 MHz. When a subcarrier spacing between the SSB and the control resource set CORESET #0 is 480 kHz, a number of available RBs in the channel bandwidth is 66. When a type 0-PDCCH channel including the CORESET #0 occupies 64 RBs, the spacing between the RB with the smallest index in the SSB and the RB with the smallest index in the CORESET #0 is any one or more of {20, 21, 22, 23, 24, 25, 26, 27, 28} RBs.

In another possible implementation, the SSB is located on one side of a bandwidth occupied by the CORESET #0.

A channel bandwidth is 100 MHz. When a subcarrier spacing between the SSB and the control resource set CORESET #0 is 120 kHz, a number of available RBs is 66. When a type 0-PDCCH channel including the CORESET #0 occupies 64 RBs, and the SSB is located on a side that has a smallest index and that is of the bandwidth occupied by the CORESET #0, the spacing between the RB with the smallest index in the SSB and the RB with the smallest index in the CORESET #0 is any one or more of {0, 1, 2, 3, 4, 5, 6, 7, 8, 9, 10, 11, 12} RBs.

A channel bandwidth is 200 MHz. When a subcarrier spacing between the SSB and the control resource set CORESET #0 is 120 kHz, a number of available RBs is 132. When a type 0-PDCCH channel including the CORESET #0 occupies 96 RBs, and the SSB is located on a side that has a smallest index and that is of the bandwidth occupied by the CORESET #0, the spacing between the RB with the smallest index in the SSB and the RB with the smallest index in the CORESET #0 is any one or more of {0, 1, 2, 3, 4, 5, 6, 7, 8, 9, 10, 11, 12} RBs.

A channel bandwidth is 100 MHz. When a subcarrier spacing between the SSB and the control resource set CORESET #0 is 120 kHz, a number of available RBs is 66. When a type 0-PDCCH channel including the CORESET #0 occupies 64 RBs, and the SSB is located on a side that has a largest index and that is of the bandwidth occupied by the CORESET #0, the spacing between the RB with the smallest index in the SSB and the RB with the smallest index in the CORESET #0 is any one or more of {40, 41, 42, 43, 44} RBs.

A channel bandwidth is 200 MHz. When a subcarrier spacing between the SSB and the control resource set CORESET #0 is 120 kHz, a number of available RBs is 132. When a type 0-PDCCH channel including the CORESET #0 occupies 96 RBs, and the SSB is located on a side that has a largest index and that is of the bandwidth occupied by the CORESET #0, the spacing between the RB with the smallest index in the SSB and the RB with the smallest index in the CORESET #0 is any one or more of {72, 73, 74, 75, 76} RBs.

A channel bandwidth is 400 MHz. When a subcarrier spacing between the SSB and the control resource set CORESET #0 is 480 kHz, a number of available RBs is 66. When a type 0-PDCCH channel including the CORESET #0 occupies 48 RBs, and the SSB is located on a side that has a smallest index and that is of the bandwidth occupied by the CORESET #0, the spacing between the RB with the smallest index in the SSB and the RB with the smallest index in the CORESET #0 is any one or more of {0, 1, 2} RBs.

It is assumed that a channel bandwidth is 400 MHz. When a subcarrier spacing between the SSB and the control resource set CORESET #0 is 480 kHz, a number of available RBs is 66. When a type 0-PDCCH channel including the CORESET #0 occupies 48 RBs, and the SSB is located on a side that has a largest index and that is of the bandwidth occupied by the CORESET #0, the spacing between the RB with the smallest index in the SSB and the RB with the smallest index in the CORESET #0 is any one or more of {21, 22, 23, 24, 25, 26, 27, 28} RBs.

A channel bandwidth is 400 MHz. When a subcarrier spacing between the SSB and the control resource set CORESET #0 is 480 kHz, a number of available RBs is 66. When a type 0-PDCCH channel including the CORESET #0 occupies 64 RBs, and the SSB is located on a side that has a smallest index and that is of the bandwidth occupied by the CORESET #0, the spacing between the RB with the smallest index in the SSB and the RB with the smallest index in the CORESET #0 is any one or more of {0, 1, 2} RBs.

A channel bandwidth is 400 MHz. When a subcarrier spacing between the SSB and the control resource set CORESET #0 is 480 kHz, a number of available RBs is 66. When a type 0-PDCCH channel including the CORESET #0 occupies 64 RBs, and the SSB is located on a side that has a largest index and that is of the bandwidth occupied by the CORESET #0, the spacing between the RB with the smallest index in the SSB and the RB with the smallest index in the CORESET #0 is any one or more of {41, 42, 43, 44} RBs.

Optionally, in a possible implementation.

A channel bandwidth is 400 MHz. When a subcarrier spacing between the SSB and the control resource set CORESET #0 is 480 kHz, a number of available RBs is 66. When a type 0-PDCCH channel including the CORESET #0 occupies 24 RBs, the spacing between the RB with the smallest index in the SSB and the RB with the smallest index in the CORESET #0 is any one or more of {0, 1, 2, 3, 4} RBs.

A channel bandwidth is 400 MHz. When a subcarrier spacing between the SSB and the control resource set CORESET #0 is 960 kHz, a number of available RBs is 32 or 33. When a type 0-PDCCH channel including the CORESET #0 occupies 24 RBs, and the SSB is located on a side that has a largest index and that is of the bandwidth occupied by the CORESET #0, the spacing between the RB with the smallest index in the SSB and the RB with the smallest index in the CORESET #0 is any one or more of {0, 1, 2, 3, 4} RBs.

A channel bandwidth is 400 MHz. When a subcarrier spacing between the SSB and the control resource set CORESET #0 is 480 kHz, in a frequency domain range from 56.8 GHz to 57.2 GHz, the spacing between the RB with the smallest index in the SSB and the RB with the smallest index in the CORESET #0 is any one or more of {0, 1, 2, 3, 4, 5, 6, 7, 8} RBs.

A channel bandwidth is 400 MHz. When a subcarrier spacing between the SSB and the control resource set CORESET #0 is 480 kHz, in a frequency domain range from 70.8 GHz to 71 GHz, the spacing between the RB with the smallest index in the SSB and the RB with the smallest index in the CORESET #0 is any one or more of {0, 1, 2, 3, 4, 5, 6, 7, 8, 9} RBs.

A channel bandwidth is 400 MHz. When a subcarrier spacing between the SSB and the control resource set CORESET #0 is 960 kHz, in a frequency domain range from 56.8 GHz to 57.2 GHz, the spacing between the RB with the smallest index in the SSB and the RB with the smallest index in the CORESET #0 is any one or more of {0, 1, 2, 3, 4} RBs.

Manner 2: The Pattern of Multiplexing the SSB and the CORESET #0 is 2 or 3.

The spacing between the RB with the smallest index in the SSB and the RB with the smallest index in the CORESET

0 is related to the value of the offset between the SSB and the subcarrier in the CRB.

It is assumed that a channel bandwidth is 100 MHz. When a subcarrier spacing between the SSB and the control resource set CORESET #0 is 120 kHz, a number of available RBs is 66. When a type 0-PDCCH channel including the CORESET #0 occupies 64 RBs, for example, if the value of the offset between the SSB and the subcarrier in the CRB is equal to 0, the spacing between the RB with the smallest index in the SSB and the RB with the smallest index in the CORESET #0 is −20 RBs. If the value of the offset between the SSB and the subcarrier in the CRB is greater than 0, the spacing between the RB with the smallest index in the SSB and the RB with the smallest index in the CORESET #0 is −21 RBs. Alternatively, the spacing between the RB with the smallest index in the SSB and the RB with the smallest index in the CORESET #0 is 64 RBs. A parameter k1 is defined, and k1 has any value of {−1, 0, 1}, in a unit of an RB, and is applied to the spacing between the RB with the smallest index in the SSB and the RB with the smallest index in the CORESET #0. In this case, the spacing between the RB with the smallest index in the SSB and the RB with the smallest index in the CORESET #0 is any value of {63, 64, 65} RBs.

It is assumed that a channel bandwidth is 400 MHz. When a subcarrier spacing between the SSB and the control resource set CORESET #0 is 480 kHz, a number of available RBs is 66. When a type 0-PDCCH channel including the CORESET #0 occupies 24 RBs, for example, if the value of the offset between the SSB and the subcarrier in the CRB is equal to 0, the spacing between the RB with the smallest index in the SSB and the RB with the smallest index in the CORESET #0 is −20 RBs. If the value of the offset between the SSB and the subcarrier in the CRB is greater than 0, the spacing between the RB with the smallest index in the SSB and the RB with the smallest index in the CORESET #0 is −21 RBs. Alternatively, the spacing between the RB with the smallest index in the SSB and the RB with the smallest index in the CORESET #0 is 24 RBs. A parameter k2 is defined, and k2 has any value of {−1, 0, 1}, in a unit of an RB, and is applied to the spacing between the RB with the smallest index in the SSB and the RB with the smallest index in the CORESET #0. In this case, the spacing between the RB with the smallest index in the SSB and the RB with the smallest index in the CORESET #0 is any value of {23, 24, 25} RBs.

It is assumed that a channel bandwidth is 400 MHz. When a subcarrier spacing between the SSB and the control resource set CORESET #0 is 480 kHz, a number of available RBs is 66. When a type 0-PDCCH channel including the CORESET #0 occupies 48 RBs, for example, if the value of the offset between the SSB and the subcarrier in the CRB is equal to 0, the spacing between the RB with the smallest index in the SSB and the RB with the smallest index in the CORESET #0 is −20 RBs. If the value of the offset between the SSB and the subcarrier in the CRB is greater than 0, the spacing between the RB with the smallest index in the SSB and the RB with the smallest index in the CORESET #0 is −21 RBs. Alternatively, the spacing between the RB with the smallest index in the SSB and the RB with the smallest index in the CORESET #0 is 48 RBs. A parameter k3 is defined, and k3 has any value of {−1, 0, 1}, in a unit of an RB, and is applied to the spacing between the RB with the smallest index in the SSB and the RB with the smallest index in the CORESET #0. In this case, the spacing between the RB with the smallest index in the SSB and the RB with the smallest index in the CORESET #0 is any value of {47, 48, 49} RBs.

It is assumed that a channel bandwidth is 400 MHz. When a subcarrier spacing between the SSB and the control resource set CORESET #0 is 480 kHz, a number of available RBs is 66. When a type 0-PDCCH channel including the CORESET #0 occupies 64 RBs, for example, if the value of the offset between the SSB and the subcarrier in the CRB is equal to 0, the spacing between the RB with the smallest index in the SSB and the RB with the smallest index in the CORESET #0 is −20 RBs. If the value of the offset between the SSB and the subcarrier in the CRB is greater than 0, the spacing between the RB with the smallest index in the SSB and the RB with the smallest index in the CORESET #0 is −21 RBs. Alternatively, the spacing between the RB with the smallest index in the SSB and the RB with the smallest index in the CORESET #0 is 64 RBs. A parameter k4 is defined, and k4 has any value of {−1, 0, 1}, in a unit of an RB, and is applied to the spacing between the RB with the smallest index in the SSB and the RB with the smallest index in the CORESET #0. In this case, the spacing between the RB with the smallest index in the SSB and the RB with the smallest index in the CORESET #0 is any value of {63, 64, 65} RBs.

It is assumed that a channel bandwidth is 400 MHz. When a subcarrier spacing between the SSB and the control resource set CORESET #0 is 960 kHz, a number of available RBs is 32 or 33. When a type 0-PDCCH channel including the CORESET #0 occupies 24 RBs, for example, if the value of the offset between the SSB and the subcarrier in the CRB is equal to 0, the spacing between the RB with the smallest index in the SSB and the RB with the smallest index in the CORESET #0 is −20 RBs. If the value of the offset between the SSB and the subcarrier in the CRB is greater than 0, the spacing between the RB with the smallest index in the SSB and the RB with the smallest index in the CORESET #0 is −21 RBs. Alternatively, the spacing between the RB with the smallest index in the SSB and the RB with the smallest index in the CORESET #0 is 24 RBs. A parameter k5 is defined, and k5 has any value of {−1, 0, 1}, in a unit of an RB, and is applied to the spacing between the RB with the smallest index in the SSB and the RB with the smallest index in the CORESET #0. In this case, the spacing between the RB with the smallest index in the SSB and the RB with the smallest index in the CORESET #0 is any value of {23, 24, 25} RBs.

FIG. 10 is a schematic flowchart of another communication method 1000 according to an embodiment of this application. The method 1000 may be performed by a terminal device and a network device, or may be performed by a chip in a terminal device and a chip in a network device. The communication method 1000 may include the following steps.

1010: The network device determines MIB information, where the MIB information includes a PDCCH-configuration SIB 1, the PDCCH-configuration SIB 1 includes a control resource set zero, the control resource set zero includes a number of RBs occupied by a CORESET #0, and the number of RBs is 96.

1020: The network device sends the MIB information to the terminal device.

1030: The terminal device receives the MIB information sent by the network device.

1040: The terminal device determines, based on the control resource set zero, a number of consecutive symbols occupied by a type 0-PDCCH.

According to the solution provided in this application, the network device sends the MIB information to the terminal device. The MIB includes the parameter control resource set zero. The number, that is included in the control resource set zero, of RBs occupied by the CORESET #0 is 96. The terminal device can determine, based on the received control resource set zero, the number of consecutive symbols occupied by the type 0-PDCCH.

Optionally, in some embodiments, if a pattern of multiplexing a synchronization signal block SSB and the CORESET #0 is 1, and a number of RBs occupied by the SSB is k, a first spacing included in the control resource set zero is any value of 0 to (96-k). The first spacing indicates a spacing between an RB with a smallest index in the SSB and an RB with a smallest index in the CORESET #0.

Alternatively, if a pattern of multiplexing an SSB and the CORESET #0 is 2 or 3, a first spacing is determined based on a value of an offset between the SSB and a subcarrier in a CRB.

In this embodiment of this application, the PDCCH-configuration SIB 1 may further include search space zero. If the pattern of multiplexing the SSB and the CORESET #0 is 2, the terminal device may listen to an occasion of a type 0-PDCCH common search space set based on the parameter search space zero. The occasion includes a system frame, a slot, and a symbol position in which the channel is listened to. A system frame in which the channel is searched for is the same as a system frame of an SSB that satisfies a second QCL relationship. A slot in which the channel is searched for is the same as a slot of the SSB that satisfies the second QCL relationship. A symbol for searching for the channel is located on one or more symbols before a symbol on which the SSB that satisfies the second QCL relationship is located.

Optionally, in some embodiments, if the pattern of multiplexing the SSB and the CORESET #0 is 2 or 3, if the value of the offset between the SSB and the subcarrier in the CRB is equal to 0, the first spacing is k or −k; or if the value of the offset between the SSB and the subcarrier in the CRB is greater than 0, the first spacing is (k+1) or −(k+1).

Optionally, in some embodiments, if the pattern of multiplexing the SSB and the CORESET #0 is 1, a number of symbols occupied by the CORESET #0 is any value of 1 to 4.

Optionally, in some embodiments, if the pattern of multiplexing the SSB and the CORESET #0 is 3, a number of symbols occupied by the CORESET #0 is 2.

If the pattern of multiplexing the SSB and the CORESET #0 is 2, a number of symbols occupied by the CORESET #0 is 1 or 2.

In this embodiment of this application, when the number of RBs occupied by the CORESET #0 is 96, for the pattern of multiplexing the SSB and the CORESET #0 and the value of the offset between the SSB and the subcarrier in the CRB, refer to related content in the method 300. Details are not described herein again.

Figure 11:
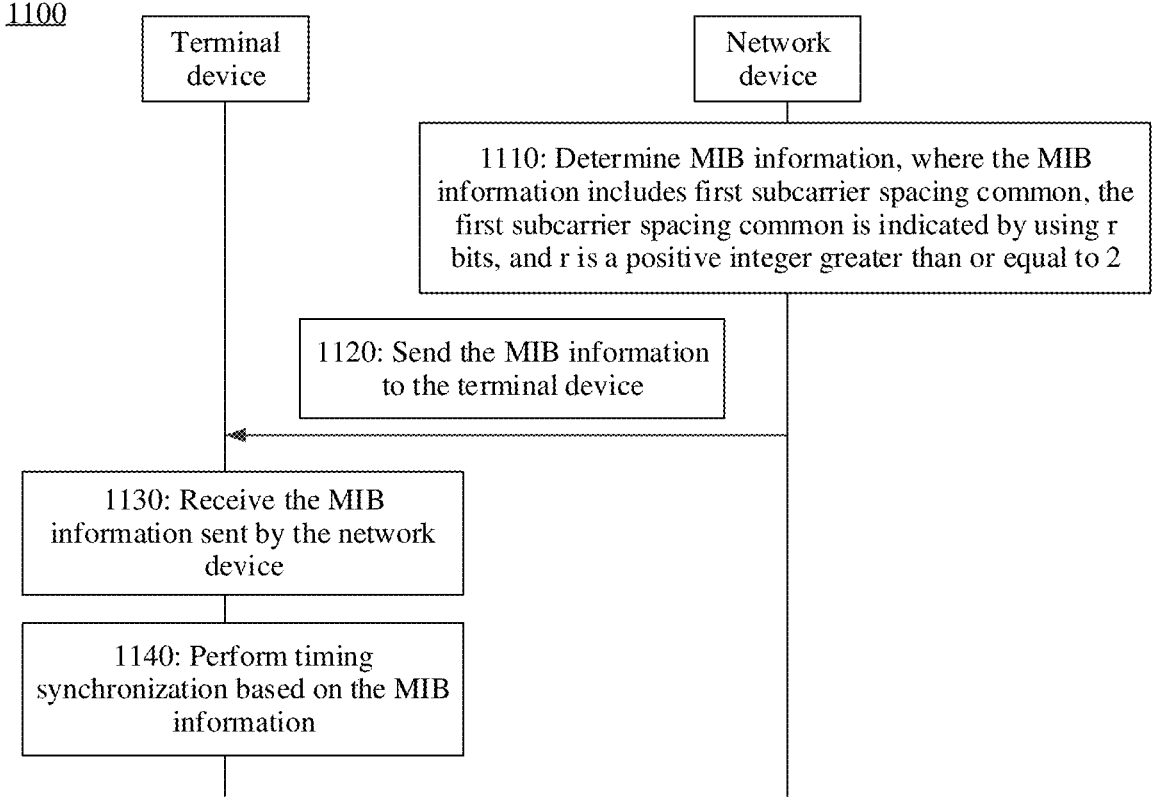
FIG. 11 is a schematic flowchart of still another communication method according to an embodiment of this application.

FIG. 11 is a schematic flowchart of another communication method 1100 according to an embodiment of this application. The method 1100 may be performed by a terminal device and a network device, or may be performed by a chip in a terminal device and a chip in a network device. The communication method 1100 may include the following steps.

1110: The network device determines MIB information, where the MIB information includes subcarrier spacing common, the subcarrier spacing common is indicated by using r bits, and r is a positive integer greater than or equal to 2.

1120: The network device sends the MIB information to the terminal device.

1130: The terminal device receives the MIB information sent by the network device.

1140: The terminal device performs timing synchronization based on the MIB information.

According to the solution provided in this application, the network device sends the MIB information to the terminal device. The MIB includes the subcarrier spacing common, and the subcarrier spacing common is indicated by using at least two bits. The terminal device can perform timing synchronization based on the received MIB information.

Optionally, in some embodiments, the r bits include one initial bit indicating the subcarrier spacing common and (r−1) bits indicating a sixth parameter. The sixth parameter includes at least one of the following parameters:

an SSB-subcarrier offset in the MIB information and a PDCCH-configuration SIB 1 in the MIB information.

Optionally, in some embodiments, the PDCCH-configuration SIB 1 includes search space zero and a control resource set zero.

In this embodiment of this application, a value of r may be a positive integer greater than or equal to 2. The r bits may include the bit indicating the subcarrier spacing common and the (r−1) bits indicating the SSB-subcarrier offset. Alternatively, the r bits may include the bit indicating the subcarrier spacing common and the (r−1) bits indicating the PDCCH-configuration SIB 1. Alternatively, the r bits may include the bit indicating the carrier spacing common and the (r−1) bits indicating the SSB-subcarrier offset and the PDCCH-configuration SIB 1. This is not limited.

According to the solution provided in this application, for a system operating on a licensed band, the subcarrier spacing common can be indicated by using the r bits. The r bits include the initial bit indicating the subcarrier spacing common and the (r−1) bits indicating the sixth parameter. In other words, when a MIB payload capacity is not expanded, the bit indicating the subcarrier spacing common can include a corresponding bit of another parameter in the MIB. This can improve system performance.

The following specifically describes a bit indication manner of the subcarrier spacing common.

Manner 1

The r bits include the initial bit indicating the subcarrier spacing common and the (r−1) bits indicating a seventh parameter. The seventh parameter is any parameter in the sixth parameter, the seventh parameter is indicated by using (s−(r−1)) bits, and s is an initial number indicating the seventh parameter.

Manner 2

The r bits include the initial bit indicating the subcarrier spacing common and the (r−1) bits indicating a seventh parameter. The seventh parameter is any parameter in the sixth parameter, the seventh parameter is indicated by using s bits, and s is an initial number indicating the seventh parameter.

The seventh parameter in this embodiment of this application may be the SSB-subcarrier offset in the MIB information, or may be the search space zero of the PDCCH-configuration SIB 1, or may be the control resource set zero of the PDCCH-configuration SIB 1.

For example, r may be 2. To be specific, the subcarrier spacing common may be indicated by using two bits. For a specific indication manner, refer to the following.

(a) The two bits include the initial bit indicating the subcarrier spacing common and one bit indicating the parameter "SSB-subcarrier offset".

①  In a possible implementation, if s=4, that is, an initial number of bits indicating the parameter "SSB-subcarrier offset" is 4, in this embodiment of this application, one of the four bits indicating the parameter "SSB-subcarrier offset" may be misappropriated to indicate the parameter subcarrier spacing common. Therefore, in this case, there are three bits indicating the parameter "SSB-subcarrier offset".

② In another possible implementation, if s=4, that is, an initial number of bits indicating the parameter "SSB-subcarrier offset" is 4, in this embodiment of this application, one of the four bits indicating the parameter "SSB-subcarrier offset" may be borrowed to indicate the parameter subcarrier spacing common. Although the bit of the parameter "SSB-subcarrier offset" is borrowed to indicate the subcarrier spacing common, there may still be four initial bits indicating the parameter "SSB-subcarrier offset", that is, the parameter "SSB-subcarrier offset" may still be indicated by using the initial four bits.

(b) The two bits include the initial bit indicating the subcarrier spacing common and one bit indicating the parameter "PDCCH-configuration SIB 1".

Because the parameter "PDCCH-configuration SIB 1" is indicated by using eight bits. The parameter "PDCCH-configuration SIB 1" includes the parameter "search space zero" (which occupies four bits) and the parameter "control resource set zero" (which occupies four bits). Therefore, the two bits indicating the subcarrier spacing common may include the initial bit indicating the parameter "subcarrier spacing common" and one bit indicating the parameter "search space zero", or may include the initial bit indicating the parameter "subcarrier spacing common" and one bit indicating the parameter "control resource set zero".

① In a possible implementation, if s=4 (the four bits may be the four bits indicating the parameter "search space zero"), that is, an initial number of bits indicating the parameter "search space zero" is 4, in this embodiment of this application, one of the four bits indicating the parameter "search space zero" may be misappropriated to indicate the parameter subcarrier spacing common. Therefore, in this case, there are three bits indicating the parameter "search space zero". In other words, in this case, the parameter "PDCCH-configuration SIB 1" may be indicated by using seven bits (including the three bits indicating the parameter "search space zero" and the four bits indicating the parameter "control resource set zero").

② In another possible implementation, if s=4 (the four bits may be the four bits indicating the parameter "search space zero"), that is, an initial number of bits indicating the parameter "search space zero" is 4, in this embodiment of this application, one of the four bits indicating the parameter "search space zero" may be borrowed to indicate the parameter subcarrier spacing common. Although the bit of the parameter "search space zero" is borrowed to indicate the subcarrier spacing common, there may still be four initial bits indicating the parameter "search space zero", that is, the parameter "search space zero" may still be indicated by using the initial four bits. In other words, in this case, the parameter "PDCCH-configuration SIB 1" may still be indicated by using the eight bits (including the four bits indicating the parameter "search space zero" and the four bits indicating the parameter "control resource set zero").

③ In another possible implementation, if s=4 (the four bits may be the four bits indicating the parameter "control resource set zero"), that is, an initial number of bits indicating the parameter "control resource set zero" is 4, in this embodiment of this application, one of the four bits indicating the parameter "control resource set zero" may be misappropriated to indicate the parameter subcarrier spacing common. Therefore, in this case, there are three bits indicating the parameter "control resource set zero". In other words, in this case, the parameter "PDCCH-configuration SIB 1" may still be indicated by using seven bits (including the four bits indicating the parameter "search space zero" and the three bits indicating the parameter "control resource set zero").

④ In another possible implementation, if s=4 (the four bits may be the four bits indicating the parameter "control resource set zero"), that is, an initial number of bits indicating the parameter "control resource set zero" is 4, in this embodiment of this application, one of the four bits indicating the parameter "control resource set zero" may be borrowed to indicate the parameter subcarrier spacing common. Although the bit of the parameter "control resource set zero" is borrowed to indicate the subcarrier spacing common, there may still be four initial bits indicating the parameter "control resource set zero", that is, the parameter "control resource set zero" may still be indicated by using the initial four bits. In other words, in this case, the parameter "PDCCH-configuration SIB 1" may still be indicated by using the eight bits (including the four bits indicating the parameter "search space zero" and the four bits indicating the parameter "control resource set zero").

It should be noted that, regardless of whether the parameter subcarrier spacing common is indicated in Manner 1 or Manner 2, the parameter "subCarrierSpacingCommon" in the MIB information may be:

subCarrierSpacingCommon {scs15or60or120, scs30or120or480,960}

It should be further noted that, when a band on which the network device and the terminal device work is less than 52.6 GHz, the parameter subcarrier spacing common may be indicated by using only the initial bit indicating the subcarrier spacing common. The terminal device may consider by default that the parameter "subcarrier spacing common" occupies one bit. When a band on which the network device and the terminal device work is greater than 52.6 GHz, the parameter subcarrier spacing common may be indicated by using the initial bit indicating the subcarrier spacing common and one bit indicating another parameter. The terminal device may consider by default that the parameter "subcarrier spacing common" occupies two bits.

According to the solution provided in this application, the subcarrier spacing common in the MIB information can be indicated by using the r bits. The r bits include the initial bit indicating the subcarrier spacing common and the (r−1) bits indicating the seventh parameter. The seventh parameter is indicated by using the (s−(r−1)) bits, and s is the initial number indicating the seventh parameter. In this implementation, the subcarrier spacing common can be indicated by using the corresponding bit of the another parameter in the MIB. This can avoid indicating the subcarrier spacing common by expanding the MIB load capacity, thereby improving system performance. In addition, the subcarrier spacing common in the MIB information can be indicated by using the r bits. The r bits include the initial bit indicating the subcarrier spacing common and the (r−1) bits indicating the seventh parameter. The seventh parameter is indicated by using the s bits. In this implementation, the subcarrier spacing common can be indicated by using the corresponding bit of the another parameter in the MIB. This can avoid indicating the subcarrier spacing common by expanding the MIB load capacity, and does not affect bit indication of the seventh parameter, thereby improving system performance.

It is mentioned above that the r bits indicating the subcarrier spacing common may include the initial bit indicating the subcarrier spacing common and the (r−1) bits indicating the seventh parameter. In a possible implementation, the seventh parameter may be the SSB-subcarrier offset. In this implementation, an offset value of the SSB-subcarrier offset may be determined in the following manner.

Optionally, in some embodiments, the seventh parameter is the SSB-subcarrier offset in the MIB information. The value of the SSB-subcarrier offset is determined based on a combination of an SCS of an SSB and an SCS of a CRB.

Optionally, in some embodiments, if the SCS of the SSB and the SCS of the CRB each are a first frequency, the value of the SSB-subcarrier offset is determined based on a preset threshold.

Alternatively, if the SCS of the SSB is a second frequency, and the SCS of the CRB is a first frequency, the value of the SSB-subcarrier offset is a value indicated by the (r−1) bits of the seventh parameter.

Alternatively, if the SCS of the SSB is a third frequency, and the SCS of the CRB is a first frequency, the value of the SSB-subcarrier offset is less than or equal to a value indicated by the (r−1) bits of the seventh parameter.

In this embodiment of this application, the offset value of the SSB-subcarrier offset may be understood as an offset value between the SSB and the CRB at a subcarrier granularity. It is assumed that the offset value between the SSB and the CRB at the subcarrier granularity is $K_{SSB}$. The offset value is related to the four bits indicating the parameter "SSB-subcarrier offset" (that is, indicating a parameter $\overline{K_{ssb\_1}}$).

For example, it is assumed that the first frequency, the second frequency, and the third frequency in this embodiment of this application are respectively 120 kHz, 480 kHz, and 960 kHz.

If the SCS of the SSB and the SCS of the CRB each are the first frequency, that is, the SCS of the SSB and the SCS of the CRB are {120 kHz, 120 kHz}, it is assumed that the preset threshold is 12. If $\overline{K_{ssb\_1}} \geq 12$, $K_{SSB} = \overline{K_{ssb\_1}}$. Otherwise, $K_{SSB} = 2\lfloor \overline{K_{ssb\_1}}/2 \rfloor$. The symbol $\lfloor\ \rfloor$ represents rounding down.

For example, if $\overline{K_{ssb\_1}} = 14$, $K_{SSB} = 14$. If $\overline{K_{ssb\_1}} = 10$, $K_{SSB} =$. If $\overline{K_{ssb\_1}} = 9$, $K_{SSB} = 8$.

If the SCS of the SSB is the second frequency, and the SCS of the CRB is the first frequency, that is, the SCS of the SSB and the SCS of the CRB are {480 kHz, 120 kHz}, $K_{SSB} = \overline{K_{ssb\_1}}$, that is, a value of $K_{SSB}$ is a value indicated by the four bits of the parameter $\overline{K_{ssb\_1}}$.

For example, if $\overline{K_{ssb\_1}} = 14$, $K_{SSB} = 14$.

If the SCS of the SSB is the third frequency, and the SCS of the CRB is the first frequency, that is, the SCS of the SSB and the SCS of the CRB are {960 kHz, 120 kHz}, that is, a value of $K_{SSB}$ is less than or equal to a value indicated by four bits of the parameter $\overline{K_{ssb\_1}}$.

For example, if $\overline{K_{ssb\_1}} = 14$, $K_{SSB} = 12$ or $K_{SSB} = 10$.

Optionally, in some embodiments, the (r−1) bits are (r−1) most significant bits in the seventh parameter.

Alternatively, the (r−1) bits are (r−1) least significant bits in the seventh parameter.

Alternatively, the (r−1) bits are any (r−1) bits in the seventh parameter.

In this embodiment of this application, it is assumed that the parameter subcarrier spacing common is indicated by using two bits, and the two bits include the initial bit indicating the parameter "subcarrier spacing common" and the bit indicating the parameter "SSB-subcarrier offset". In this case, the bit indicating the parameter "SSB-subcarrier offset" may be one most significant bit in the parameter "SSB-subcarrier offset". Alternatively, the bit indicating the parameter "SSB-subcarrier offset" may be one least significant bit in the parameter "SSB-subcarrier offset". Alternatively, the bit indicating the parameter "SSB-subcarrier offset" may be any one bit in the parameter "SSB-subcarrier offset". This is not limited.

It should be noted that the most significant bit in the parameter "SSB-subcarrier offset" in this embodiment of this application may be understood as follows: If it is assumed that the parameter "SSB-subcarrier offset" is initially indicated by using four bits (for example, 1011), the most significant bit in the parameter "SSB-subcarrier offset" is a leftmost $1^{st}$ bit, namely, "1".

The least significant bit in the parameter "SSB-subcarrier offset" in this embodiment of this application may be understood as follows: If it is assumed that the parameter "SSB-subcarrier offset" is initially indicated by using four bits (for example, 1011), the least significant bit in the parameter "SSB-subcarrier offset" is a rightmost $1^{st}$ bit, namely, "1".

In conclusion, a manner of indicating the parameter "subcarrier spacing common" by using the two bits may be shown in Table 19.

TABLE 19

| Bit/frequency | FR 1 | FR 2 | Above 52.6 GHz |
|---|---|---|---|
| 00 | 15 kHz | 60 kHz | 120 kHz |
| 01 | 30 kHz | 120 kHz | 480 kHz |
| 10 | — | — | 960 kHz |
| 11 | — | — | — |

Refer to Table 19. When bits configured by the network device are "00", for a system operating in the FR 1, the terminal device considers by default that an SCS used to send a SIB 1 and send a message 2/4 in an initial access random access process and other OSI is 15 kHz. For a system operating in the FR 2, the terminal device considers by default that an SCS used by a channel sending the foregoing several pieces of information is 60 kHz. For a system operating at 52.6 GHz or above (for example, 52.6 GHz to 71 GHz), the terminal device considers by default that an SCS used by a channel sending the foregoing several pieces of information is 120 kHz.

The foregoing shows several possible manners indicating the parameter "subcarrier spacing common" when r is 2. It may be understood that a number of bits indicating the parameter "subcarrier spacing common" may alternatively be 3, 4, or the like. This is not limited. For specific content, refer to the foregoing bit indication manner of the Q value. Details are not described again.

It should be noted that, in some embodiments, the r bits may alternatively include r bits indicating the parameter "SSB-subcarrier offset", or may include r bits indicating the parameter "PDCCH-configuration SIB 1", or may include r1 bits indicating the parameter "SSB-subcarrier offset" and (r−r1) bits indicating the parameter "PDCCH-configuration SIB 1". This is not limited. In other words, in this indication manner, the r bits indicating the parameter "subcarrier spacing common" do not include the initial bit indicating the parameter "subcarrier spacing common".

It may be understood that the value shown above is merely an example for description, and may alternatively be another value, and should not constitute a particular limitation on this application.

Figure 12:
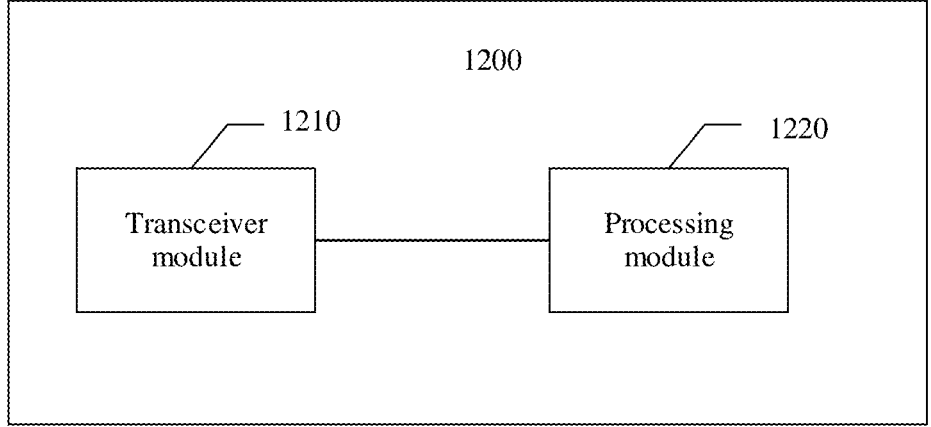
FIG. 12 is a schematic diagram of a structure of a communication apparatus according to an embodiment of this application.
Figure 13:
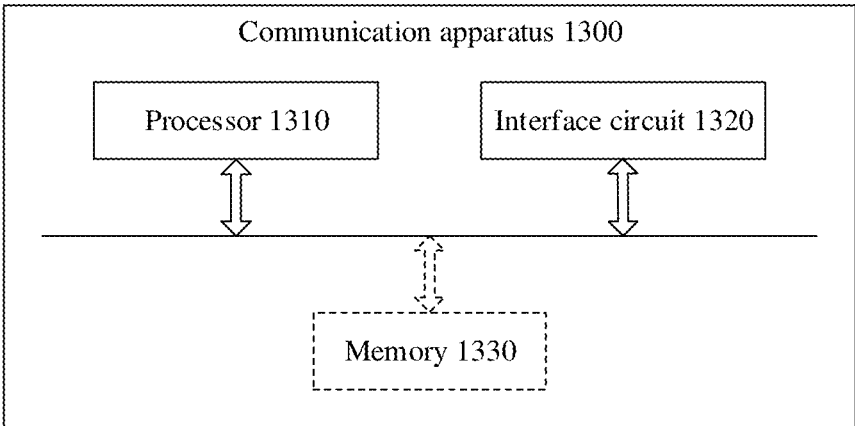
FIG. 13 is a schematic diagram of a structure of another communication apparatus according to an embodiment of this application.

FIG. 12 and FIG. 13 are schematic diagrams of structures of possible communication apparatuses according to embodiments of this application. These communication apparatuses may implement the functions of the terminal device or the network device in the foregoing method embodiments, and therefore may also achieve the advantageous effects of the foregoing method embodiments. In embodiments of this application, the communication apparatuses each may be any one of the terminal device 20 to the terminal device 40 shown in FIG. 1, or may be the network device 10 shown in FIG. 1, or may be a module (for example, a chip) applied to the terminal device or the network device.

FIG. 12 is a schematic diagram of a structure of a communication apparatus 1200 according to an embodiment of this application. The apparatus 1200 may include a transceiver module 1210 and a processing module 1220.

When the communication apparatus 1200 is configured to implement a function of the terminal device in the method embodiment in FIG. 3, the transceiver module 1210 is configured to receive first information sent by a network device. The first information includes a Q value or a first parameter, and the first parameter indicates a status of a DBTW. The processing module 1220 is configured to determine the status of the DBTW based on the Q value or the first parameter.

Optionally, in some embodiments, the processing module 1220 is further configured to:

if the Q value is greater than or equal to a first threshold, determine that the DBTW is in a disabled state; or if the Q value is less than a first threshold, determine the status of the DBTW based on a DBTW value.

Optionally, in some embodiments, the processing module 1220 is further configured to:

if the DBTW value is less than or equal to a second threshold, determine that the DBTW is in the disabled state; or if the DBTW value is greater than a second threshold, determine that the DBTW is in an enabled state.

Optionally, in some embodiments, the second threshold is time duration from a $1^{st}$ symbol in a slot in which a first synchronization signal block SSB is located to a last symbol in a slot in which a second SSB is located. An index of the first SSB is 0, and an index of the second SSB is (Q−1).

Alternatively, the second threshold is time duration from a $1^{st}$ symbol in a slot in which a third SSB is located to a last symbol in a slot in which a fourth SSB is located. The third SSB is located in a first SSB group, and the fourth SSB is located in a second SSB group. The first SSB group is a $1^{st}$ group whose bit is configured as "1" from the left in a second parameter. The second SSB group is a $1^{st}$ group whose bit is configured as "1" from the right in the second parameter.

Alternatively, the second threshold is time duration from a $1^{st}$ symbol in a slot in which a fifth SSB is located to a last symbol in a slot in which a sixth SSB is located. The fifth SSB is an SSB with a smallest index in successfully sent SSBs, and the sixth SSB is an SSB with a largest index in the successfully sent SSBs.

Optionally, in some embodiments, the second threshold is time duration from a slot in which a first SSB is located to a slot in which a second SSB is located. An index of the first SSB is 0, and an index of the second SSB is (Q−1).

Alternatively, the second threshold is time duration from a slot in which a third SSB is located to a slot in which a fourth SSB is located. The third SSB is located in a first SSB group, and the fourth SSB is located in a second SSB group. The first SSB group is a $1^{st}$ group whose bit is configured as "1" from the left in a second parameter. The second SSB group is a $1^{st}$ group whose bit is configured as "1" from the right in the second parameter.

Alternatively, the second threshold is time duration from a slot in which a fifth SSB is located to a slot in which a sixth SSB is located. The fifth SSB is an SSB with a smallest index in successfully sent SSBs, and the sixth SSB is an SSB with a largest index in the successfully sent SSBs.

Optionally, in some embodiments, the second threshold is time duration from a $1^{st}$ symbol index of a first SSB to a last symbol index of a second SSB. An index of the first SSB is 0, and an index of the second SSB is (Q−1).

Alternatively, the second threshold is time duration from a $1^{st}$ symbol index of a third SSB to a last symbol index of a fourth SSB. The third SSB is located in a first SSB group, and the fourth SSB is located in a second SSB group. The first SSB group is a $1^{st}$ group whose bit is configured as "1" from the left in a second parameter. The second SSB group is a $1^{st}$ group whose bit is configured as "1" from the right in the second parameter.

Alternatively, the second threshold is time duration from a $1^{st}$ symbol index of a fifth SSB to a last symbol index of a sixth SSB. The fifth SSB is an SSB with a smallest index in successfully sent SSBs, and the sixth SSB is an SSB with a largest index in the successfully sent SSBs.

Optionally, in some embodiments, the Q value is indicated by using n bits, and n is a positive integer greater than 2. The n bits include at least one bit indicating a third parameter. The third parameter includes at least one of the following parameters:

subcarrier spacing common in master information block MIB information, an SSB-subcarrier offset in the MIB information, and a physical downlink control channel-configuration system information block 1 PDCCH-configuration SIB 1 in the MIB information.

Optionally, in some embodiments, the n bits include n1 bits indicating a fourth parameter and (n−n1) bits indicating a fifth parameter. The fourth parameter is any parameter in the third parameter, and the fifth parameter is a parameter in the third parameter other than the fourth parameter. The fifth parameter is indicated by using m−(n−n1) bits, and m is an initial number indicating the fifth parameter.

Optionally, in some embodiments, the n bits include n1 bits indicating a fourth parameter and (n−n1) bits indicating a fifth parameter. The fourth parameter is any parameter in the third parameter, and the fifth parameter is a parameter in the third parameter other than the fourth parameter. The fifth parameter is indicated by using m bits, m is an initial number indicating the fifth parameter, and (n−n1)<m.

Optionally, in some embodiments, the fifth parameter is the SSB-subcarrier offset in the MIB information. An offset value of the SSB-subcarrier offset is determined based on a combination of a subcarrier spacing SCS of an SSB and an SCS of a common resource block CRB.

Optionally, in some embodiments, if the SCS of the SSB and the SCS of the CRB each are a first frequency, the offset value of the SSB-subcarrier offset is determined based on a preset threshold.

Alternatively, if the SCS of the SSB is a second frequency, and the SCS of the CRB is a first frequency, the offset value of the SSB-subcarrier offset is a value indicated by the (n−n1) bits of the fifth parameter.

Alternatively, if the SCS of the SSB is a third frequency, and the SCS of the CRB is a first frequency, the offset value of the SSB-subcarrier offset is less than or equal to a value indicated by the (n–n1) bits of the fifth parameter.

Optionally, in some embodiments, the (n–n1) bits are (n–n1) most significant bits in the fifth parameter.

Alternatively, the (n–n1) bits are (n–n1) least significant bits in the fifth parameter.

Alternatively, the (n–n1) bits are any (n–n1) bits in the fifth parameter.

Optionally, in some embodiments, the processing module 1220 is further configured to:

if the first parameter includes a parameter indicating that the DBTW is enabled, determine that the DBTW is in an enabled state; or if the first parameter includes a parameter indicating that the DBTW is disabled, determine that the DBTW is in an enabled state.

Optionally, in some embodiments, the first parameter is carried in serving cell configuration common in radio resource control RRC signaling or a serving cell configuration common SIB in SIB 1 information.

Alternatively, the Q value or the DBTW value is carried in serving cell configuration common in RRC signaling or a serving cell configuration common SIB in the MIB information.

Optionally, in some embodiments, the PDCCH-configuration SIB 1 includes search space zero and a control resource set zero. The control resource set zero includes a number of resource blocks RBs occupied by the control resource set CORESET #0, and the number of RBs is 96.

Optionally, in some embodiments, if a pattern of multiplexing the SSB and the CORESET #0 is 1, and a number of RBs occupied by the SSB is k, a first spacing included in the control resource set zero is any value of 0 to (96-k). The first spacing indicates a spacing between an RB with a smallest index in the SSB and an RB with a smallest index in the CORESET #0.

Alternatively, if a pattern of multiplexing the SSB and the CORESET #0 is 2 or 3, a first spacing is determined based on a value of an offset between the SSB and a subcarrier in the CRB.

Optionally, in some embodiments, if the pattern of multiplexing the SSB and the CORESET #0 is 2 or 3, if the value of the offset between the SSB and the subcarrier in the CRB is equal to 0, the first spacing is k or –k; or if the value of the offset between the SSB and the subcarrier in the CRB is greater than 0, the first spacing is (k+1) or –(k+1).

Optionally, in some embodiments, if the pattern of multiplexing the SSB and the CORESET #0 is 1, a number of symbols occupied by the CORESET #0 is any value of 1 to 4.

Optionally, in some embodiments, if the pattern of multiplexing the SSB and the CORESET #0 is 3, a number of symbols occupied by the CORESET #0 is 2.

If the pattern of multiplexing the SSB and the CORESET #0 is 2, a number of symbols occupied by the CORESET #0 is 1 or 2.

When the communication apparatus 1200 is configured to implement a function of the network device in the method embodiment in FIG. 3, the processing module 1220 is configured to determine first information. The first information includes a Q value or a first parameter, and the first parameter indicating a status of a discovery burst transmission window DBTW. The transceiver module 1210 is configured to send the first information to a terminal device.

Optionally, in some embodiments, the Q value is indicated by using n bits, and n is a positive integer greater than 2. The n bits include at least one bit indicating a third parameter. The third parameter includes at least one of the following parameters:

subcarrier spacing common in master information block MIB information, a synchronization signal block SSB-subcarrier offset in the MIB information, and a physical downlink control channel-configuration system information block 1 PDCCH-configuration SIB 1 in the MIB information.

Optionally, in some embodiments, the n bits include n1 bits indicating a fourth parameter and (n–n1) bits indicating a fifth parameter. The fourth parameter is any parameter in the third parameter, and the fifth parameter is a parameter in the third parameter other than the fourth parameter. The fifth parameter is indicated by using m–(n–n1) bits, and m is an initial number indicating the fifth parameter.

Optionally, in some embodiments, the n bits include n1 bits indicating a fourth parameter and (n–n1) bits indicating a fifth parameter. The fourth parameter is any parameter in the third parameter, and the fifth parameter is a parameter in the third parameter other than the fourth parameter. The fifth parameter is indicated by using m bits, m is an initial number indicating the fifth parameter, and (n–n1)<m.

Optionally, in some embodiments, the fifth parameter is the SSB-subcarrier offset in the MIB information. An offset value of the SSB-subcarrier offset is determined based on a combination of a subcarrier spacing SCS of an SSB and an SCS of a common resource block CRB.

Optionally, in some embodiments, if the SCS of the SSB and the SCS of the CRB each are a first frequency, the offset value of the SSB-subcarrier offset is determined based on a preset threshold.

Alternatively, if the SCS of the SSB is a second frequency, and the SCS of the CRB is a first frequency, the offset value of the SSB-subcarrier offset is a value of the (n–n1) bits of the fifth parameter.

Alternatively, if the SCS of the SSB is a third frequency, and the SCS of the CRB is a first frequency, the offset value of the SSB-subcarrier offset is less than or equal to a value indicated by the (n–n1) bits of the fifth parameter.

Optionally, in some embodiments, the (n–n1) bits are (n–n1) most significant bits in the fifth parameter.

Alternatively, the (n–n1) bits are (n–n1) least significant bits in the fifth parameter.

Alternatively, the (n–n1) bits are any (n–n1) bits in the fifth parameter.

Optionally, in some embodiments, the first parameter is carried in serving cell configuration common in radio resource control RRC signaling or a serving cell configuration common SIB in SIB 1 information.

Alternatively, the Q value or a DBTW value is carried in serving cell configuration common in RRC signaling or a serving cell configuration common SIB in the MIB information.

Optionally, in some embodiments, the PDCCH-configuration SIB 1 includes search space zero and a control resource set zero. The control resource set zero includes a number of resource blocks RBs occupied by the control resource set CORESET #0, and the number of RBs is 96.

Optionally, in some embodiments, if a pattern of multiplexing the SSB and the CORESET #0 is 1, and a number of RBs occupied by the SSB is k, a first spacing included in the control resource set zero is any value of 0 to (96-k). The first spacing indicates a spacing between an RB with a smallest index in the SSB and an RB with a smallest index in the CORESET #0.

Alternatively, if a pattern of multiplexing the SSB and the CORESET #0 is 2 or 3, a first spacing is determined based on a value of an offset between the SSB and a subcarrier in the CRB.

Optionally, in some embodiments, if the pattern of multiplexing the SSB and the CORESET #0 is 2 or 3, if the value of the offset between the SSB and the subcarrier in the CRB is equal to 0, the first spacing is k or –k; or if the value of the offset between the SSB and the subcarrier in the CRB is greater than 0, the first spacing is (k+1) or –(k+1).

Optionally, in some embodiments, if the pattern of multiplexing the SSB and the CORESET #0 is 1, a number of symbols occupied by the CORESET #0 is any value of 1 to 4.

Optionally, in some embodiments, if the pattern of multiplexing the SSB and the CORESET #0 is 3, a number of symbols occupied by the CORESET #0 is 2.

If the pattern of multiplexing the SSB and the CORESET #0 is 2, a number of symbols occupied by the CORESET #0 is 1 or 2.

When the communication apparatus 1200 is configured to implement a function of the terminal device in the method embodiment in FIG. 10, the transceiver module 1210 is configured to receive master information block MIB information sent by a network device. The MIB information includes a physical downlink control channel-configuration system information block 1 PDCCH-configuration SIB 1. The PDCCH-configuration SIB 1 includes a control resource set zero. The control resource set zero includes a number of resource blocks RBs occupied by the control resource set CORESET #0, and the number of RBs is 96. The processing module 1220 is configured to determine, based on the control resource set zero, a number of consecutive symbols occupied by a type 0-PDCCH.

Optionally, in some embodiments, if a pattern of multiplexing a synchronization signal block SSB and the CORESET #0 is 1, and a number of RBs occupied by the SSB is k, a first spacing included in the control resource set zero is any value of 0 to (96-k). The first spacing indicates a spacing between an RB with a smallest index in the SSB and an RB with a smallest index in the CORESET #0.

Alternatively, if a pattern of multiplexing the SSB and the CORESET #0 is 2 or 3, a first spacing is determined based on a value of an offset between the SSB and a subcarrier in a CRB.

Optionally, in some embodiments, if the pattern of multiplexing the SSB and the CORESET #0 is 2 or 3, if the value of the offset between the SSB and the subcarrier in the CRB is equal to 0, the first spacing is k or –k; or if the value of the offset between the SSB and the subcarrier in the CRB is greater than 0, the first spacing is (k+1) or –(k+1).

Optionally, in some embodiments, if the pattern of multiplexing the SSB and the CORESET #0 is 1, a number of symbols occupied by the CORESET #0 is any value of 1 to 4.

Optionally, in some embodiments, if the pattern of multiplexing the SSB and the CORESET #0 is 3, a number of symbols occupied by the CORESET #0 is 2.

If the pattern of multiplexing the SSB and the CORESET #0 is 2, a number of symbols occupied by the CORESET #0 is 1 or 2.

When the communication apparatus 1200 is configured to implement a function of the network device in the method embodiment in FIG. 10, the processing module 1220 is configured to determine master information block MIB information. The MIB information includes a physical downlink control channel-configuration system information block 1 PDCCH-configuration SIB 1. The PDCCH-configuration SIB 1 includes a control resource set zero. The control resource set zero includes a number of resource blocks RBs occupied by the control resource set CORESET #0, and the number of RBs is 96. The transceiver module 1210 is configured to send the MIB information to a terminal device.

Optionally, in some embodiments, if a pattern of multiplexing a synchronization signal block SSB and the CORESET #0 is 1, and a number of RBs occupied by the SSB is k, a first spacing included in the control resource set zero is any value of 0 to (96-k). The first spacing indicates a spacing between an RB with a smallest index in the SSB and an RB with a smallest index in the CORESET #0.

Alternatively, if a pattern of multiplexing the SSB and the CORESET #0 is 2 or 3, a first spacing is determined based on a value of an offset between the SSB and a subcarrier in a CRB.

Optionally, in some embodiments, if the pattern of multiplexing the SSB and the CORESET #0 is 2 or 3, if the value of the offset between the SSB and the subcarrier in the CRB is equal to 0, the first spacing is k or –k; or if the value of the offset between the SSB and the subcarrier in the CRB is greater than 0, the first spacing is (k+1) or –(k+1).

Optionally, in some embodiments, if the pattern of multiplexing the SSB and the CORESET #0 is 1, a number of symbols occupied by the CORESET #0 is any value of 1 to 4.

Optionally, in some embodiments, if the pattern of multiplexing the SSB and the CORESET #0 is 3, a number of symbols occupied by the CORESET #0 is 2.

If the pattern of multiplexing the SSB and the CORESET #0 is 2, a number of symbols occupied by the CORESET #0 is 1 or 2.

When the communication apparatus 1200 is configured to implement a function of the terminal device in the method embodiment in FIG. 11, the transceiver module 1210 is configured to receive master information block MIB information sent by a network device. The MIB information includes subcarrier spacing common. The subcarrier spacing common is indicated by using r bits, and r is a positive integer greater than or equal to 2. The processing module 1220 is configured to perform timing synchronization based on the MIB information.

Optionally, in some embodiments, the r bits include one initial bit indicating the subcarrier spacing common and (r–1) bits indicating a sixth parameter. The sixth parameter includes at least one of the following parameters:

an SSB-subcarrier offset in the MIB information and a PDCCH-configuration SIB 1 in the MIB information.

Optionally, in some embodiments, the PDCCH-configuration SIB 1 includes search space zero and a control resource set zero.

Optionally, in some embodiments, the r bits include the initial bit indicating the subcarrier spacing common and the (r–1) bits indicating a seventh parameter. The seventh parameter is any parameter in the sixth parameter, the seventh parameter is indicated by using (s–(r–1)) bits, and s is an initial number indicating the seventh parameter.

Optionally, in some embodiments, the r bits include the initial bit indicating the subcarrier spacing common and the (r–1) bits indicating a seventh parameter. The seventh parameter is any parameter in the sixth parameter, the seventh parameter is indicated by using s bits, and s is an initial number indicating the seventh parameter.

Optionally, in some embodiments, the seventh parameter is the SSB-subcarrier offset in the MIB information. A value of the SSB-subcarrier offset is determined based on a combination of an SCS of an SSB and an SCS of a CRB.

Optionally, in some embodiments, if the SCS of the SSB and the SCS of the CRB each are a first frequency, the value of the SSB-subcarrier offset is determined based on a preset threshold.

Alternatively, if the SCS of the SSB is a second frequency, and the SCS of the CRB is a first frequency, the value of the SSB-subcarrier offset is a value indicated by the (r–1) bits of the seventh parameter.

Alternatively, if the SCS of the SSB is a third frequency, and the SCS of the CRB is a first frequency, the value of the SSB-subcarrier offset is less than or equal to a value indicated by the (r–1) bits of the seventh parameter.

When the communication apparatus 1200 is configured to implement a function of the network device in the method embodiment in FIG. 11, the processing module 1220 is configured to determine master information block MIB information. The MIB information includes first subcarrier spacing common. The first subcarrier spacing common is indicated by using r bits, and r is a positive integer greater than or equal to 2. The transceiver module 1210 is configured to send the MIB information to a terminal device.

Optionally, in some embodiments, the r bits include one initial bit indicating the subcarrier spacing common and (r–1) bits indicating a sixth parameter. The sixth parameter includes at least one of the following parameters:

an SSB-subcarrier offset in the MIB information and a PDCCH-configuration SIB 1 in the MIB information.

Optionally, in some embodiments, the PDCCH-configuration SIB 1 includes search space zero and a control resource set zero.

Optionally, in some embodiments, the r bits include the initial bit indicating the subcarrier spacing common and the (r–1) bits indicating a seventh parameter. The seventh parameter is any parameter in the sixth parameter, the seventh parameter is indicated by using (s–(r–1)) bits, and s is an initial number indicating the seventh parameter.

Optionally, in some embodiments, the r bits include the initial bit indicating the subcarrier spacing common and the (r–1) bits indicating a seventh parameter. The seventh parameter is any parameter in the sixth parameter, the seventh parameter is indicated by using s bits, and s is an initial number indicating the seventh parameter.

Optionally, in some embodiments, the seventh parameter is the SSB-subcarrier offset in the MIB information. A value of the SSB-subcarrier offset is determined based on a combination of an SCS of an SSB and an SCS of a CRB.

Optionally, in some embodiments, if the SCS of the SSB and the SCS of the CRB each are a first frequency, the value of the SSB-subcarrier offset is determined based on a preset threshold.

Alternatively, if the SCS of the SSB is a second frequency, and the SCS of the CRB is a first frequency, the value of the SSB-subcarrier offset is a value indicated by the (r–1) bits of the seventh parameter.

Alternatively, if the SCS of the SSB is a third frequency, and the SCS of the CRB is a first frequency, the value of the SSB-subcarrier offset is less than or equal to a value indicated by the (r–1) bits of the seventh parameter.

For more detailed descriptions of the transceiver module 1210 and the processing module 1220, refer to related descriptions in the foregoing method embodiments. Details are not described herein again.

As shown in FIG. 13, a communication apparatus 1300 includes a processor 1310 and an interface circuit 1320. The processor 1310 and the interface circuit 1320 are coupled to each other. It may be understood that the interface circuit 1320 may be a transceiver or an input/output interface. Optionally, the communication apparatus 1300 may further include a memory 1330, configured to store instructions executed by the processor 1310, input data required for running instructions by the processor 1310, or data generated after the processor 1310 runs instructions.

When the communication apparatus 1300 is configured to implement the method in the foregoing method embodiments, the processor 1310 is configured to perform a function of the processing module 1220, and the interface circuit 1320 is configured to perform a function of the transceiver module 1210.

When the communication apparatus is a chip used in a terminal device, the chip in the terminal device implements a function of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip used in a network device, the chip in the network device implements a function of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

Figure 14:
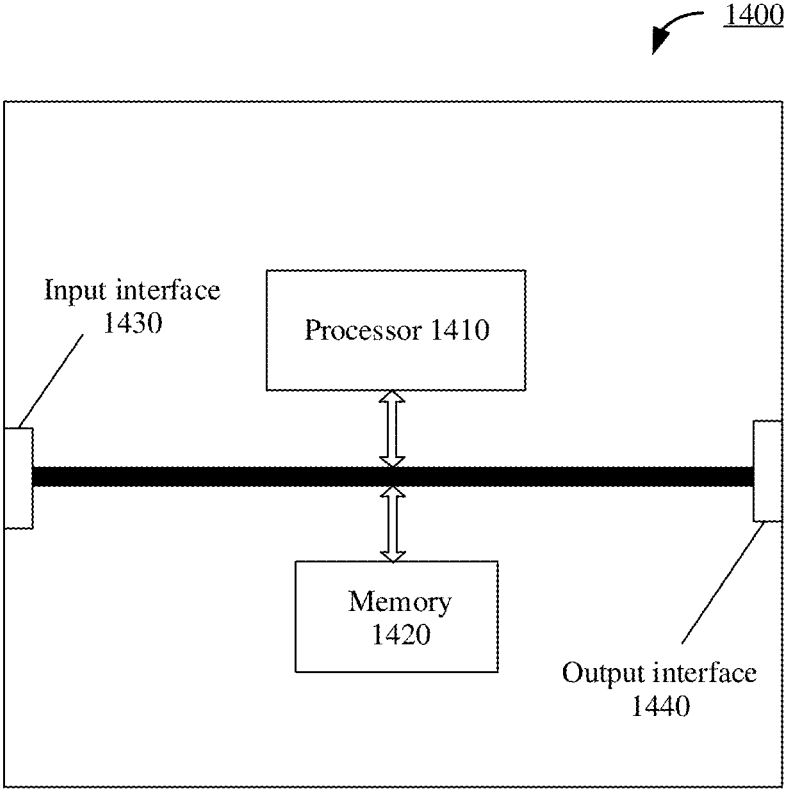
FIG. 14 is a schematic diagram of a structure of a chip according to an embodiment of this application.

FIG. 14 is a schematic diagram of a structure of a chip according to an embodiment of this application. The chip 1400 shown in FIG. 14 includes a processor 1410. The processor 1410 may invoke a computer program from a memory and run the computer program, to implement the method in embodiments of this application.

Optionally, as shown in FIG. 14, the chip 1400 may further include a memory 1420. The processor 1410 may invoke a computer program from the memory 1420 and run the computer program, to perform the steps of the method 300, the method 1000, or the method 1100 in embodiments of this application.

The memory 1420 may be an independent component independent of the processor 1410, or may be integrated into the processor 1410.

Optionally, the chip 1400 may further include an input interface 1430. The processor 1410 may communicate with another device or chip by controlling the input interface

1430, and specifically, may obtain information or data sent by the another device or chip.

Optionally, the chip 1400 may further include an output interface 1440. The processor 1410 may communicate with another device or chip by controlling the output interface 1440, and specifically, may output information or data to the another device or chip.

Optionally, the chip may be used in the terminal device in embodiments of this application, and the chip may implement corresponding procedures implemented by the terminal device in the methods in embodiments of this application. For brevity, details are not described herein again.

Optionally, the chip may be used in the network device in embodiments of this application, and the chip may implement corresponding procedures implemented by the network device in the methods in embodiments of this application. For brevity, details are not described herein again.

It should be understood that the chip mentioned in embodiments of this application may also be referred to as a system-level chip, a system chip, a chip system, a system-on-a-chip, or the like.

It may be understood that the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The general-purpose processor may be a microprocessor or any regular processor.

The method steps in embodiments of this application may be implemented in a hardware manner, or may be implemented in a manner of executing software instructions by the processor. The software instructions may include a corresponding software module. The software module may be stored in a random access memory (random access memory, RAM), a flash memory, a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to the processor, so that the processor can read information from the storage medium and write information to the storage medium. Certainly, the storage medium may alternatively be a component of the processor. The processor and the storage medium may be disposed in an ASIC. In addition, the ASIC may be located in an access network device or a terminal device. Certainly, the processor and the storage medium may alternatively exist in an access network device or a terminal device as discrete components.

All or some of the foregoing embodiments may be implemented by using software, hardware, firmware, or any combination thereof. When software is used to implement the foregoing embodiments, all or some of the embodiments may be implemented in a form of a computer program product. The computer program product includes one or more computer programs or instructions. When the computer program or the instruction is loaded and executed on a computer, all or some of the procedures or functions in embodiments of this application are executed. The computer may be a general-purpose computer, a dedicated computer, a computer network, or another programmable apparatus. The computer program or the instruction may be stored in a computer-readable storage medium, or may be transmitted through the computer-readable storage medium. The computer-readable storage medium may be any usable medium accessible by a computer, or a data storage device, for example, a server integrating one or more usable media. The usable medium may be a magnetic medium, for example, a floppy disk, a hard disk, or a magnetic tape, may be an optical medium, for example, a digital versatile disc (digital versatile disc, DVD), or may be a semiconductor medium, for example, a solid state disk (solid state disk, SSD).

An embodiment of this application further provides a computer-readable storage medium, configured to store a computer program.

Optionally, the computer-readable storage medium may be used in the terminal device in embodiments of this application, and the computer program enables a computer to implement the corresponding procedures implemented by the terminal device in the methods in embodiments of this application. For brevity, details are not described herein again.

Optionally, the computer-readable storage medium may be used in the network device in embodiments of this application, and the computer program enables a computer to implement the corresponding procedures implemented by the network device in the methods in embodiments of this application. For brevity, details are not described herein again.

An embodiment of this application further provides a computer program product, including computer program instructions.

Optionally, the computer program product may be used in the terminal device in embodiments of this application, and the computer program instructions enable a computer to implement the corresponding procedures implemented by the terminal device in the methods in embodiments of this application. For brevity, details are not described herein again.

An embodiment of this application further provides a computer program product, including computer program instructions.

Optionally, the computer program product may be used in the network device in embodiments of this application, and the computer program instructions enable a computer to implement the corresponding procedures implemented by the network device in the methods in embodiments of this application. For brevity, details are not described herein again.

An embodiment of this application further provides a computer program.

Optionally, the computer program may be applied to the terminal device in embodiments of this application. When the computer program is run on a computer, the computer is enabled to implement the corresponding procedures implemented by the terminal device in the methods in embodiments of this application. For brevity, details are not described herein again.

Optionally, the computer program may be applied to the network device in embodiments of this application. When the computer program is run on a computer, the computer is enabled to implement the corresponding procedures implemented by the network device in the methods in embodiments of this application. For brevity, details are not described herein again.

An embodiment of this application further provides a communication system, including the terminal device and the network device in the foregoing embodiments, to implement mutual cooperation between devices.

A person of ordinary skill in the art may be aware that, in combination with the examples described in embodiments disclosed in this specification, modules and algorithm steps may be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and module, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. Division into the modules is merely logical function division and may be other division during actual implementation. For example, a plurality of modules or components may be combined. In addition, the displayed or discussed mutual couplings or communication connections may be indirect couplings or communication connections through some interfaces, apparatuses, or modules.

In addition, functional modules in embodiments of this application may be integrated into one physical entity, or each of the modules may separately correspond to one physical entity, or two or more modules may be integrated into one physical entity.

When the functions are implemented in a form of a software functional module and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication method, comprising:
receiving master information block (MIB) information sent by a network device, wherein the MIB information is carried in a synchronization signal block (SSB), the MIB information comprises a physical downlink control channel-configuration system information block 1 (PDCCH-configuration SIB 1), the PDCCH-configuration SIB 1 comprises a control resource set zero parameter, the control resource set zero parameter comprises a number of resource blocks (RBs) occupied by a control resource set (CORESET) #0, and the number of RBs is 96, and wherein, in response to a pattern of multiplexing the SSB and the CORESET #0 being 1, a number of symbols occupied by the CORESET #0 is 1 or 2, and a spacing between the RB with the smallest index in the SSB and the RB with the smallest index in the CORESET #0 is 76 RBs; and determining, based on the control resource set zero parameter in the received MIB information, a number of consecutive symbols occupied by a type 0-physical downlink control channel (type 0-PDCCH) comprising the CORESET #0.

2. The method according to claim 1, wherein
in response to the pattern of multiplexing the SSB and the CORESET #0 being 3, the number of symbols occupied by the CORESET #0 is 2; or
in response to the pattern of multiplexing the SSB and the CORESET #0 being 2, the number of symbols occupied by the CORESET #0 is 1 or 2.

3. The method according to claim 1, wherein
in response to the pattern of multiplexing the SSB and the CORESET #0 being 2 or 3,
a channel bandwidth occupied by the CORESET #0 is 400 MHz,
a subcarrier spacing between the SSB and the CORESET #0 is 480 kHz,
a number of available RBs in the channel bandwidth is 66,
the type 0-PDCCH channel comprising the CORESET #0 occupies 24 RBs or 48 RBs, and
either
an offset between the SSB and the subcarrier in a common resource block (CRB) is equal to 0, and the spacing between the RB with the smallest index in the SSB and the RB with the smallest index in the CORESET #0 is −20 RBs, or
the offset between the SSB and the subcarrier in the CRB is greater than 0, and the spacing between the RB with the smallest index in the SSB and the RB with the smallest index in the CORESET #0 is −21 RBs.

4. The method according to claim 1, wherein
in response to the pattern of multiplexing the SSB and the CORESET #0 being 2 or 3,
a channel bandwidth occupied by the CORESET #0 is 400 MHz,
a subcarrier spacing between the SSB and the CORESET #0 is 480 kHz,
a number of available RBs in the channel bandwidth is 66, and
either
the type 0-PDCCH channel comprising the CORESET #0 occupies 24 RBs, and the spacing between the RB with the smallest index in the SSB and the RB with the smallest index in the CORESET #0 is 24 RBs, or
the type 0-PDCCH channel comprising the CORESET #0 occupies 48 RBs, and the spacing between the RB with the smallest index in the SSB and the RB with the smallest index in the CORESET #0 is 48 RBs.

5. A communication method, comprising:

sending master information block (MIB) information, wherein the MIB information is carried in a synchronization signal block (SSB), the MIB information comprises a physical downlink control channel-configuration system information block 1 (PDCCH-configuration SIB 1), the PDCCH-configuration SIB 1 comprises a control resource set zero parameter, the control resource set zero parameter comprises a number of resource blocks (RBs) occupied by a control resource set (CORESET) #0, and the number of RBs is 96, and wherein, in response to a pattern of multiplexing the SSB and the CORESET #0 being 1, a number of symbols occupied by the CORESET #0 is 1 or 2, and a spacing between the RB with the smallest index in the SSB and the RB with the smallest index in the CORESET #0 is 76 RBs.

6. The method according to claim 5, wherein in response to the pattern of multiplexing the SSB and the CORESET #0 being 3, the number of symbols occupied by the CORESET #0 is 2; or in response to the pattern of multiplexing the SSB and the CORESET #0 being 2, the number of symbols occupied by the CORESET #0 is 1 or 2.

7. The method according to claim 5, wherein in response to the pattern of multiplexing the SSB and the CORESET #0 being 2 or 3, a channel bandwidth occupied by the CORESET #0 is 400 MHz, a subcarrier spacing between the SSB and the CORESET #0 is 480 kHz, a number of available RBs in the channel bandwidth is 66, the type 0-PDCCH channel comprising the CORESET #0 occupies 24 RBs or 48 RBs, and either an offset between the SSB and the subcarrier in a common resource block (CRB) is equal to 0, and the spacing between the RB with the smallest index in the SSB and the RB with the smallest index in the CORESET #0 is –20 RBs, or the offset between the SSB and the subcarrier in the CRB is greater than 0, and the spacing between the RB with the smallest index in the SSB and the RB with the smallest index in the CORESET #0 is –21 RBs.

8. The method according to claim 5, wherein in response to the pattern of multiplexing the SSB and the CORESET #0 being 2 or 3, a channel bandwidth occupied by the CORESET #0 is 400 MHz, a subcarrier spacing between the SSB and the CORESET #0 is 480 kHz, a number of available RBs in the channel bandwidth is 66, and either the type 0-PDCCH channel comprising the CORESET #0 occupies 24 RBs, and the spacing between the RB with the smallest index in the SSB and the RB with the smallest index in the CORESET #0 is 24 RBs, or the type 0-PDCCH channel comprising the CORESET #0 occupies 48 RBs, and the spacing between the RB with the smallest index in the SSB and the RB with the smallest index in the CORESET #0 is 48 RBs.

9. A communication apparatus, comprising:

a transceiver, configured to receive master information block (MIB) information sent by a network device, wherein the MIB information is carried in a synchronization signal block (SSB), the MIB information comprises a physical downlink control channel-configuration system information block 1 (PDCCH-configuration SIB 1), the PDCCH-configuration SIB 1 comprises a control resource set zero parameter, the control resource set zero parameter comprises a number of resource blocks (RBs) occupied by a control resource set (CORESET) #0, and the number of RBs is 96, and wherein, in response to a pattern of multiplexing the SSB and the CORESET #0 being 1, a number of symbols occupied by the CORESET #0 is 1 or 2, and a spacing between the RB with the smallest index in the SSB and the RB with the smallest index in the CORESET #0 is 76 RBs; and a processor, configured to determine, based on the control resource set zero parameter in the received MIB information, a number of consecutive symbols occupied by a type 0-physical downlink control channel (type 0-PDCCH) comprising the CORESET #0.

10. The apparatus according to claim 9, wherein in response to the pattern of multiplexing the SSB and the CORESET #0 being 3, the number of symbols occupied by the CORESET #0 is 2; or in response to the pattern of multiplexing the SSB and the CORESET #0 being 2, the number of symbols occupied by the CORESET #0 is 1 or 2.

11. The apparatus according to claim 9, wherein in response to the pattern of multiplexing the SSB and the CORESET #0 being 2 or 3, a channel bandwidth occupied by the CORESET #0 is 400 MHz, a subcarrier spacing between the SSB and the CORESET #0 is 480 kHz, a number of available RBs in the channel bandwidth is 66, the type 0-PDCCH channel comprising the CORESET #0 occupies 24 RBs or 48 RBs, and either an offset between the SSB and the subcarrier in a common resource block (CRB) is equal to 0, and the spacing between the RB with the smallest index in the SSB and the RB with the smallest index in the CORESET #0 is –20 RBs, or the offset between the SSB and the subcarrier in the CRB is greater than 0, and the spacing between the RB with the smallest index in the SSB and the RB with the smallest index in the CORESET #0 is –21 RBs.

12. The apparatus according to claim 9, wherein in response to the pattern of multiplexing the SSB and the CORESET #0 being 2 or 3, a channel bandwidth occupied by the CORESET #0 is 400 MHz, a subcarrier spacing between the SSB and the CORESET #0 is 480 kHz, a number of available RBs in the channel bandwidth is 66, and either the type 0-PDCCH channel comprising the CORESET #0 occupies 24 RBs, and the spacing between the RB with the smallest index in the SSB and the RB with the smallest index in the CORESET #0 is 24 RBs, or the type 0-PDCCH channel comprising the CORESET #0 occupies 48 RBs, and the spacing between the RB with the smallest index in the SSB and the RB with the smallest index in the CORESET #0 is 48 RBs.

13. A communication apparatus, comprising:

a transceiver, configured to send master information block (MIB) information, wherein the MIB information is carried in a synchronization signal block (SSB), the MIB information comprises a physical downlink control channel-configuration system information block 1 (PDCCH-configuration SIB 1), the PDCCH-configuration SIB 1 comprises a control resource set zero parameter, the control resource set zero parameter comprises a number of resource blocks (RBs) occupied by a control resource set (CORESET) #0, and the number of RBs is 96, and wherein, in response to a pattern of multiplexing the SSB and the CORESET #0 being 1, a number of symbols occupied by the CORESET #0 is 1 or 2, and a spacing between the RB with the smallest index in the SSB and the RB with the smallest index in the CORESET #0 is 76 RBS.

14. The apparatus according to claim 13, wherein in response to the pattern of multiplexing the SSB and the CORESET #0 being 3, the number of symbols occupied by the CORESET #0 is 2; or in response to the pattern of multiplexing the SSB and the CORESET #0 being 2, the number of symbols occupied by the CORESET #0 is 1 or 2.

15. The apparatus according to claim 13, wherein in response to the pattern of multiplexing the SSB and the CORESET #0 being 2 or 3, a channel bandwidth occupied by the CORESET #0 is 400 MHz, a subcarrier spacing between the SSB and the CORESET #0 is 480 kHz, a number of available RBs in the channel bandwidth is 66, the type 0-PDCCH channel comprising the CORESET #0 occupies 24 RBs or 48 RBs, and either an offset between the SSB and the subcarrier in a common resource block (CRB) is equal to 0, and the spacing between the RB with the smallest index in the SSB and the RB with the smallest index in the CORESET #0 is −20 RBs, or the offset between the SSB and the subcarrier in the CRB is greater than 0, and the spacing between the RB with the smallest index in the SSB and the RB with the smallest index in the CORESET #0 is −21 RBs.

16. The apparatus according to claim 13, wherein in response to the pattern of multiplexing the SSB and the CORESET #0 being 2 or 3, a channel bandwidth occupied by the CORESET #0 is 400 MHz, a subcarrier spacing between the SSB and the CORESET #0 is 480 kHz, a number of available RBs in the channel bandwidth is 66, and either the type 0-PDCCH channel comprising the CORESET #0 occupies 24 RBs, and the spacing between the RB with the smallest index in the SSB and the RB with the smallest index in the CORESET #0 is 24 RBs, or the type 0-PDCCH channel comprising the CORESET #0 occupies 48 RBs, and the spacing between the RB with the smallest index in the SSB and the RB with the smallest index in the CORESET #0 is 48 RBs.

* * * * *